US009507061B2

(12) United States Patent
Hofmann et al.

(10) Patent No.: US 9,507,061 B2
(45) Date of Patent: Nov. 29, 2016

(54) AMORPHOUS METALS AND COMPOSITES AS MIRRORS AND MIRROR ASSEMBLIES

(71) Applicant: California Institute of Technology, Pasadena, CA (US)

(72) Inventors: Douglas C. Hofmann, Pasadena, CA (US); Gregory L. Davis, Pasadena, CA (US); Gregory S. Agnes, Valencia, CA (US); Andrew A. Shapiro, Glendale, CA (US)

(73) Assignee: California Institute of Technology, Pasadena, CA (US)

( * ) Notice: Subject to any disclaimer, the term of this patent is extended or adjusted under 35 U.S.C. 154(b) by 695 days.

(21) Appl. No.: 13/679,674

(22) Filed: Nov. 16, 2012

(65) Prior Publication Data

US 2013/0139964 A1     Jun. 6, 2013

Related U.S. Application Data

(60) Provisional application No. 61/560,651, filed on Nov. 16, 2011.

(51) Int. Cl.
| | |
|---|---|
| *B23P 11/00* | (2006.01) |
| *G02B 5/08* | (2006.01) |
| *B21K 23/00* | (2006.01) |

(Continued)

(52) U.S. Cl.
CPC ............. *G02B 5/08* (2013.01); *B05D 5/063* (2013.01); *B21D 26/053* (2013.01); *B21D 26/14* (2013.01); *B21J 1/006* (2013.01); *B21K 23/00* (2013.01); *B23K 26/22* (2013.01); *B23P 11/00* (2013.01); *C22C 1/002* (2013.01); *C22C 33/003* (2013.01); *C22C 45/00* (2013.01); *C22C 45/001* (2013.01); *C22C 45/003* (2013.01); *C22C 45/02* (2013.01); *C22C 45/04* (2013.01); *C22C 45/10* (2013.01); *C23C 18/1646* (2013.01); *C25D 7/08* (2013.01); *G02B 5/0808* (2013.01); *B23P 15/00* (2013.01);

(Continued)

(58) Field of Classification Search
CPC ........ G02B 5/08; G02B 5/0808; B21J 1/006; B21D 26/14; B21D 26/053; B21K 23/00; B23P 11/00; B05D 5/063; B23K 26/22; C22C 45/10; C22C 45/003; C22C 33/003; C22C 45/001; C22C 45/04; C22C 1/002; C22C 45/02; C22C 18/1646; C22C 45/00; C25D 7/08; Y10T 29/49986
See application file for complete search history.

(56) References Cited

U.S. PATENT DOCUMENTS

| 4,898,604 A | 2/1990 | Sauerwein |
| 5,076,700 A | 12/1991 | DeCaprio |

(Continued)

OTHER PUBLICATIONS

Hofmann et al. Development of Tough, Low-Density Titanium-Based Bulk Metallic Glass Matrix Composites with Tensile Ductility, Dec. 2008, Proceedings of the National Academy of Sciences of the United States of America, vol. 105, No. 51 pp. 20136-20140.*

(Continued)

*Primary Examiner* — Jacob Cigna
*Assistant Examiner* — Lee A Holly
(74) *Attorney, Agent, or Firm* — Gates & Cooper LLP

(57) ABSTRACT

A mirror or mirror assembly fabricated by molding, pressing, assembling, or depositing one or more bulk metal glass (BMG), bulk metal glass composite (BMGMC), or amorphous metal (AM) parts and where the optical surface and backing of the mirror can be fabricated without machining or polishing by utilizing the unique molding capabilities of this class of materials.

12 Claims, 60 Drawing Sheets

(51) Int. Cl.

| | | |
|---|---|---|
| B21D 26/053 | (2011.01) | |
| B21D 26/14 | (2006.01) | |
| B23K 26/22 | (2006.01) | |
| C25D 7/08 | (2006.01) | |
| B05D 5/06 | (2006.01) | |
| B21J 1/00 | (2006.01) | |
| C22C 45/00 | (2006.01) | |
| C23C 18/16 | (2006.01) | |
| C22C 1/00 | (2006.01) | |
| C22C 33/00 | (2006.01) | |
| C22C 45/02 | (2006.01) | |
| C22C 45/04 | (2006.01) | |
| C22C 45/10 | (2006.01) | |
| B23P 15/00 | (2006.01) | |

(52) U.S. Cl.
CPC ........... *Y10T 29/49* (2015.01); *Y10T 29/49826* (2015.01); *Y10T 29/49986* (2015.01)

(56) References Cited

U.S. PATENT DOCUMENTS

| | | | |
|---|---|---|---|
| 6,045,231 A | 4/2000 | Martineau | |
| 6,064,532 A | 5/2000 | Enomoto | |
| 6,286,289 B1 | 9/2001 | Powell et al. | |
| 7,281,809 B2 | 10/2007 | Warren | |
| 8,613,813 B2 | 12/2013 | Johnson et al. | |
| 2006/0181794 A1* | 8/2006 | Warren | 359/883 |
| 2009/0114317 A1* | 5/2009 | Collier et al. | 148/538 |
| 2009/0236017 A1 | 9/2009 | Johnson et al. | |
| 2011/0203704 A1 | 8/2011 | Hofmann et al. | |
| 2012/0288728 A1 | 11/2012 | Hofmann et al. | |
| 2015/0158067 A1* | 6/2015 | Kumar et al. | B21C 31/00 |

OTHER PUBLICATIONS

Vlachopoulos et al. Basic Heat Transfer and Some Applications in Polymer Processing, 2002 Plastics Technician's Toolbox, vol. 2 pp. 21-33.*

Jan Schroers, Thermoplastic Forming of Bulk Metallic Glass—Applications for MEMS and Microstructure Fabrication; Aug. 23, 2005; Elsevier, Material Science & Engineering A 449-451 (2007) 898-902.*

Hofmann, D. C., et al., "Designing metallic glass matrix composites with high toughness and tensile ductility", Nature 451 (Feb. 28, 2008), pp. 1085-1089.

Hofmann, D. C., et al., "New processing possibilities for highly toughened metallic glass matrix composites with tensile ductility", Original Research Article, Scripta Materialia, vol. 59, Issue 7, Oct. 2008, pp. 684-687.

Hofmann, D. C., "Designing Bulk Metallic Glass Matrix Composites with High Toughness and Tensile Ductility", Thesis for the Degree of Doctor of Philosophy, CalTech, 2009.

Hofmann, D., et al., "Semi-Solid Induction Forging of Metallic Glass Matrix Composites", JOM Semi-solid Induction Forging: Feature, vol. 61, No. 12, pp. 11-17, Dec. 2009.

Johnson, W. L., et al., "Beating Crystallization in Glass-Forming Metals by Millisecond Heating and Processing", Science (May 13, 2011), vol. 332, No. 6031, pp. 828-833.

Kumar, G., et al., "Atomically smooth surfaces through thermoplastic forming of metallic glass", Applied Physics Letters 97, 101907-1 (2010).

Kumar, G., et al., "Bulk Metallic Glass: The Smaller the Better", Advanced Materials, 23 (2011), pp. 461-476.

Schlegel, A., et al., "Optical Properties of Metallic Glasses", Solid State Communications, vol. 31, Issue 5, pp. 373-376, dated Mar. 19, 1979.

Schroers, J., "Processing of Bulk Metallic Glass", Advanced Materials 22 (2010), pp. 1566-1597.

* cited by examiner

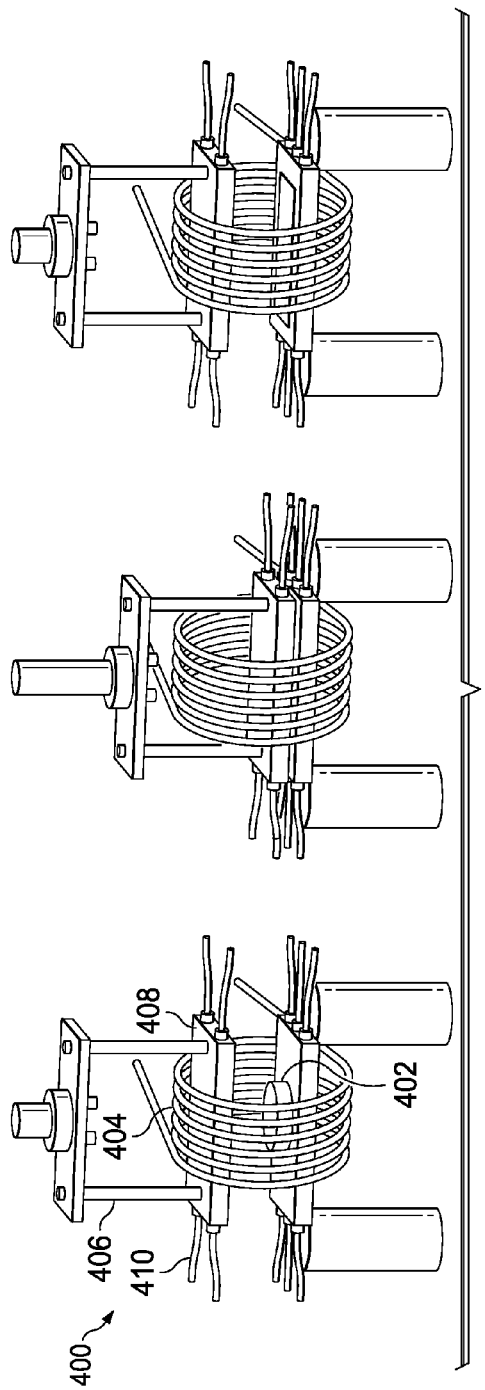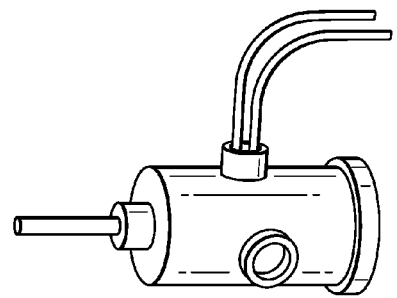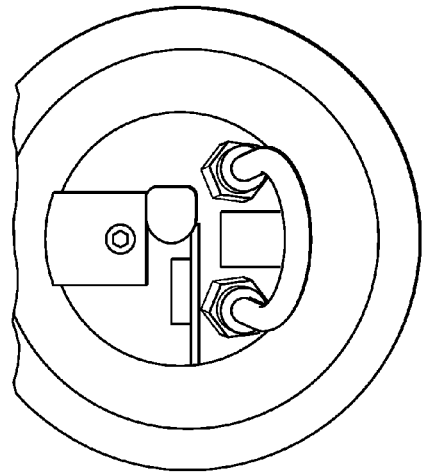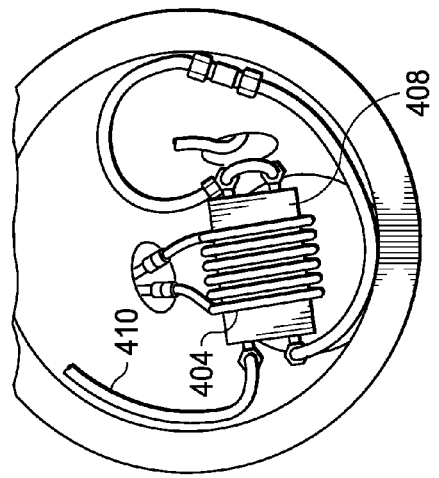
FIG. 4(a)
FIG. 4(b)
FIG. 4(c)
FIG. 4(d)

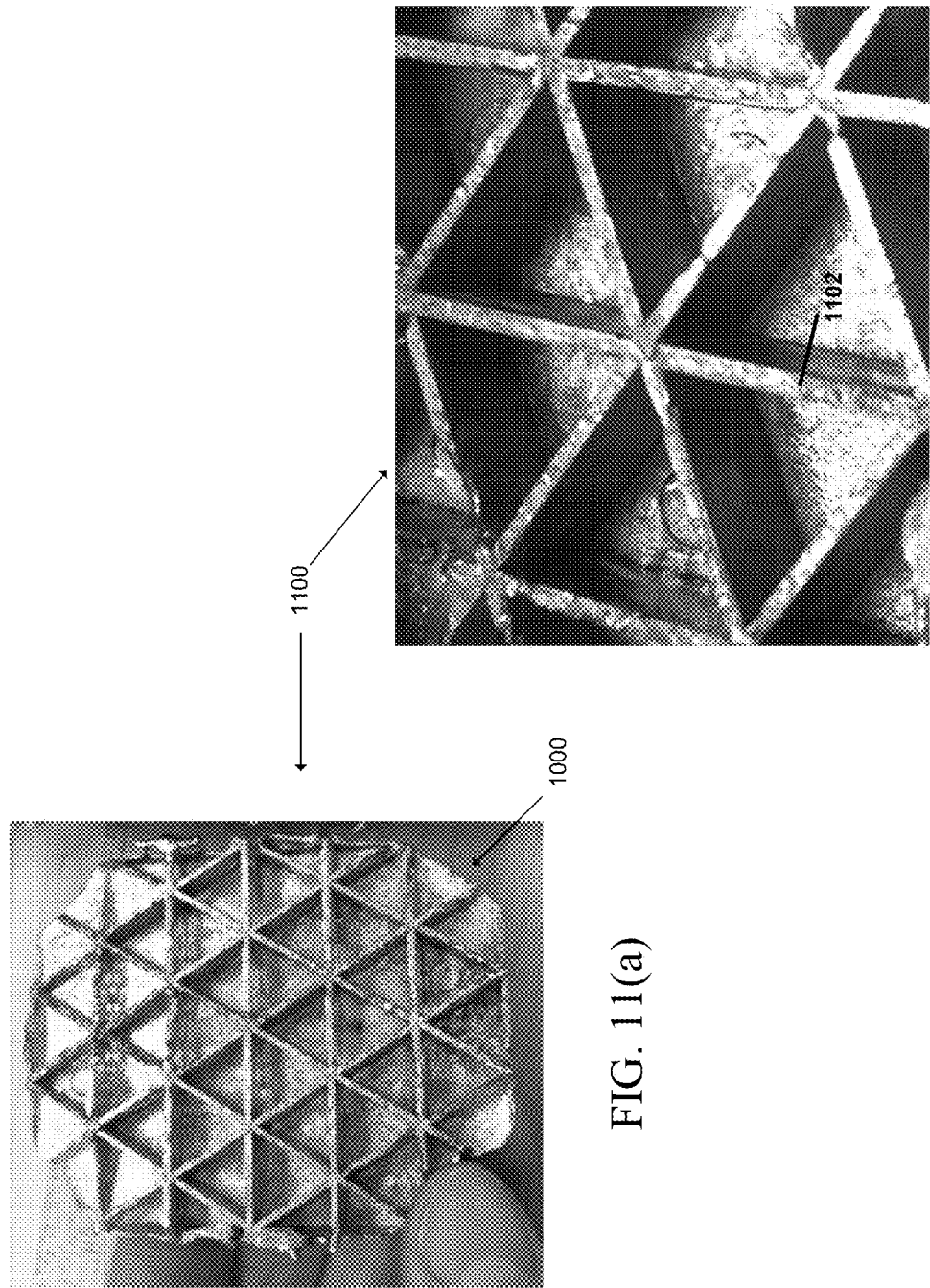

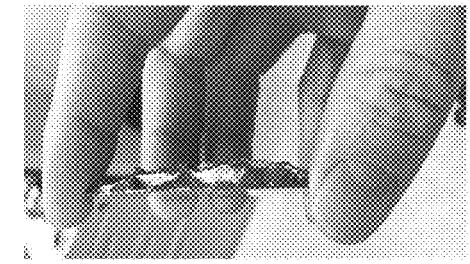
FIG. 12(a)
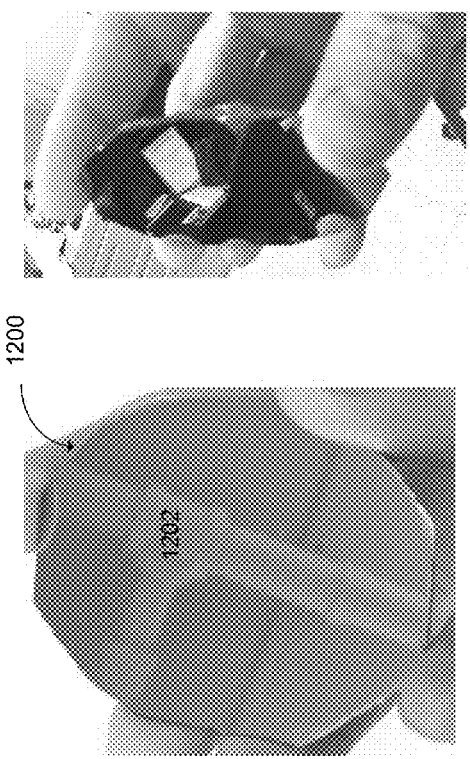
FIG. 12 (b)
FIG. 12 (c)
FIG. 12 (d)
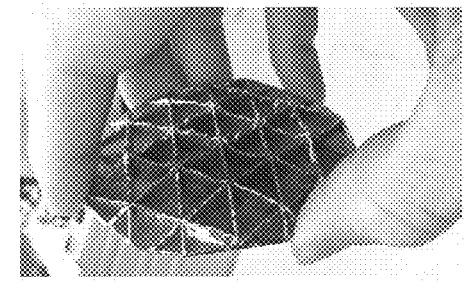
FIG. 13

FIG. 20(a) Finite element modeling is used to determine the required shape of the parison to blow mold $Zr_{44}Ti_{11}Cu_{10}Ni_{10}Be_{25}$ into a rectangular-shaped mold. Fig.20(b): Expansion of a $Zr_{44}Ti_{11}Cu_{10}Ni_{10}Be_{25}$ parison with 2-mm wall thickness under a pressure difference of $10^5$ Pa for 60 s results in complete filling of the mold [29 ft].

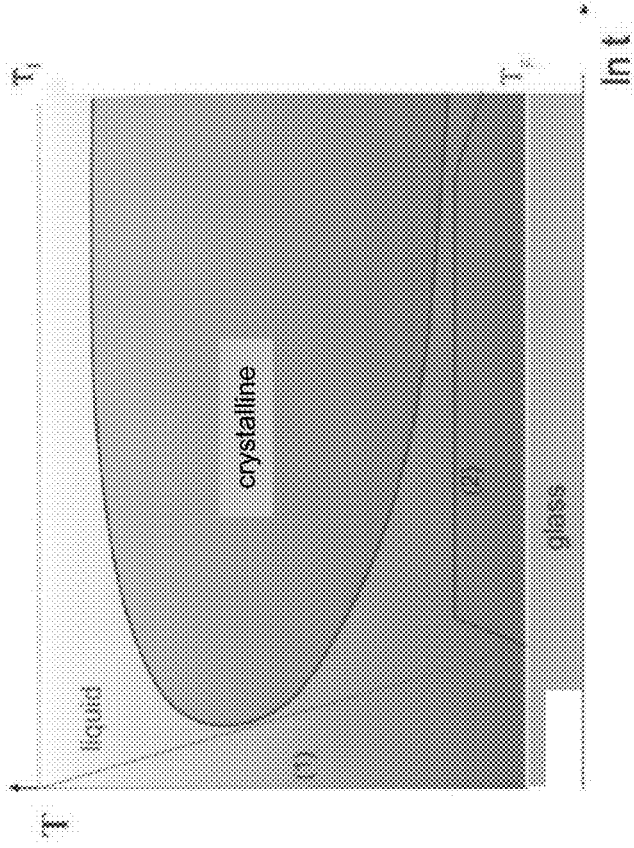

FIG. 25

Schematic TTT diagram illustrating the processing methods of BMC formers. 1) Direct casting: During direct casting forming takes place simultaneously with the required fast cooling to avoid crystallization. 2) TPF: During TPF the required fast cooling and forming are decoupled. The amorphous BMG is reheated into the SCLR, where the available processing window is much larger than during direct casting, resulting in better controllability of the process. After the forming processing step no fast cooling is required to avoid crystallization during cooling [81].

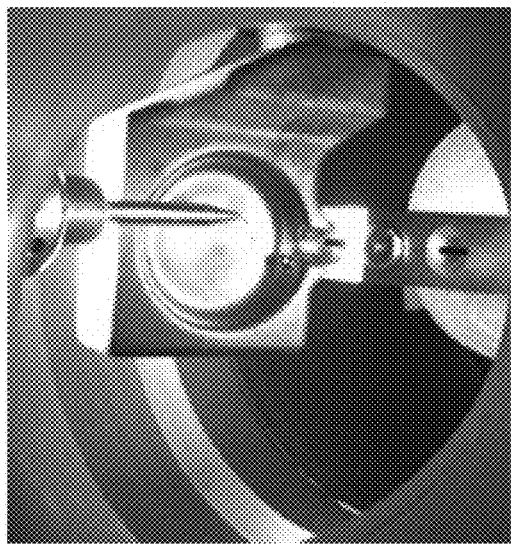
FIG. 27(d)
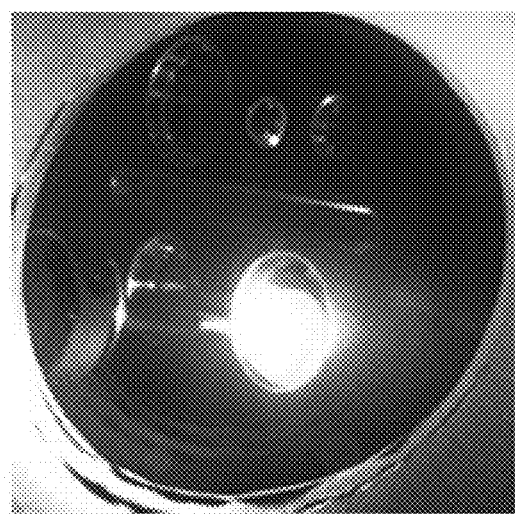
FIG. 27(c)
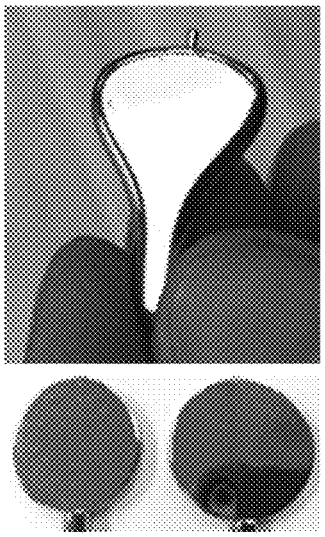
FIG. 27(g)
FIG. 27(f)
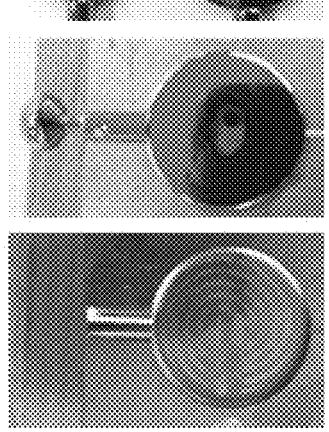
FIG. 27(e)

```
┌─────────────────┐
│ Depositing BMG  │ — 3500
│  onto a Mirror  │
└─────────────────┘
```

FIG. 35

```
┌──────────────────┐
│ Joining Multiple │
│    BMG Parts     │ — 3600
│  To Form Mirror  │
└──────────────────┘
```

FIG. 36

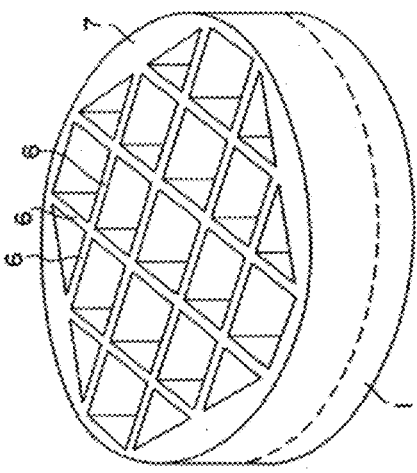
FIG. 37
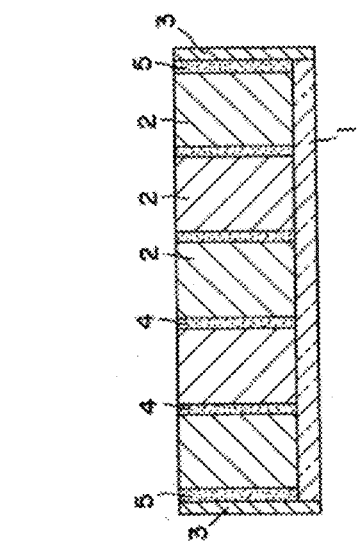
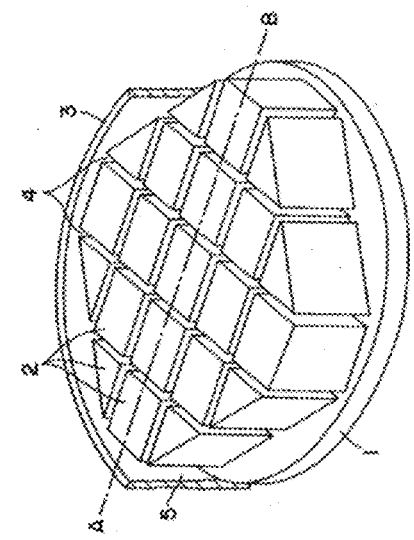
OPEN CORE LIGHT-WEIGHT TELESCOPE MIRROR AND METHOD OF MANUFACTURE
Patent Number: 6,045,231
Date of Patent: Apr. 4, 2000
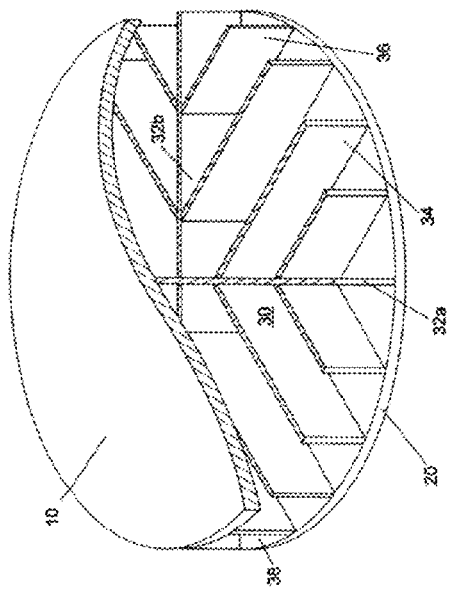
FIG. 38
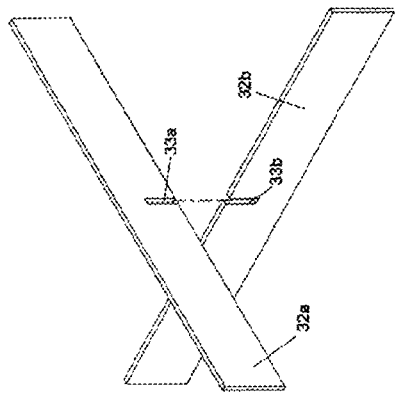

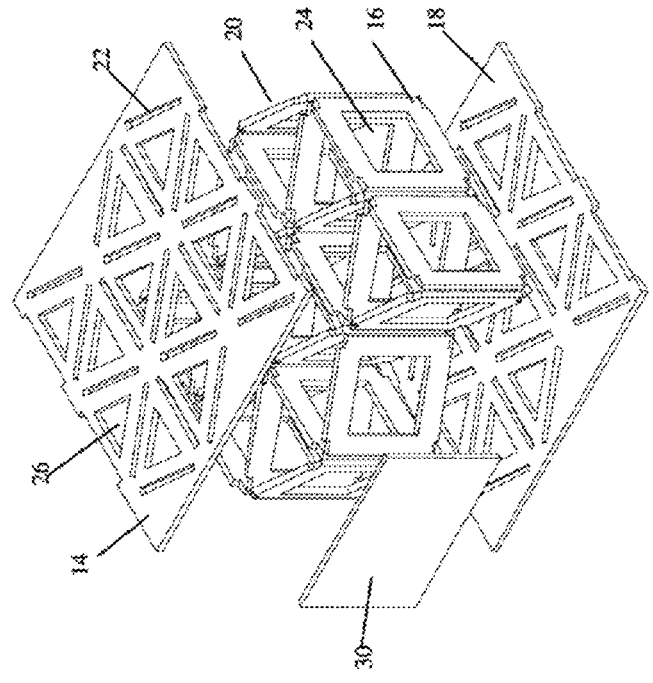
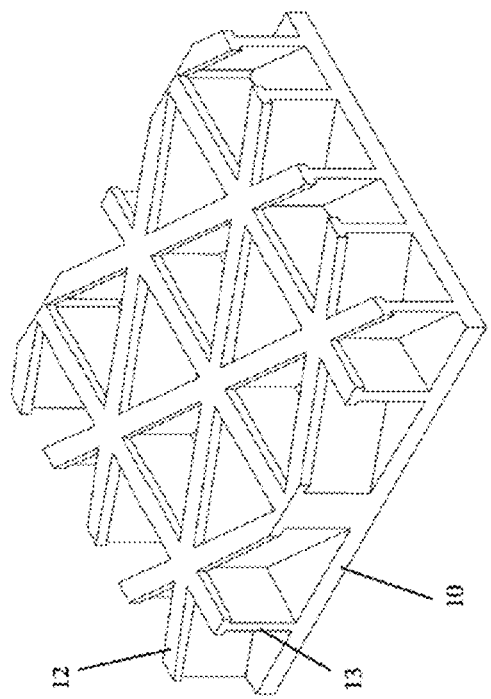
FIG. 41

AMORPHOUS METALS AND COMPOSITES AS MIRRORS AND MIRROR ASSEMBLIES

CROSS REFERENCE TO RELATED APPLICATIONS

This application claims the benefit under 35 U.S.C. Section 119(e) of the following commonly-assigned application:

U.S. Provisional Patent Application Ser. No. 61/560,651, filed on Nov. 16, 2011, by Douglas C. Hofmann, Gregory L. Davis, Gregory S. Agnes, and Andrew A. Shapiro, entitled "AMORPHOUS METALS AND COMPOSITES AS MIRRORS AND MIRROR ASSEMBLIES," which application is incorporated by reference herein.

STATEMENT REGARDING FEDERALLY SPONSORED RESEARCH AND DEVELOPMENT

The invention described herein was made in the performance of work under a NASA contract, and is subject to the provisions of Public Law 96-517 (35 U.S.C §202) in which the Contractor has elected to retain title.

BACKGROUND OF THE INVENTION

1. Field of the Invention

The present invention relates to mirror structures and methods of fabrication thereof.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Amorphous metals (AMs) and composites have mechanical properties and processing ability that are unique among all metal alloys due to their amorphous morphology.

However, AMs and composites as mirror assemblies (especially formed in one step) have not been investigated. The present invention satisfies this need. In this application, bulk metallic glasses (BMGs) are amorphous metals (AMs) with thickness greater than 1 mm.

SUMMARY OF THE INVENTION

Specific to mirrors, AMs have the ability to be cast into both the mirror surface (to a specified tolerance) and the backing all in one step, which may greatly reduce mirror cost. Such mirrors are valuable in space applications, e.g., for NASA and JPL. These mirrors also have many terrestrial applications in telescopes, cameras, automobiles, aircraft, solar energy generation, military hardware, among others, due to the robust scratch resistance of AMs and their potentially lower cost fabrication.

One or more embodiments of the invention describe a method of fabricating a mirror or mirror assembly part, comprising (a) heating a material comprising amorphous metal (AM), bulk metallic glass (BMG), or bulk metallic glass matrix composite (BMGMC), locally or in total, into a heated material; (b) forming the heated material into a mirror or mirror assembly part using one or more molds or a source of the heating; (c) cooling the part back into the glass state; and (d) removing the part (or formed material) from the molds or the source of the heating.

The material can comprise AM, BMG, or BMGMC alloy systems based in Zr, Ti, Cu, Ni, Fe, Pd, Au, Pt, ZrTiBe, ZrBe, TiBe, CuZr, CuZrAl, CuZrAlNi, NiP, FeP, PdCuNiP, PtCuNiP, FeNiB, FeNiPB, and wherein at least 50% of the material is comprised of the systems.

The forming can form an optically smooth surface of the mirror with roughness less than 0.1 micrometers without grinding or polishing, and the method can further comprise (i) heating the material into a liquid and forming the liquid against the mold comprising a mirror polished mold, (ii) heating the material in a supercooled liquid region above a glass transition of the material and the forming comprising thermoplastic forming in the supercooled liquid region against the mirror polished mold, or (iii) the forming comprising any casting or treating technique that does not require polishing or machining.

The forming can comprise depositing the BMG, AM, or BMGMC as a mirror surface on a non-BMG, AM, or BMGMC part.

The method can fabricate a mirror assembly part that has multi-functionality, comprising two or more of the following: (i) a mirror with a reflective and optically smooth surface, (ii) an optically smooth surface with curvature, (iii) an isogrid or other structural backing to give the mirror assembly increased stiffness, (iv) a low coefficient of thermal expansion, (v) flexures or tabs cast into the part or joined to the part, (vi) mounting features, and/or (vii) a mirror mount part fabricated as a support for an oxide glass mirror, wherein (1) some or all of the mirror mount part is a BMG or BMG composite, (2) one or more tabs of the mirror mount part that hold the mirror are BMG or BMG composite, (3) the mirror mount part is cast in a single processing step, and/or (4) the mirror mount part is assembled from multiple pieces that are joined or welded.

The forming can fabricate a mirror surface and structural backing of the mirror part in a single processing step, wherein the mirror part is made by pressing the heated material between two molds, and where one side of one of the molds imparts an optical finish or optical finish and curvature to the mirror surface, and another of the molds imparts the structural backing.

The forming can form a cellular structure on a back of the mirror, and one or more of the following (i) the cellular structure reducing a mass of the mirror by at least 50% and increasing a stiffness of the mirror by at least a factor of 2, as compared to the mirror without the backing, (ii) the cellular structure on the mirror comprising holes surrounded by walls having a depth of at least 3 millimeters and a thickness less than a depth, (iii) the cellular structure that is any cellular structure that reduces the mass of the part while increasing the stiffness of the mirror without the backing, (iv) the mirror having a thickness between 10 micrometers to 10 millimeters from front to back, and/or (v) the cellular structure comprising an isogrid or square honeycomb cellular structure comprising the BMG or BMGMC.

The forming can form the mirror comprising a mirror surface on an interior or exterior of a ring, or on an outside of a convex surface.

The method can further comprise processing the BMGMC material, wherein the processing and heating are such that the material has at least 5% tensile ductility and the part has a fracture toughness greater than 50 MPa*m$^{1/2}$.

The AM, BMG or BMGMC mirror or assembly part can be cooled into an amorphous or glassy state by conduction into the molds' material.

The forming can create an optical surface of the mirror having a grating.

The forming of the mirror can comprise depositing a thin layer of the AM onto a surface of a plastic or polymer.

The forming of the AM or BMG mirror can use a deposition technique that deposits the AM or BMG onto the surface of the part such that the AM or BMG forms the mirrored surface, comprising (i) sputtering the AM onto a surface of a glass, metal or plastic mirror, (ii) plating the AM onto the surface of the metal or plastic by electroplating or electroless plating, (iii) dipping the glass, metal, or plastic mirror into a bath of molten AM material to form the mirror, or (iv) spray coating mirrored materials with AM in such a way as to maintain smoothness and optical characteristics of the mirror.

The mirror can be fabricated by the forming including spray coating with an AM layer and then finishing the AM layer, the method comprising one or more of the following (i) thermal spray coating or High Velocity Oxy-Fuel (HVOF) spraying of an AM layer onto a mirror, (ii) spraying the AM layer between 10 micrometers and 15 millimeters thick, and/or (iii) surface treating the sprayed coating to form an optical finish.

The forming and/or heating can comprise consolidating BMG, AM, or BMGMC powder into the part by laser heating.

One or more embodiments of the invention describe a method of fabricating a mirror, comprising (a) processing an ingot comprising bulk metal glass (BMG), bulk metal glass composite (BMGMC), or amorphous metal (AM) into a processed ingot including a semi-solid, a thermoplastic, a supercooled liquid, or a consolidated amorphous powder. (b) pressing the processed ingot between a first mold and a second mold, wherein the processed ingot is molded into a molded part, and: (i) a first shape of the first mold molds a first surface of the processed ingot into a net shape or near net shape of a mirror; and (ii) a second shape of the second mold molds a second surface of the processed ingot into a structure backing the mirror; and (c) releasing the molded part from the first mold and second mold, wherein the structure backing the mirror supports the mirror and provides the mirror with one or more of the following: increased stiffness, reduced density, and a mechanism for fixing the mirror in a mirror assembly.

The second shape of the second mold can mold the second surface of the heated ingot into the structure comprising a cellular, honeycomb, isogrid structure, and/or tabs to hold a mirror, flexures, or another other supporting structure for mounting the mirror to a structural support.

The processing can be such that the processed ingot has a tensile ductility of at least 5% and the molded part has a fracture toughness of greater than 50 MPa*m$^{1/2}$, or at least as high as a mirror consisting essentially of titanium or a titanium alloy.

The processing can comprise heating the ingot into a semi-solid or slurry, or heating the ingot to a temperature between a solidus and liquidus temperature for the ingot, and the pressing can comprise forging.

The processing can comprise heating the ingot into a thermoplastic region, and the pressing can comprise thermoplastic forming (TPF).

For example, the forming of the mirror or mirror assembly can comprise TFP, and one or more of the following (i) the heating of a plate of BMG or BMGMC to a supercooled liquid region (SCLR) using a heated plate and then forming by embossing with a die tool, (ii) the heating of amorphous powder or particles, from 1 micron to 5 mm in diameter, of the BMG or BMGMC into the SCLR and then forming by applying a compacting load to form the mirror or mirror assembly, (iii) the heating of the BMG to any desired viscosity between a glass transition temperature and a crystallization temperature prior to the forming, (iv) the forming by applying between 1-200 tons of pressure to the heated material in the SCLR, to form the part, (v) the heating of an alloy of the material to between 200-500° C. for processing, and/or (vi) the heating of the BMG or AM and the forming by blow molding the heated material into the mirror having a mirror finish.

The processing can comprise heating a powder of amorphous metal and pressing it into a mirror shape in the thermoplastic region.

The pressing step can occur while the processed ingot is at a temperature above a glass transition temperature.

The method can further comprise cooling the molded part to below the glass transition temperature after the pressing and prior to releasing the molded part. The releasing of the molded part can be facilitated by injector pins in the second mold and angling channels that form the structure at a draft angle of at least 3 degrees.

The pressing can comprise casting, die casting, or twin rolling.

For example, the forming of the mirror or mirror assembly can comprise die casting and one or more of the following (i) the heating of the BMG or BMGMC to above its liquid temperature in a crucible, to form a BMG or BMGMC liquid, and the forming comprising pressing the heated BMG or BMGMC into the one or more molds from a shot-sleeve, at a die-casting pressure between 0.1-200 tons, at a processing a temperature between 600-1500° C., and at a flow velocity of the liquid into the molds that is laminar, (ii) the molds comprising a multi-piece mold that includes a mirror-polished part with or without optical curvature, (iii) the multi-piece mold including structural supports for the mirror such as a backing, an isogrid, flexures, tabs or other mounting accessories, (iv) the part having a thickness between 0.1-50 mm, (v) the casting over a mirror-polished insert to form an optical finish of the mirror, and/or (vi) the removing using an injection system to remove the part from the mold without damaging the mold. The die-casting method also includes the variant of counter-gravity casting, which draws molten liquid up from a pool at low flow velocities to create high-finish parts.

For example, the forming of the mirror or mirror assembly can comprise fabrication via twin roll casting (TRC) process, and one or more of the following: (i) feeding one or more sheets of the AMs, BMGs or BMGMCs into the TRC process where wheels emboss or form a surface of the part, (ii) feeding the material comprising thermoplastic or molten liquid into the TRC process to form a mirror or mirror assembly where the wheels provide conductive cooling necessary to form a glassy part, (iii) embossing the sheets of AM or BMG in the TRC process and then cooling the sheets by blowing gas on the material as it exits the wheels, (iv) the forming of a multi-functional part with a smooth top surface and a cellular backing, by having the wheels with different patterns on them, wherein a first wheel has a pattern to impart the cellular backing and a second wheel has a mirror polish to impart the smooth top surface, (v) using the TRC to fabricate the part which is later further formed using another technique for surface finishing, (vi) using the TRC as a continuous process for fabricating large numbers of mirror segments, (vii) using TRC to fabricate larger area mirror segments, (viii) the mirror that is a shaped panel with a thickness between 100 micrometers and 5 millimeters, (ix)

the wheels including a curved wheel to impart a curvature to the part during the TRC process, and/or (x) multiple sets of rolling wheels used during the TRC process to gradually form the part in steps.

The processing can comprise heating the ingot by a capacitive discharge.

The forming of the mirror or mirror assembly can comprise capacitive discharge forming and one or more of the following (i) the heating including discharging between 0.1-25 kJ of energy into a BMG or AM sample using a capacitor bank, (ii) the heating of the material to a supercooled liquid region (SCLR) and the forming is in the SCLR, (iii) the forming of the mirror using forging or squeezing with a polished die tool, (iv) the forming of the mirror using suction or vacuum pressure against a polished tool, (v) the forming of the mirror using a magnetic force to push the material in liquid form up against a mold tool, (vi) the forming of the mirror by blow molding, (vii) the discharging through a plate of BMG, 1-5 mm in thickness, prior to the forming of the part, (viii) the discharging through a sheet of AM, 1-1000 micrometers in thickness, prior to the forming into the part, (ix) the heating of the BMG or AM to 200-1000° C. for processing, (x) the heating including fully melting the BMG or AM alloy before processing the material, (xi) the forming of the mirror or mirror assembly by discharging and injection casting a rod of the BMG material, and/or (xii) the forming of a mirror surface and a backing structure in one heating and processing step.

The method can further comprise treating the first surface of the molded part with a localized heating technique, or grinding or polishing the near net shape to the net shape.

An optical surface or curvature of the mirror is obtained through a localized surface treatment of a surface of the part, comprising one or more of the following (i) the forming by pressing a heated die tool onto a surface of the part to locally heat and smooth the surface, (ii) the heating of the surface using a localized discharge of energy and then the forming by pressing the surface with a die tool, (iii) the heating comprising locally heating the surface using Radio Frequency (RF) heating and then the forming by pressing the surface with the die tool, (iv) the heating by locally heating the surface using an ultrasonic pulse and then the forming by pressing the surface with the die tool, and/or (v) the heating by locally heating the surface using friction and then pressing the surface with the die tool.

The second mold can comprise channels and the BMG, BMGMC, or AM can at least partially fills channels during the pressing.

The method can further comprise selecting a size of the molds, increasing one or more of a pressure during the pressing and a width of the channels, and/or reducing one or more of a velocity and viscosity of the BMG, AM, or BMGC in the molds, such that: (i) the mirror has a reflectivity of at least 80% at a wavelength of 9 micrometers or a surface roughness of at least 0.1 micrometers over a circular aperture with a diameter of at least 4 inches, (ii) the BMG, BMGMC, or AM at least fills the channels to a depth of at least 3 millimeters and the channels (and the cellular structure walls) have a thickness of less than the depth, and (iii) the cellular structure reduces a volume of the mirror by at least 50% and increases a stiffness of the mirror by at least a factor of 2, as compared to the mirror with a solid backing, or the area of each hole in the cellular structure is at least 0.1 square inches, and (iv) an aperture of the mirror has a diameter of at least 4 inches.

The first shape and the second shape of the molds can be such that the mirror is curved and a radius of curvature of the mirror is at least 5 inches.

The final mirror shape can range in size from 100 micron to >12 inches in width.

One or more embodiments of the invention describe a method of fabricating a mirror, comprising joining multiple BMG, AM, or BMGMC parts to form a mirror, wherein the joining (e.g., by spot welding) is such that no joint or thermally affected zone remains in the mirror and the mirror has a uniform coefficient of thermal expansion.

The forming of the mirror or mirror assembly can include joining multiple parts, wherein at least one of the multiple parts comprises the AM, BMG or BMGMC, the method including one or more of the following (i) the joining is done by spot welding the AM, BMG or BMGMC parts together such that no joint or heat-affected-zone remains in a junction between the parts, (ii) the joining is done by laser welding, (iii) the joining is done by friction welding, (iv) the joining is done by epoxy or brazing, (v) the mirror and the structural backing fabricated separately and then joined together, and/or (vi) the joining of the mirror and mounting elements together.

BRIEF DESCRIPTION OF THE DRAWINGS

Referring now to the drawings in which like reference numbers represent corresponding parts throughout:

FIG. 4(a)-(d) illustrate an apparatus for semi-solid processing of BMG composites (taken from [2]), wherein the apparatus can be used to heat the AM or BMG in one or more embodiments of the invention, and the higher viscosity of BMG composites allows for them to be formed in this method whereas a single-phase BMG would splatter.

FIGS. 10(a)-(d) and 11(a)-(b) illustrate a BMGMC mirror fabricated using the semi-solid forging technique and apparatus according to one or more embodiments of the invention, wherein the final part has curvature and an isogrid backing.

FIG. 11(a) and FIG. 11(b) illustrate the BMGMC isogrid made by filling the grooves/channels in the isogrid mold, cast in a single processing step using semisolid forging, according to one or more embodiments of the invention (FIG. 11(b) is a close-up view).

FIGS. 12(a)-(d) show a BMGMC mirror fabricated to a near net shape using semi-solid forging, and hand-polished to a 0.02 micron finish, according to one or more embodiments of the invention.

FIG. 13 illustrates a metal mirror mount holding a BMG mirror, fabricated according to one or more embodiments of the invention.

FIGS. 18(c)-(d) illustrate an embossed BMG plate and a dime that has been embossed in a BMG composite, according to one or more embodiments of the invention.

FIG. 25 illustrates a schematic TTT diagram illustrating processing methods of BMG formers, taken from [6].

Figure 27A:
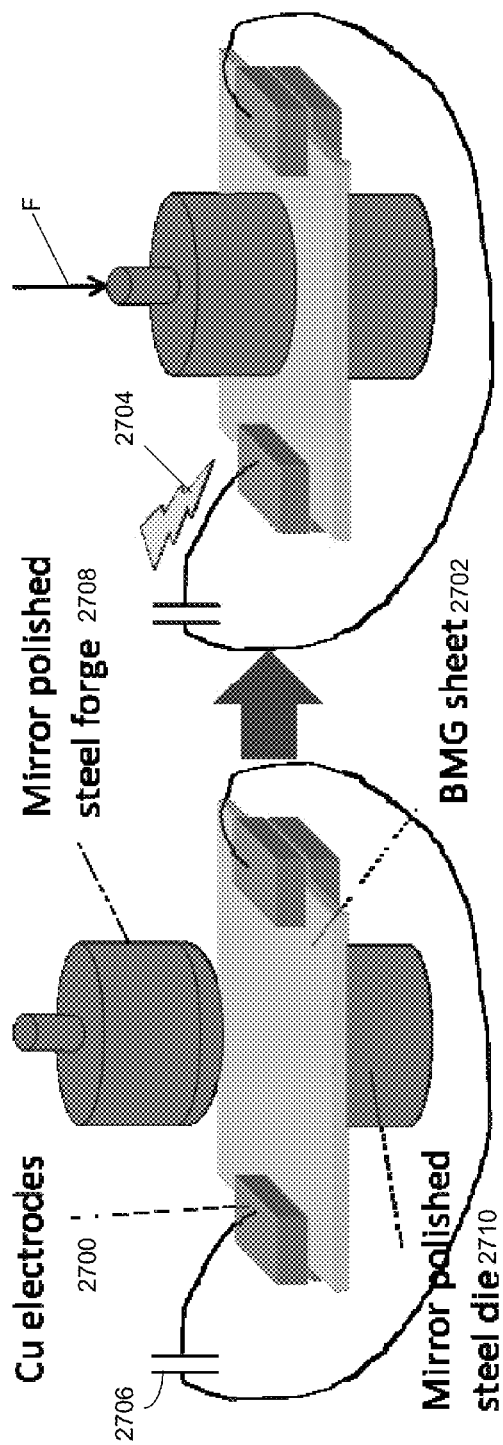
FIG. 27(a) illustrates a Rapid Discharge Forming (RDF) apparatus, where a plate of AM or BMG can be rapidly heated and forged, suction cast, or magnetically formed into a mirror, according to one or more embodiments of the invention.
Figure 27B:
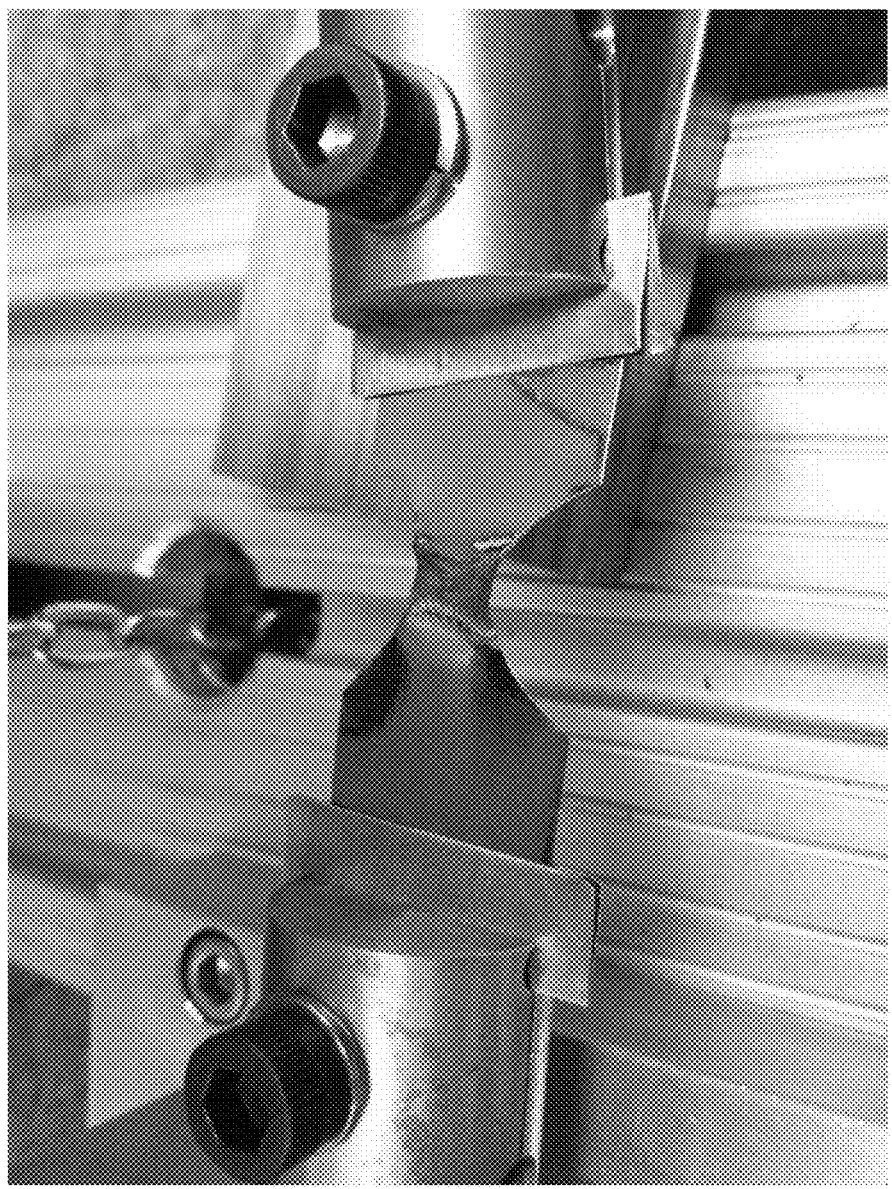
FIG. 27(b) illustrates capacitive discharge through a sheet of an AM, according to one or more embodiments of the invention.
Figure 27H:
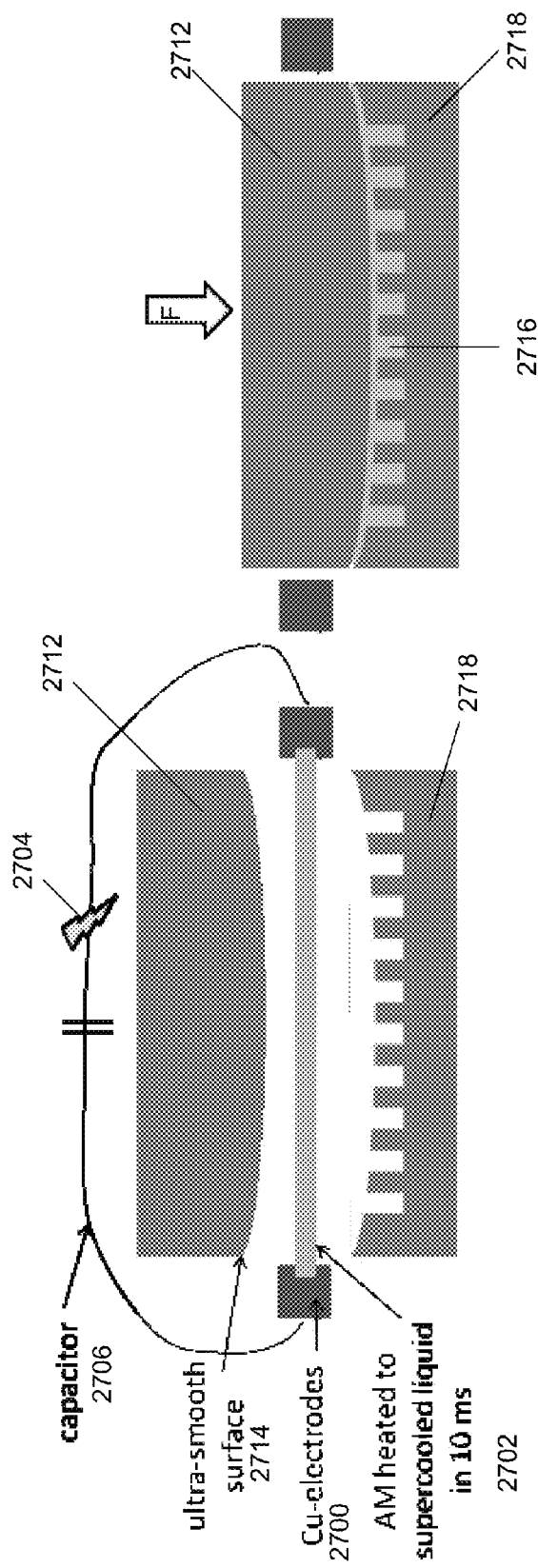
FIG. 27(c)-(g) illustrate arc melting followed by suction casting (FIG. 27(c)) and tilt casting (FIG. 27(d)) to cast 1 inch diameter plates of BMGs with near-optical finish without any polishing, according to one or more embodiments of the invention.

FIG. 27(h) shows a side view of an apparatus for Capacitive Discharge Forming AM, BMG and composites into mirrors, according to one or more embodiments of the invention.

Figure 28:
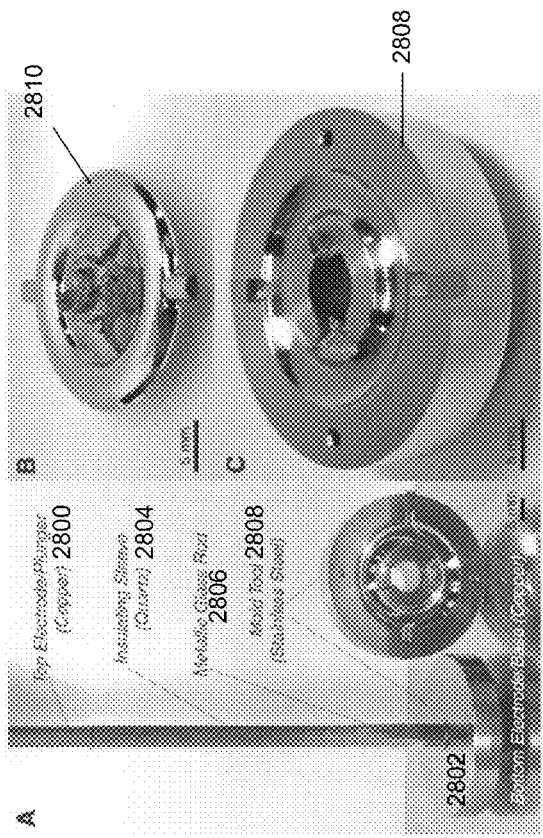

FIG. 28 is a photograph of an apparatus for capacitive discharge heating, where a BMG part is heated to a processing temperature in milliseconds using a capacitive discharge. (taken from [7]).

Figure 29:
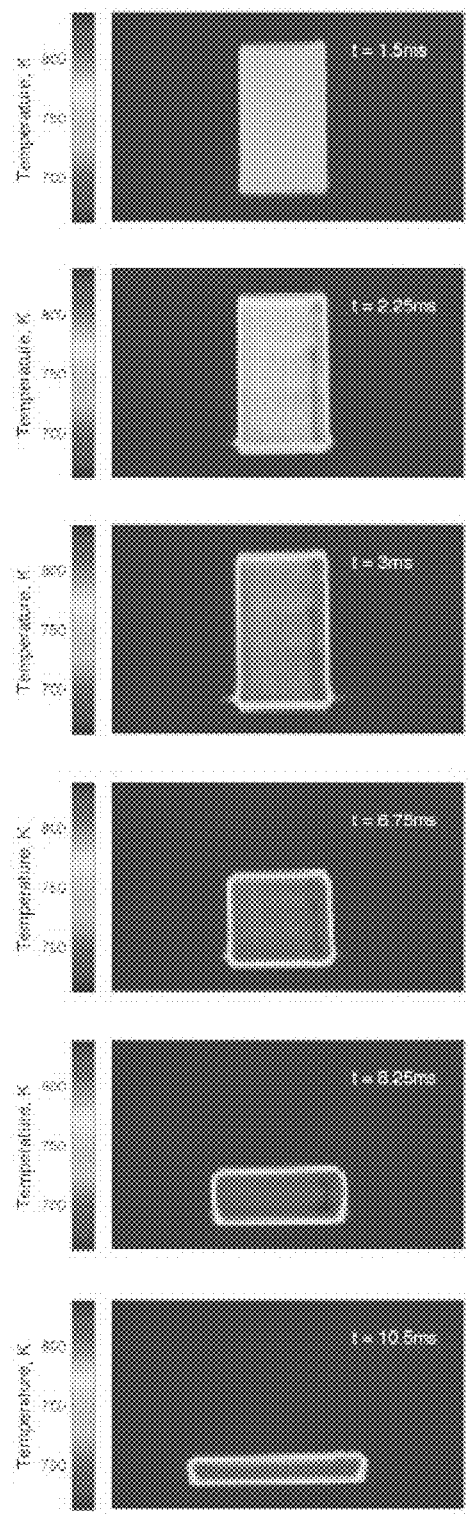

FIG. 29 illustrates the temperature of a part as a function of time, during rapid discharge forming (taken from [7]).

Figure 30:
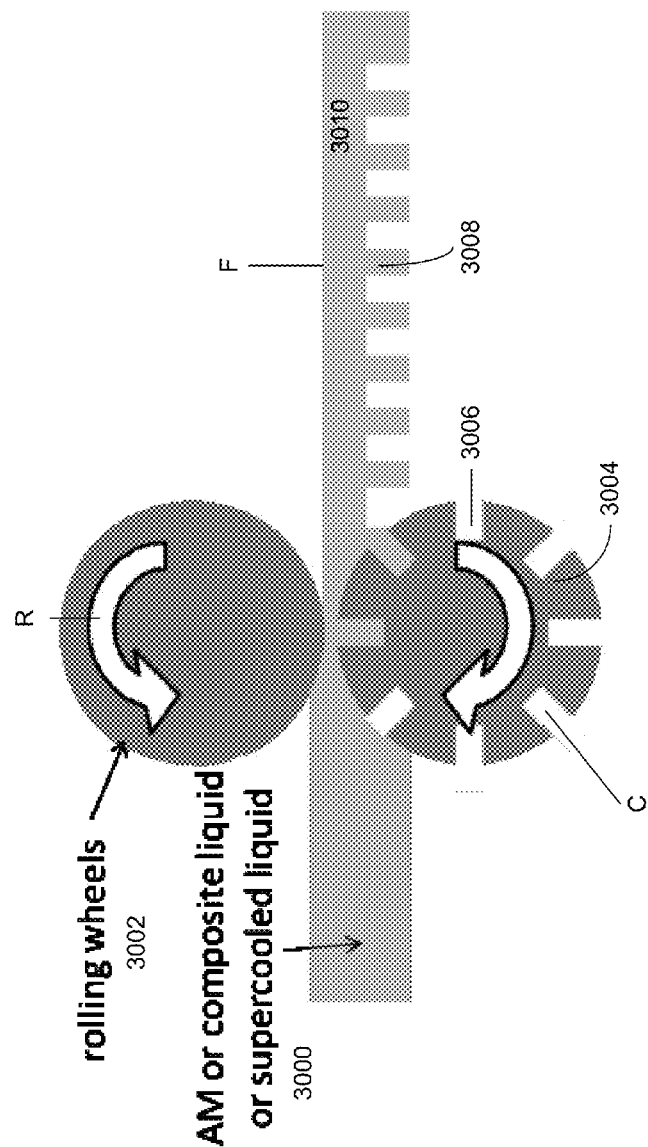

FIG. 30 illustrates twin roll casting of AMs and composites into a mirror, according to one or more embodiments of the invention.

Figure 31:
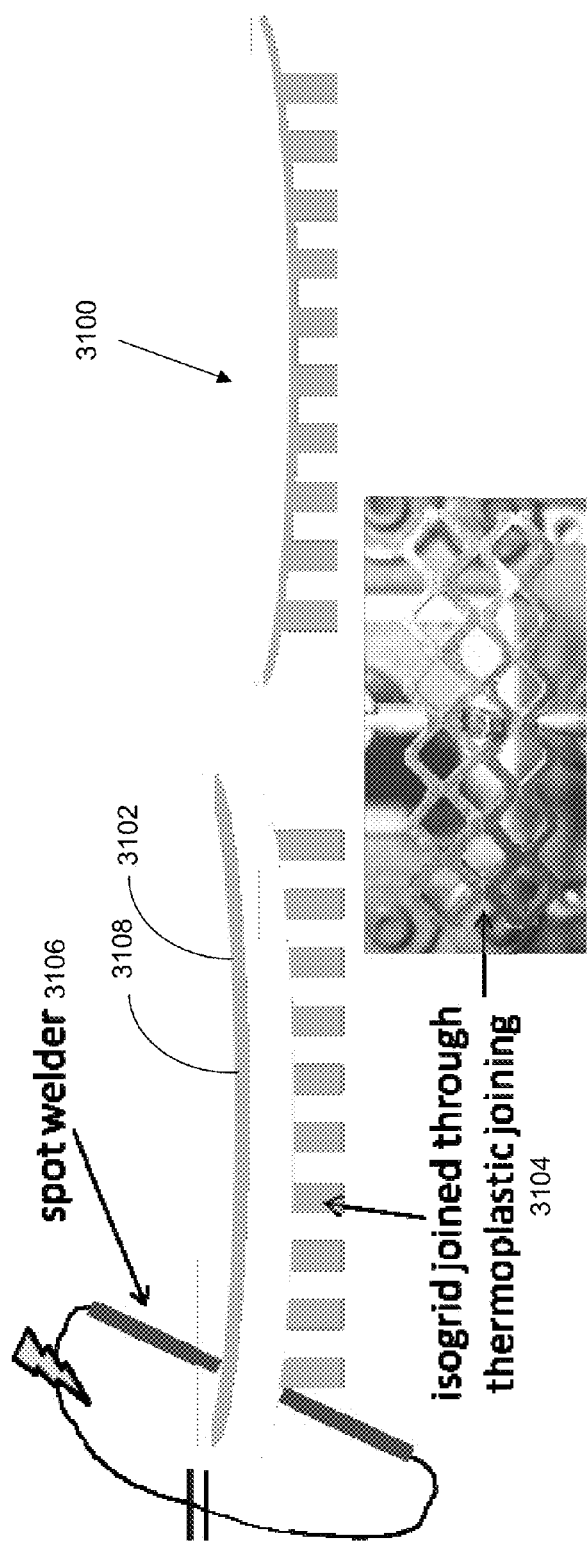

FIG. 31 illustrates assembly of AM and composite structures into a mirror, according to one or more embodiments of the invention.

Figure 32A:
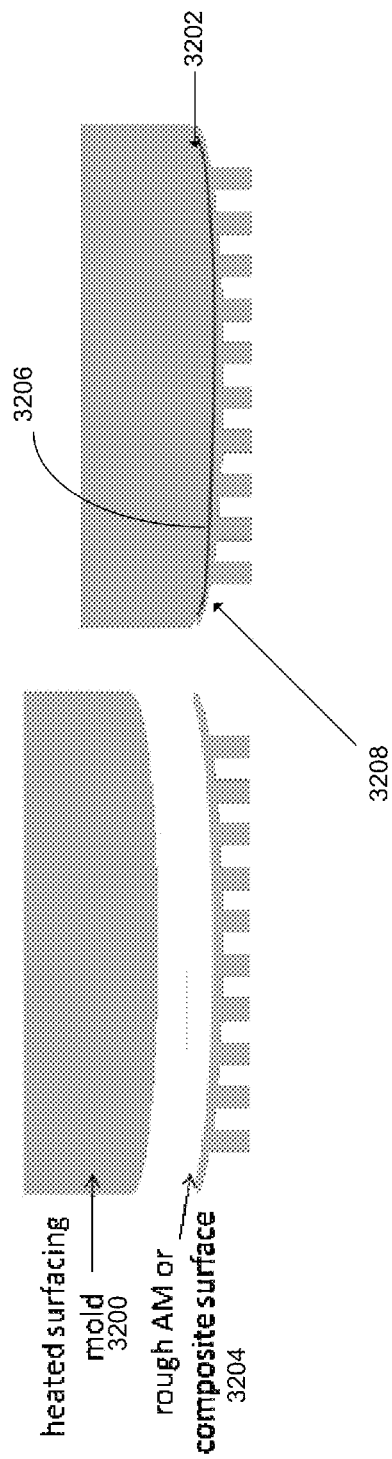

FIG. 32(a) shows thermoplastic surface treating to create mirror finish according to one or more embodiments of the invention.

Figure 32B:

FIG. 32(b) illustrates an example of a BMG finishing technique using a heated graphite forming mold, according to one or more embodiments of the invention.

Figure 33:
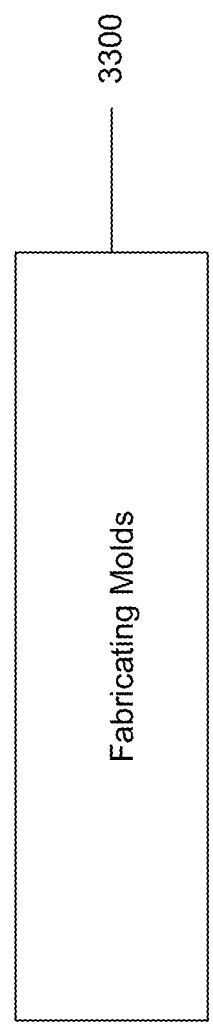

FIG. 33 illustrates a method of fabricating a mold, according to one or more embodiments of the invention.

Figure 34A:
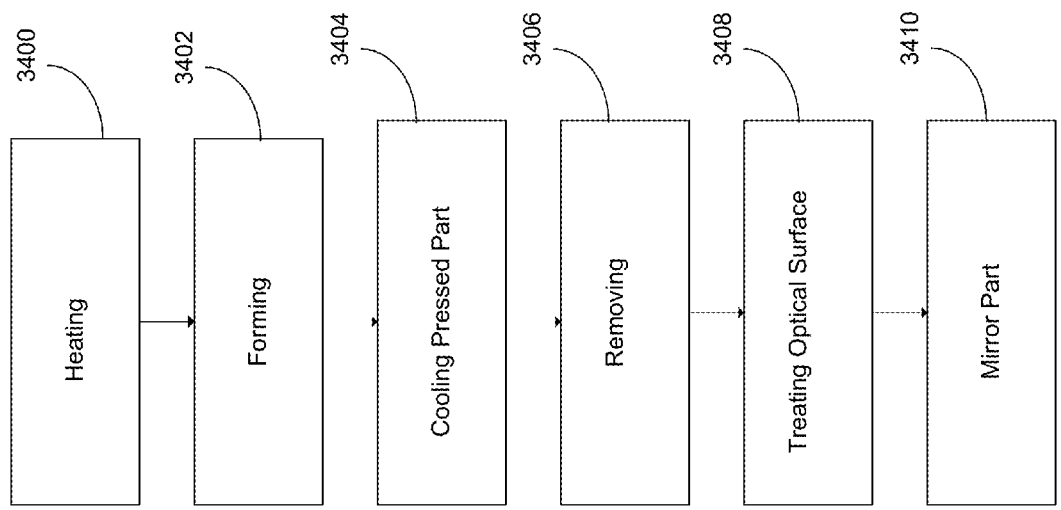

FIG. 34(a) illustrates a method of fabricating an AM or AM composite mirror, according to one or more embodiments of the invention.

Figure 34B:
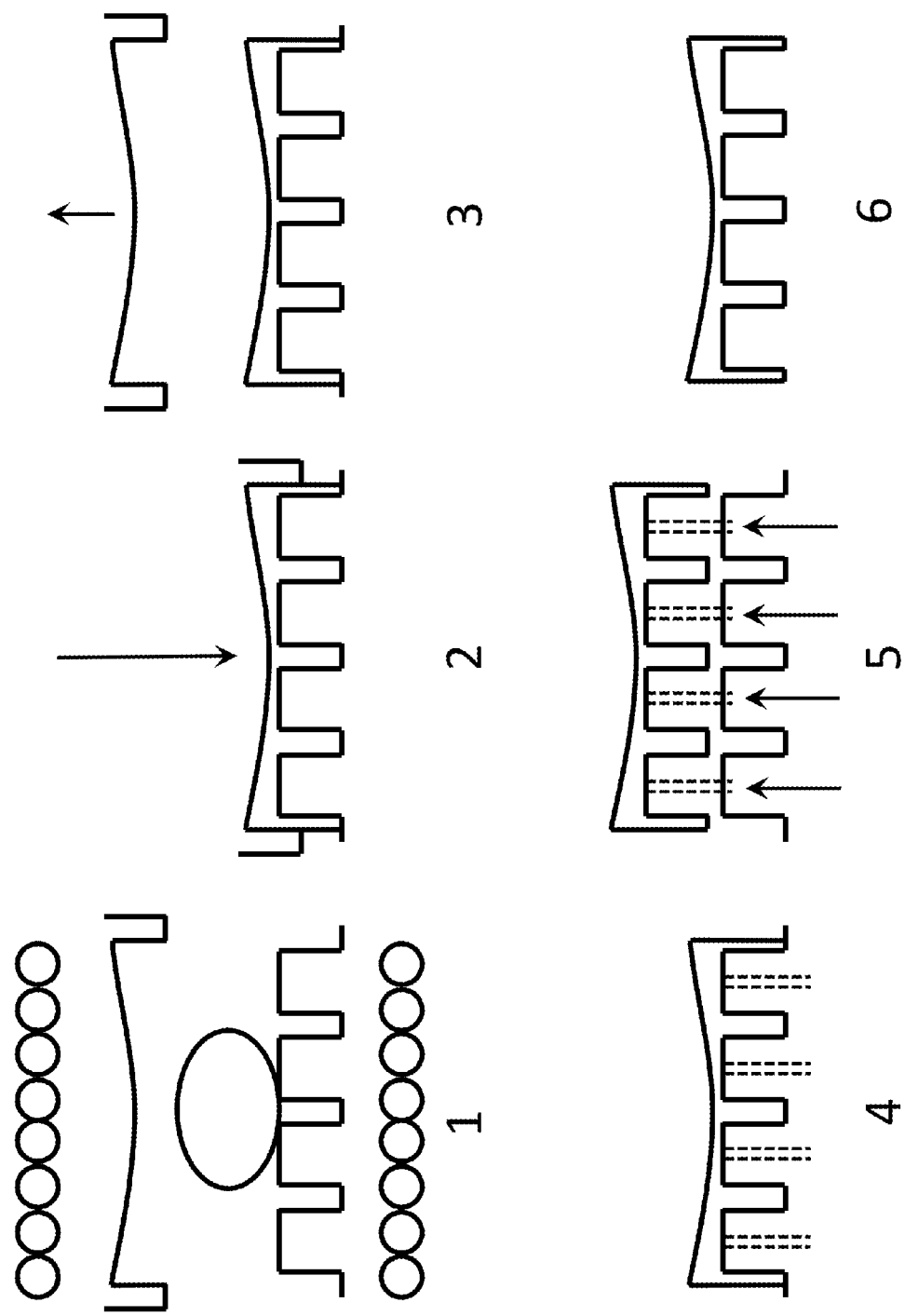

FIG. 34(b) illustrates a 6 step process for fabricating a mirror assembly with structural backing, according to one or more embodiments of the invention.

FIG. 35 illustrates a method of depositing BMG onto a mirror, according to one or more embodiments of the invention.

FIG. 36 illustrates a method of joining multiple BMG parts to form a mirror, according to one or more embodiments of the invention.

FIG. 37-42 illustrate ways of fabricating the isogrid backing of mirrors, wherein one or more embodiments of the current invention provide improvement(s) on the ways illustrated in FIG. 37-42.

Figure 43A:
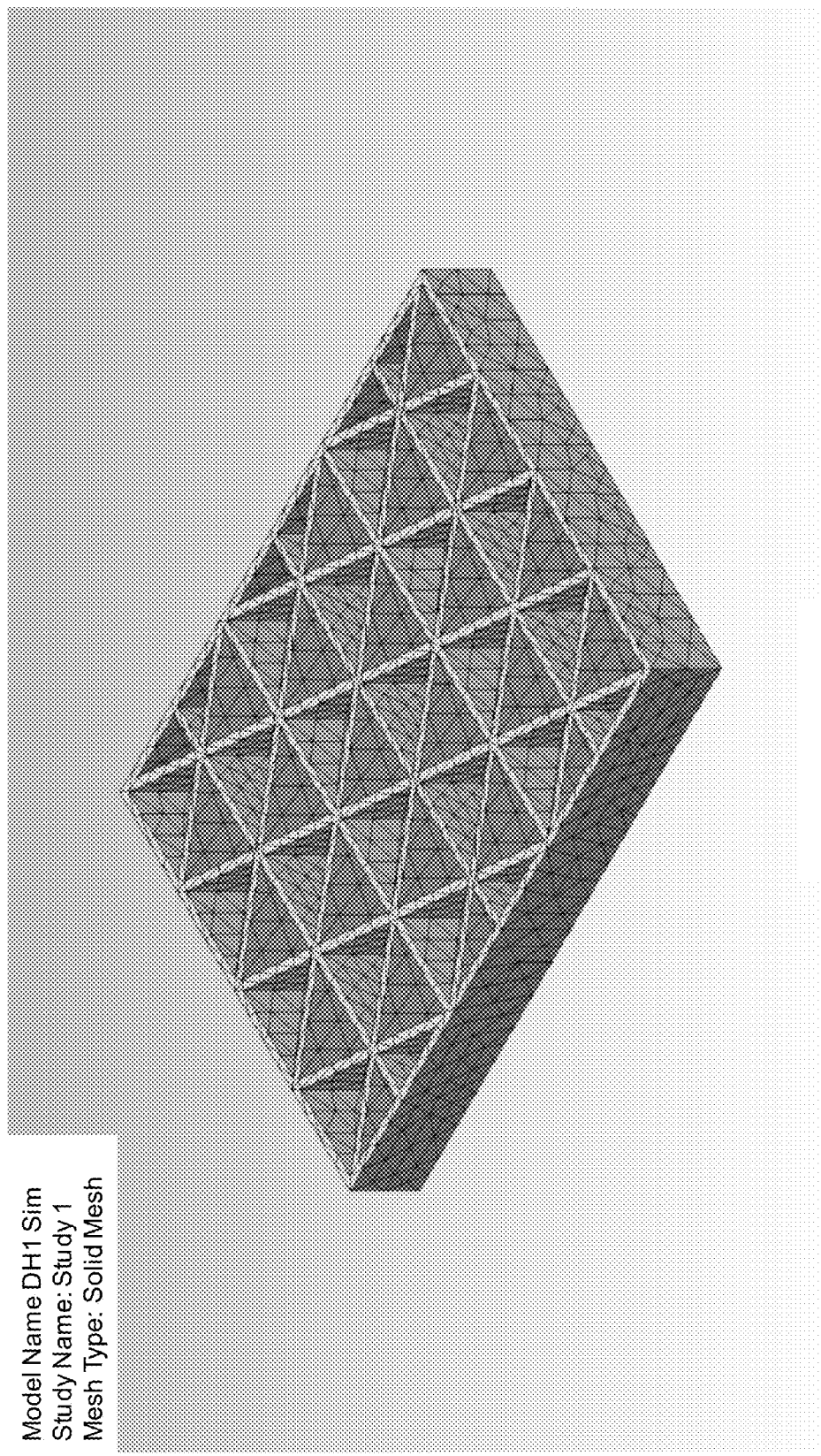

FIG. 43(a)-(b) illustrates finite element modeling of an isogrid mirror structure to demonstrate the increased stiffness obtained by the structure fabricated according to one or more embodiments of the invention.

Figure 44:
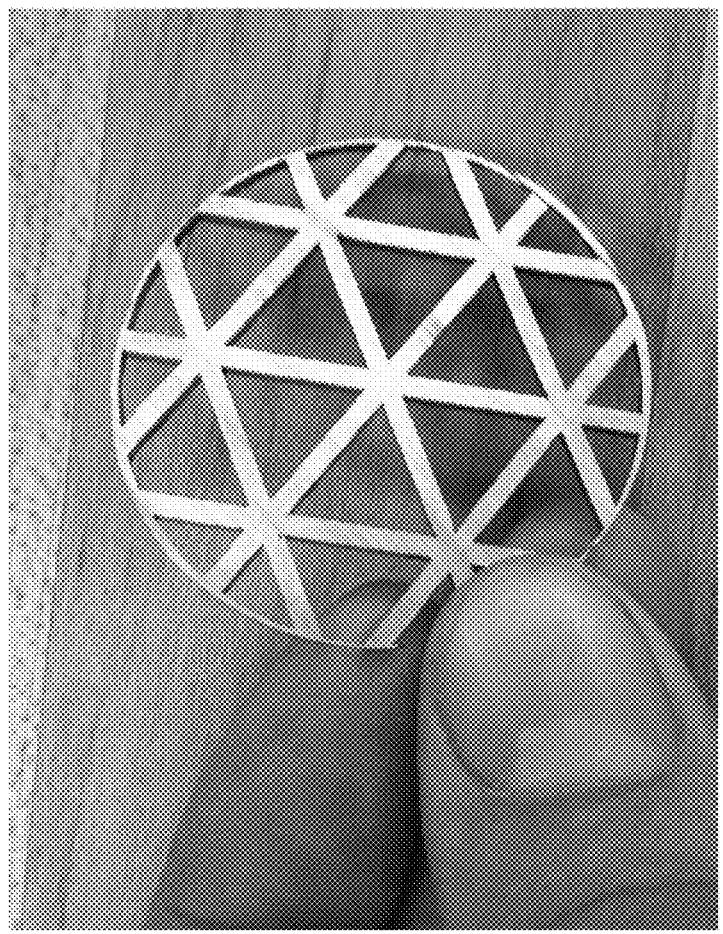

FIG. 44 illustrates a free standing BMGMC isogrid structure fabricated in one casting process, according to one or more embodiments of the invention.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

One or more embodiments of the present invention disclose the fabrication of mirror assemblies from Amorphous Metals (AMs), Bulk Metal Glasses (BMGs) and Bulk Metal Glass Matrix Composites (BMGMCs). This means that the final part can have a mirror surface with specified curvature, a net or near-net shape, a coated or polished mirror surface, or an opto-mechanical fixture or mechanism as the backing. This could include an isogrid, flexures, mirror mounts, bolt holes, other fastening devices etc. The different concepts for mirror assemblies are described below.

Figure 1A:
FIG. 1(a) shows AM composites comprising soft bcc dendrites in a glassy matrix which can be used for toughening a BMG or to control the thermal expansion coefficient of the final mirror.

I. Co-Formation or Single Process Formation of the Mirror Optical Surface and Structural Mechanism FIG. 1(a) shows BMG composites can comprise soft body center cubic (bcc) dendrites in a glassy matrix, and thereby have ductility and large fracture toughness. The microstructure is useful for processing because the microstructure gives imparts a larger viscosity on the liquid which prevents splashing during forming. The composite structure can also be used to tailor thermal expansion by changing the thermal expansion coefficients of the dendrites or the matrix.

Figure 1B:
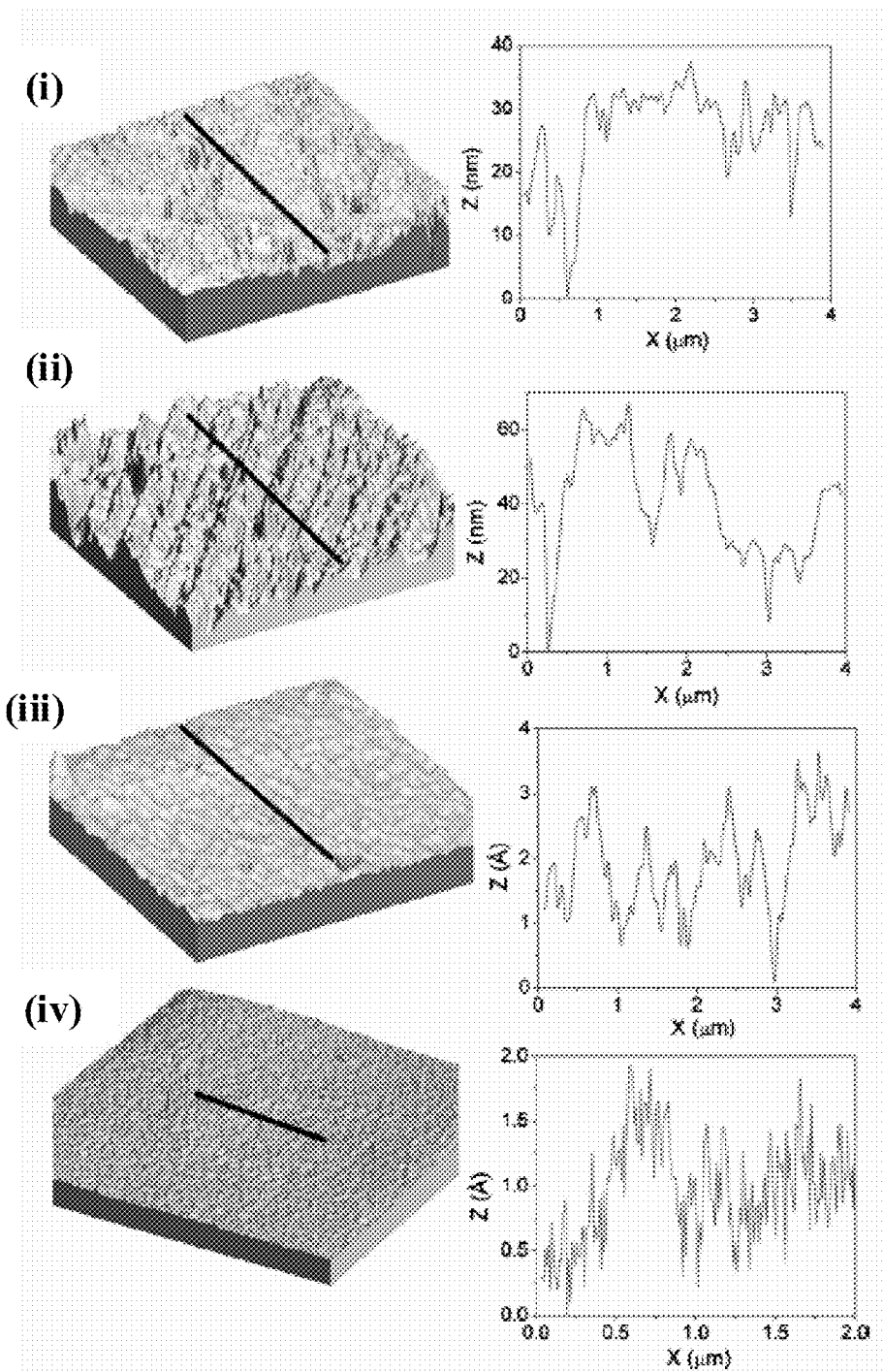
FIG. 1(b)(i)-(iv) and 1(c)(i)-(iii) (taken from [1]) illustrate that AMs can be formed into surfaces with angstrom roughness using a one-step process, wherein one or more embodiments of the invention describe the process could be extended to include forming curvature, a net-shape, a backing, and mounting features along with the surface finish.
Figure 1C:
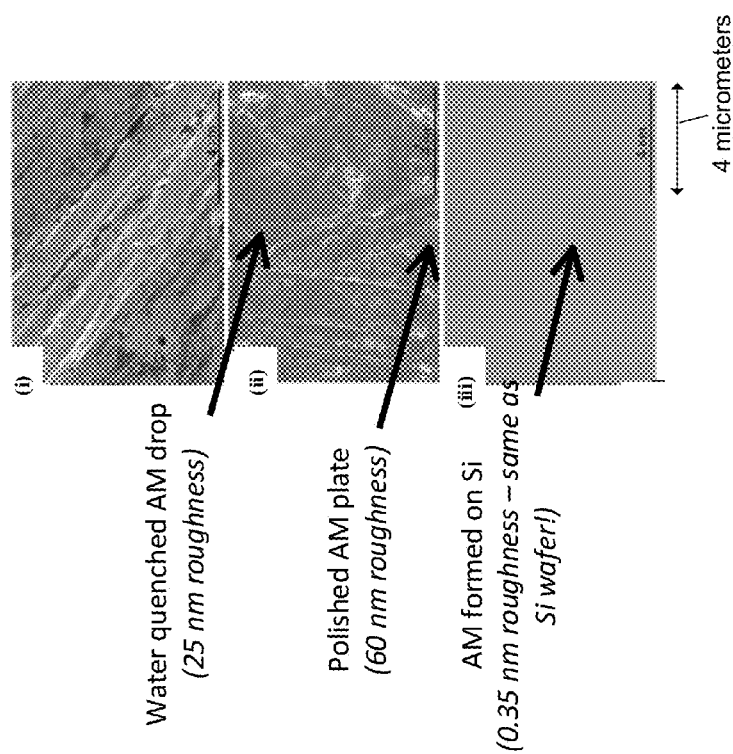

BMGs can be fabricated into parts that have a perfect optical surface through Thermoplastic Forming (TPF), Semi-Solid Processing, or Casting from the Liquid, since BMGs have no crystal structure and therefore no limit in smoothness. For example, FIG. 1(b)(i)-(iv) and 1(c)(i)-(iii) (taken from [1]) illustrate that AMs can be formed into surfaces with angstrom roughness, better than any mirror that is ground or polished.

By extension, BMGs can therefore be fabricated into mirrors that have a perfectly smooth, optical surface and the correct curvature for the intended use. BMGs can also be fabricated into cellular structures that have high stiffness and low density, as with an isogrid structure. The BMG mirror can also be made to a net shape with all of the mounting accessories included in the casting and can be coated with other materials to increase the surface reflectivity.

Figure 2:
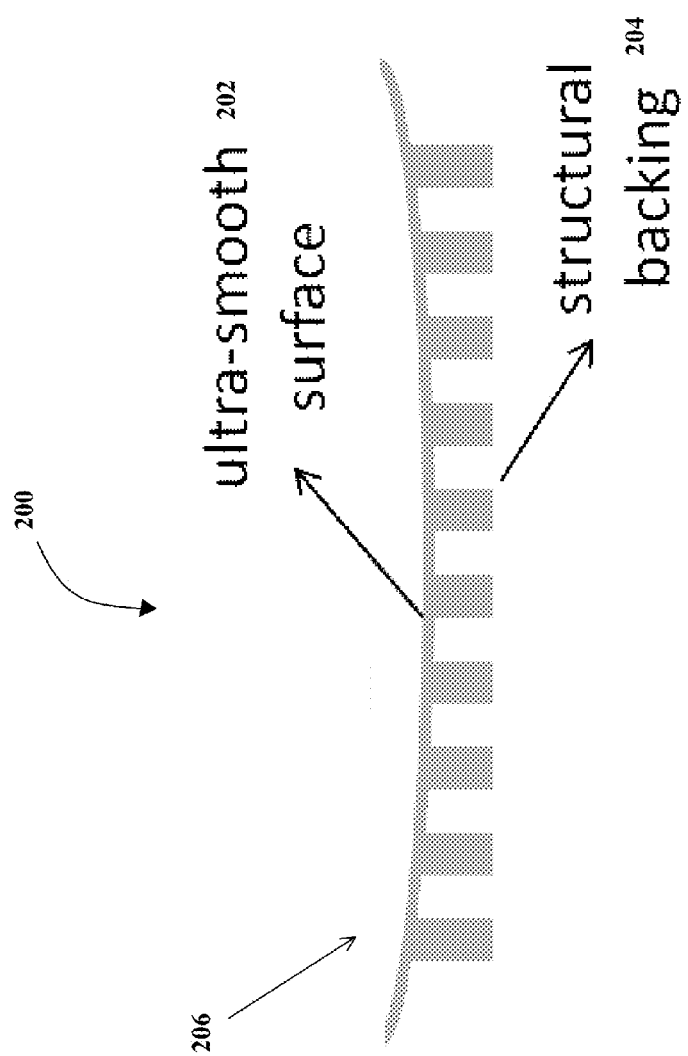
FIG. 2 shows an optical mirror with an ultra smooth surface that has a high-stiffness and low-density isogrid backing, according to one or more embodiments of the invention.

One or more embodiments of the present invention combines these two processes (optical surface formation and structural backing formation) in one processing step to create an optical mirror 200 with an ultra smooth surface 202 that has a high-stiffness, low-density isogrid backing 204 (or some other structural mechanism), as illustrated in FIG. 2. The final part 200 can be created to a net-shape 206 without having to do any machining, polishing or other fabrication step to form a mirror assembly. This eliminates the need for diamond turning or polishing of the mirror surface 202, machining of the isogrid 204 or mechanism structure, or connecting the mirror to the structure to form the assembly (which would have been done through bolting, welding or brazing). The mirror assembly may also be formed into a near-net shape where some trimming, polishing or machining is performed to produce a finished part. In both concepts however, a billet of material is never machined into the final shape 206. A net or near-net shaped mirror assembly can therefore be fabricated in a single processing step (or by the combination of a few processing and joining steps).

Figure 3:
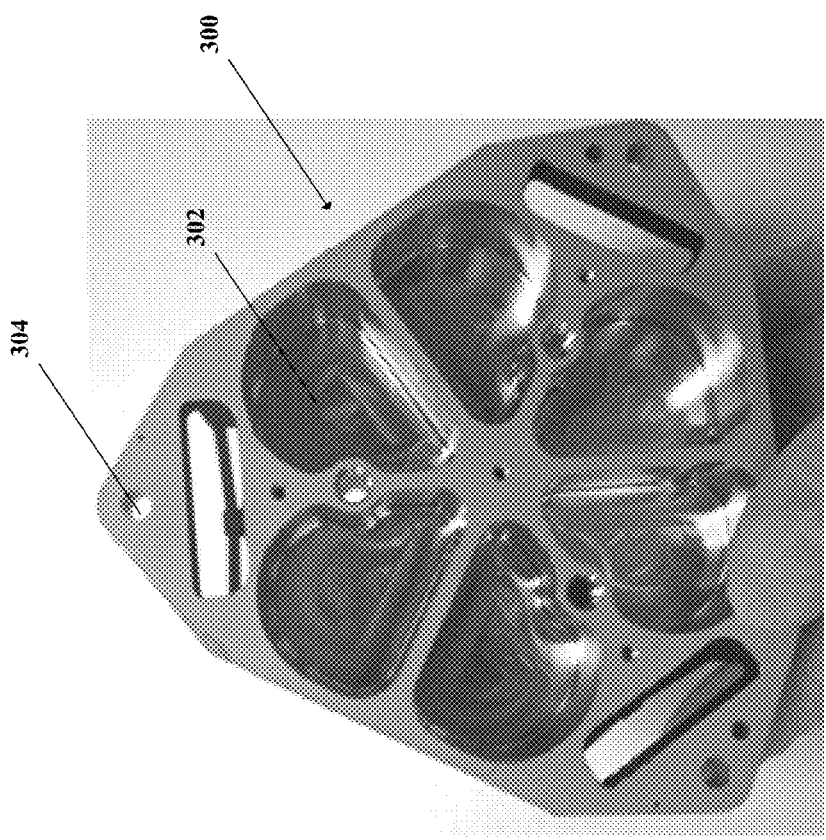
FIG. 3 illustrates an example of an end-game part fabricated by machining a titanium billet at high cost and that can be fabricated using one or more methods of the present invention.

FIG. 3 illustrates an example of an end-game part 300, comprising a single piece mirror assembly 300 machined from a block of Titanium (Ti). In conventional methods, the cavities 302 and bolt holes 304 are milled out, and the part costs tens of thousands of dollars to manufacture (not including the mirror). One or more embodiments of the invention can mold this same part 300 from BMG or AM.

In one or more embodiments, the mirror or mirror assembly can be formed in a single processing step technique. For example, the mirror's optical/reflective surface and structural backing can be formed in a single process, simultaneously, at least partially concurrently, or with at least some time overlap. For example, the mirror optical surface and structural backing formation processes do not both have to finish and/or start at the same time. However, one or more embodiments of the invention are not limited to these examples.

The mirror assembly in a single step process to a net or near-net shape, according to one or more embodiments of the invention, can be completed through a variety of techniques described below.

(a) Semi-Solid Forging of BMGMCs

Semi-solid forging can be used for proof of concept AM composite mirror (aka BMGMCs) assembly, wherein the parts are formed in one step into a net or near-net shape.

In this technique, BMGMCs are used as the mirror assembly and fabrication occurs through a semi-solid forging process. BMG composites are inherently a poor choice for the fabrication of a mirror because the two-phase microstructure prevents an optically smooth surface from being obtained. However, the mechanical properties of these alloys in combination with their ease of processing using semi-solid forging, makes them attractive materials for mirror mounts, isogrids, tabs and flexures. The fabrication of mirrors and assemblies using BMG composites and semi-solid forging is demonstrated here as proof-of-concept, showing that heating and forming can be used to create mirror assemblies in a single-step processing technique. In actual reduction to practice, monolithic BMGs would likely be used in a die-casting setup to form these mirrors. The primary demonstration in this application is the fabrication of a BMG composite isogrid in a single processing step. These isogrids are typically machined from a block of metal at great cost. However, it has been demonstrated here that they can be manufactured without machining, using a casting and ejection process, as detailed in FIG. 34(*b*).

Apparatus

FIGS. 4(*a*)-(*d*) illustrate an apparatus 400 for semi-solidly processing/heating an ingot 402 of AM into a composite or BMGMC. The apparatus 400 comprises an induction coil 404, a hydraulic or pneumatic ram 406, and copper, brass, or steel molds 408 with water cooling 410. The apparatus 400 heats the ingot 402 (comprised of alloy/AM composite) with Radio Frequency (RF) from the Induction coil 404, and applies a load, through the hydraulic or pneumatic ram 406, to the copper molds 408. The copper molds 408 are cooled by the water cooling 410.

FIG. 4(*e*) is a cross-sectional view of an apparatus 400 for performing the semi-solid forging process and casting a part 414. FIG. 4(*e*) illustrates the ingot/alloy 402 is placed between two water-cooled 410 conductive metal molds 412 surrounded by the radio-frequency induction melting coil 404. The ingot 402 is heated into the semi-solid region, and the part 414 is forged by bringing the mold 412 halves together under force F.

FIG. 5(*a*) is a cross-sectional view of an apparatus for performing semi-solid forging of AM composites or BMGMC into a mirror assembly 500, according to one or more embodiments of the invention. FIG. 5(*a*) illustrates the RF induction heating coils 404 for heating during the semi-solid forging of the AM composites/samples 402. Controlled or un-controlled force F is applied by a water-cooled mold 502*a* (having an ultra smooth surface 504 for forming a first surface of the AM composite sample 402 into an optical surface 506 of a mirror) and water-cooled mold 502*b* having channels or grooves C forming an isogrid pattern and that mold a second surface of the ingot 402 into an isogrid 508. The semi-solid forging technique involves heating the AM composite 402 to the semi-solid region and forging. The ingot 402 heats due to the lack of thermal contact with the molds 502*a-b* and the ingot 402 cools after the forging has increased the contact area with the molds 502*a-b*. The final part 500, comprising mirror surface 506 and isogrid 508 backing, is removed from the mold 502*a-b*, using injector pins on the isogrid 508 side (the isogrid walls W/channels C have a>2 degree draft angle needed for mold release). The AM composite formed using this process allows for high toughness, low density and the possibility for tailored Coefficient of Thermal Expansion (CTE).

This semi-solid forging technique uses the heating/BMGMC processing technique from reference [8]. An ingot of Zr, Ti, ZrTi or CuZr based BMGMC is heated to the semisolid temperature region (generally between 800-1200° C.) using RF heating, and before the ingot flows onto the lower mold due to gravity, it is forged using pneumatics or hydraulics into a final shape. Cooling is provided to the molds using water that circulates into the chamber and the processing is done under the slight negative pressure of an inert gas.

FIGS. 5(*b*)-(*d*) show close up photographs of the semi-solid forging setup, according to one or more embodiments of the invention. FIGS. 5(*b*)-(*d*) illustrate RF induction heating induction coils 404 for heating an ingot 402 of AM composite, and molds 502*a-b* that are water-cooled 410. FIG. 5(*d*) illustrates that processing can be done in a casting chamber 510. The processing can also be done in a vacuum to avoid oxidation.

Figure 6A:
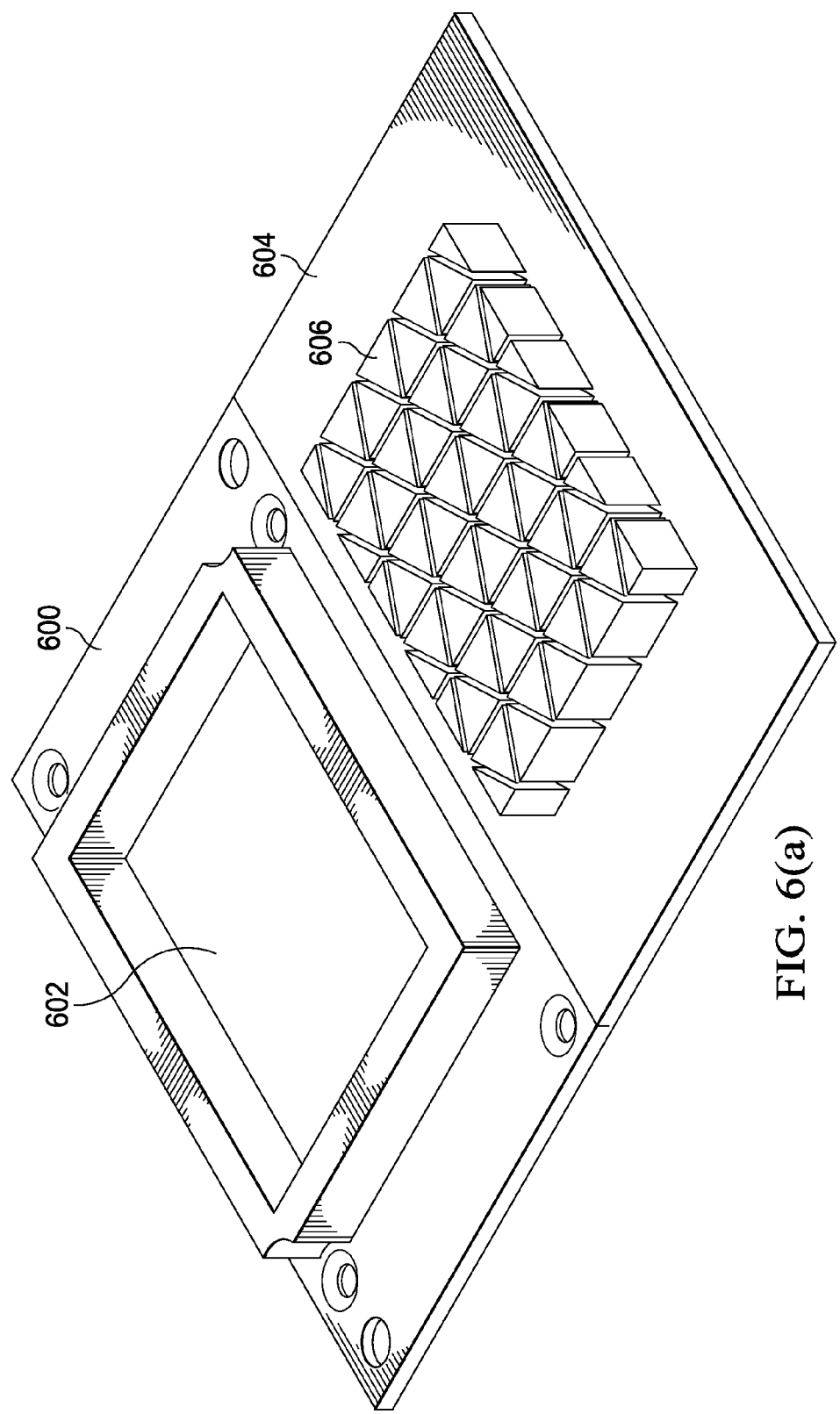
FIGS. 6(a)-(c) illustrate brass molds for molding BMG or BMG composite mirrors, according to one or more embodiments of the invention, wherein a mirror polish and isogrid are integrated into different sides of an interlocking mold.
Figure 6B:
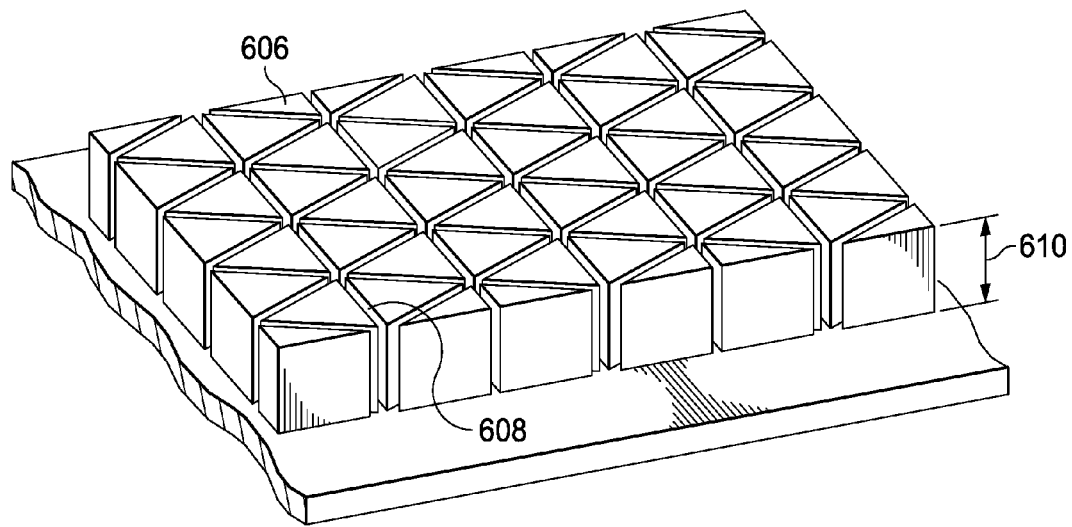
Figure 6C:
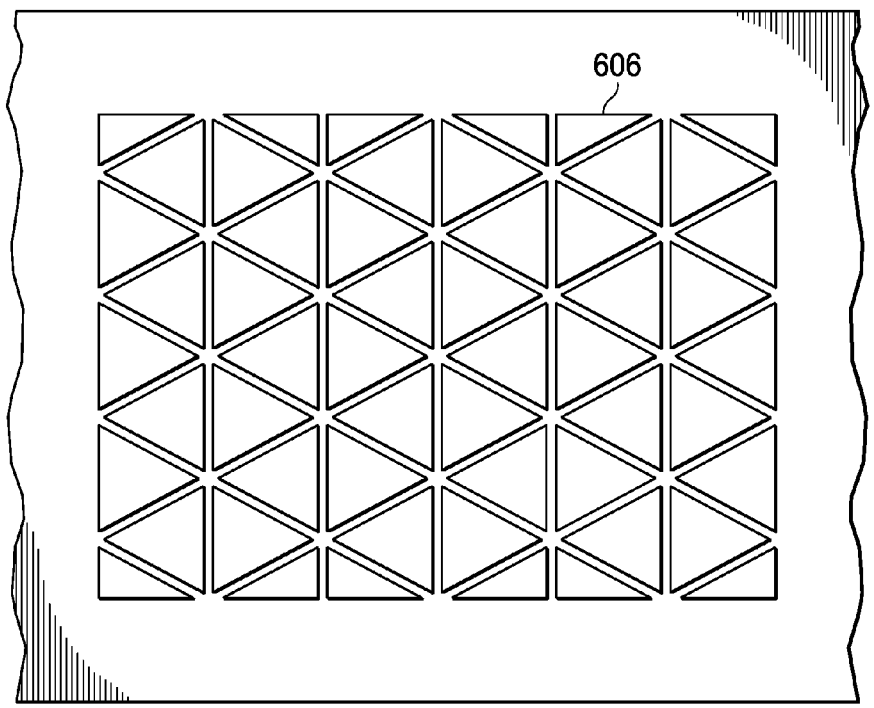

FIGS. 6(*a*)-(*c*) illustrate the top mold 502*a*/600 comprising a polished mirror surface 602 and the bottom mold 604/502*b* having the isogrid cavities/channels 606/C, according to one or more embodiments of the present invention. FIG. 6(*b*) illustrates the top mold 600 made from brass (cheap and machinable) and FIGS. 6(*b*) and 6(*c*) are close up views of the bottom mold 604 comprising an isogrid pattern 606 in a hexagonal array (comprising channels 608 having a depth 610 of 7 mm), designed for a high stiffness/low density part.

The top mold 600 surface 602 is machined to an optical curvature and then polished to a shine. The bottom mold 604 has a negative curvature. The AM composite mirror can then be forged into an isogrid pattern with a walls W having depth 512 (of e.g., 1 mm) on the back of the mirror, and having the flatness of the top mold 600 on the front of the mirror.

Viscosity

Viscosity of the AM or BMGMC alloy 402 in liquid form limits the depth 512 of the isogrid 508. Friction from surface area hinders part release from the isogrid mold 604, 502*b*. As described above, this problem can be overcome by positioning injector pins on the isogrid side (which has a>2 degree draft angle needed for mold release). A normal crystalline metal would not be able to be formed into the isogrid part using a similar processing technique for multiple reasons. First, most crystalline metals melt at very high temperatures and would melt or alloy to the mold material. Lower melting temperature metals are generally soft and would bend or dent when trying to remove from the mold. A BMG that was insufficiently cooled and formed a crystalline structure would be so brittle that it would crack when being removed from the mold. BMGs and BMGMCs have a unique combination of low melting temperatures and high strength, when cooled into a glass, that allows for both complex parts to be cast and the durability needed to remove the part from the mold. This is demonstrated in this disclosure.

Figure 7:
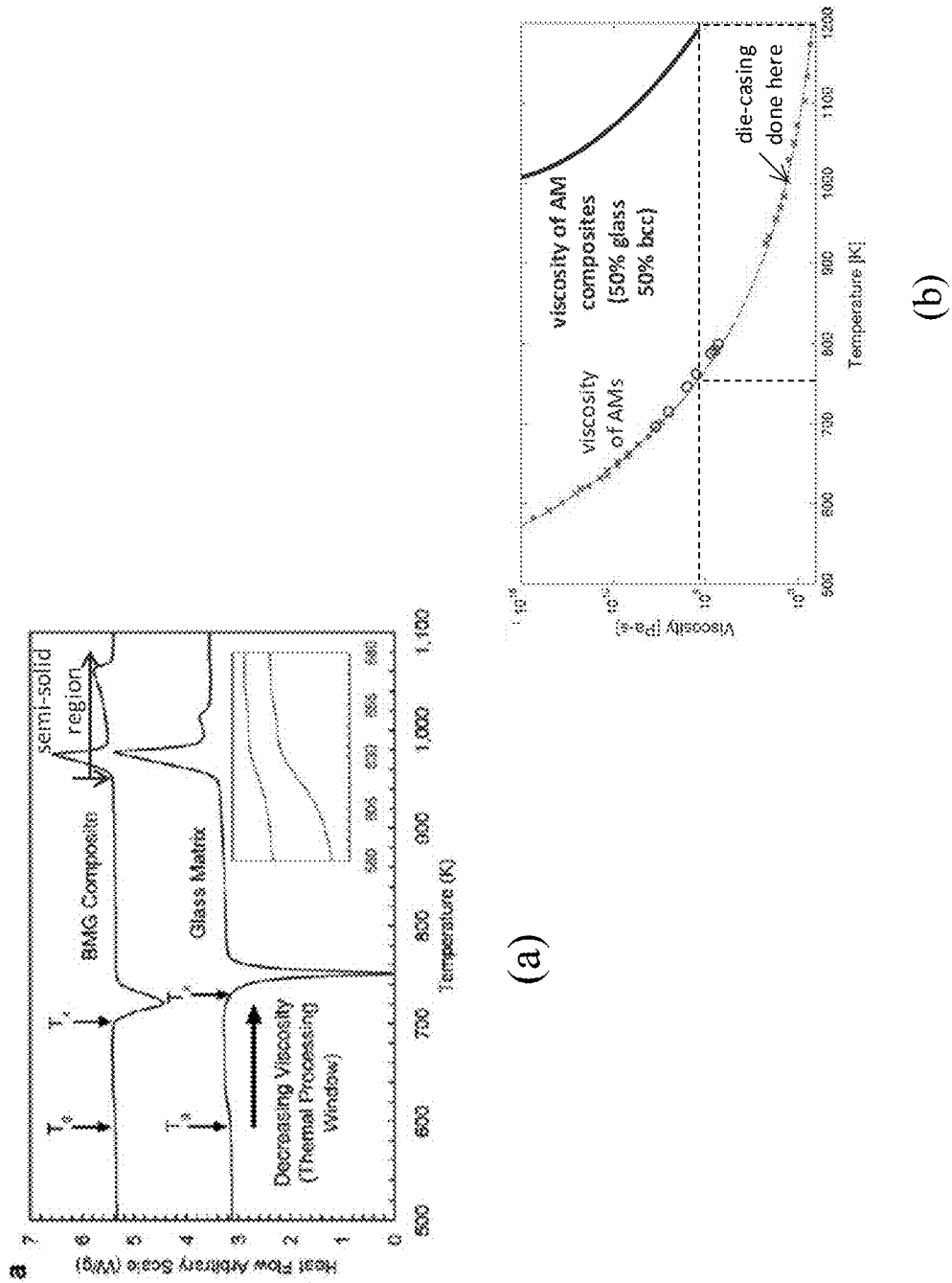
FIG. 7(a) plots heat flow as a function of temperature for a BMG composite and a glass matrix, showing the glass transition temperature Tg, the crystallization temperature Tx, the supercooled liquid region, and semi-solid region (based on [3] and annotated by the inventors)
FIG. 7(b) plots viscosity as a function of temperature for AMs and AM composites (based on [3] and annotated by the inventors), showing BMG composites have higher viscosity when processed.

FIG. 7(*a*) shows AM and BMG composites both have a thermoplastic region. The dendrites make the composites much more viscous, and therefore easier to forge with less splashing.

FIG. 7(b) shows AM composites (50% glass and 50% bcc) have the same viscosity ($10^5$ Pa s) in the semi-solid region (temperature 1200 K) as the AMs in the thermoplastic region (750 K). Pressures and mold filling are the same.

The flow depth for filling the isogrid channels 608 can be described by the Hagen-Poiseuille Equation for mold filling:

$$p = 32v \cdot \eta \frac{L}{d^2}$$

where p=pressure to move a liquid with viscosity, $\eta$, at a velocity, v, through a channel of thickness d, and length 610 (or depth L) of the isogrid grooves C, 608. L during semi-solid forging is given by:

$$L = \frac{pd^2}{32v\eta(T, t)}$$

where T is temperature as a function of time, t.

With thermoplastic forming, viscosity stays constant (T constant) but there is a critical time before the glass crystallizes.

Semi-solid forging operates at a temperature above the solidus, so there is no critical time to crystallize. However, since the mold is cold, the part must be filled before it freezes, hence $\eta(T,t)$.

Figure 8:
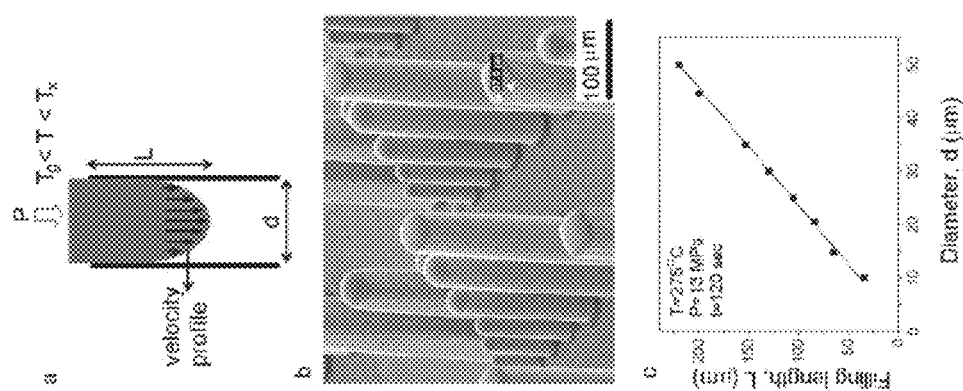
FIG. 8(a) illustrates the velocity profile of a viscous liquid in a channel (taken from [4]), demonstrating how pressure applied to the liquid changes filling depth.
FIG. 8(b) illustrates AM fill length as a function of diameter at a constant pressure. (taken from [4]).
FIG. 8(c) plots filling length as a function of channel thickness d (taken from [4]).

The velocity profile of the AM during semi-solid forging in one or more embodiments can be as shown n FIG. 8(a). FIG. 8(c) plots filling length as a function of channel thickness or diameter d, for small diameters d.

Molded Parts

Figure 4E:
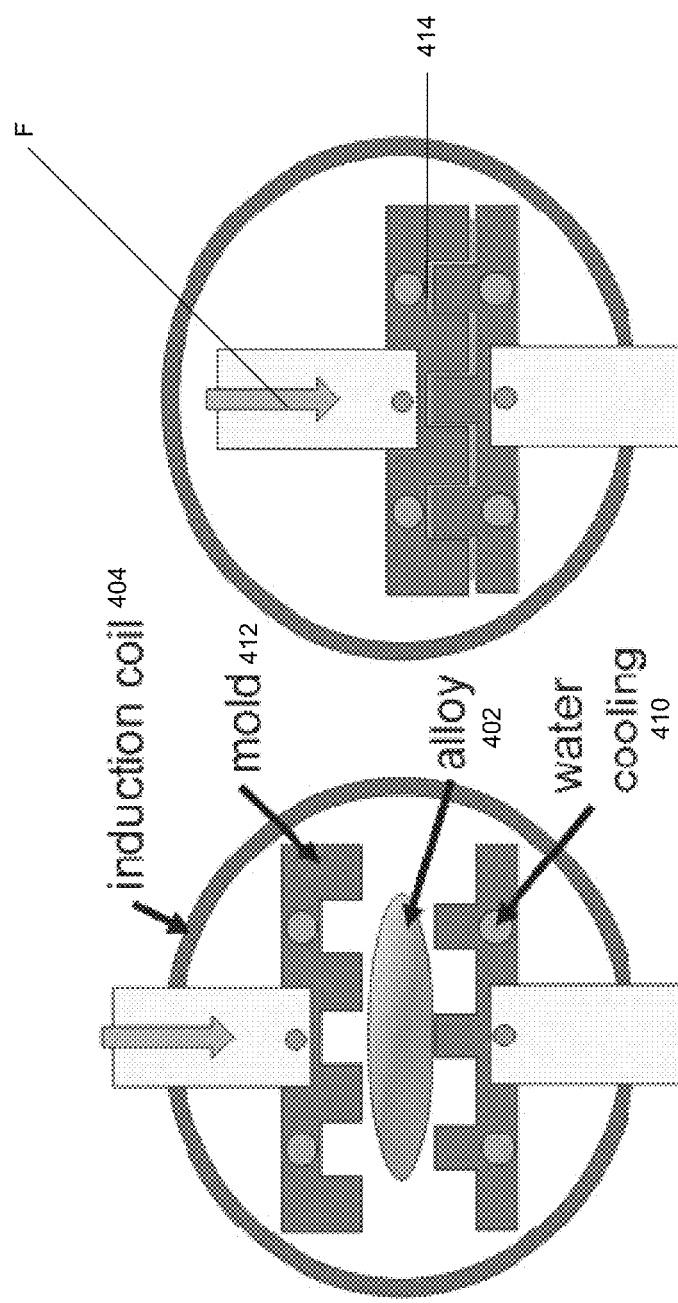
FIG. 4(e) is a cross-sectional view of an apparatus for performing semi-solid processing, forging, and casting a part (taken from [2]), wherein the apparatus can be modified to include molds according to one or more embodiments of the invention.
Figure 5A:
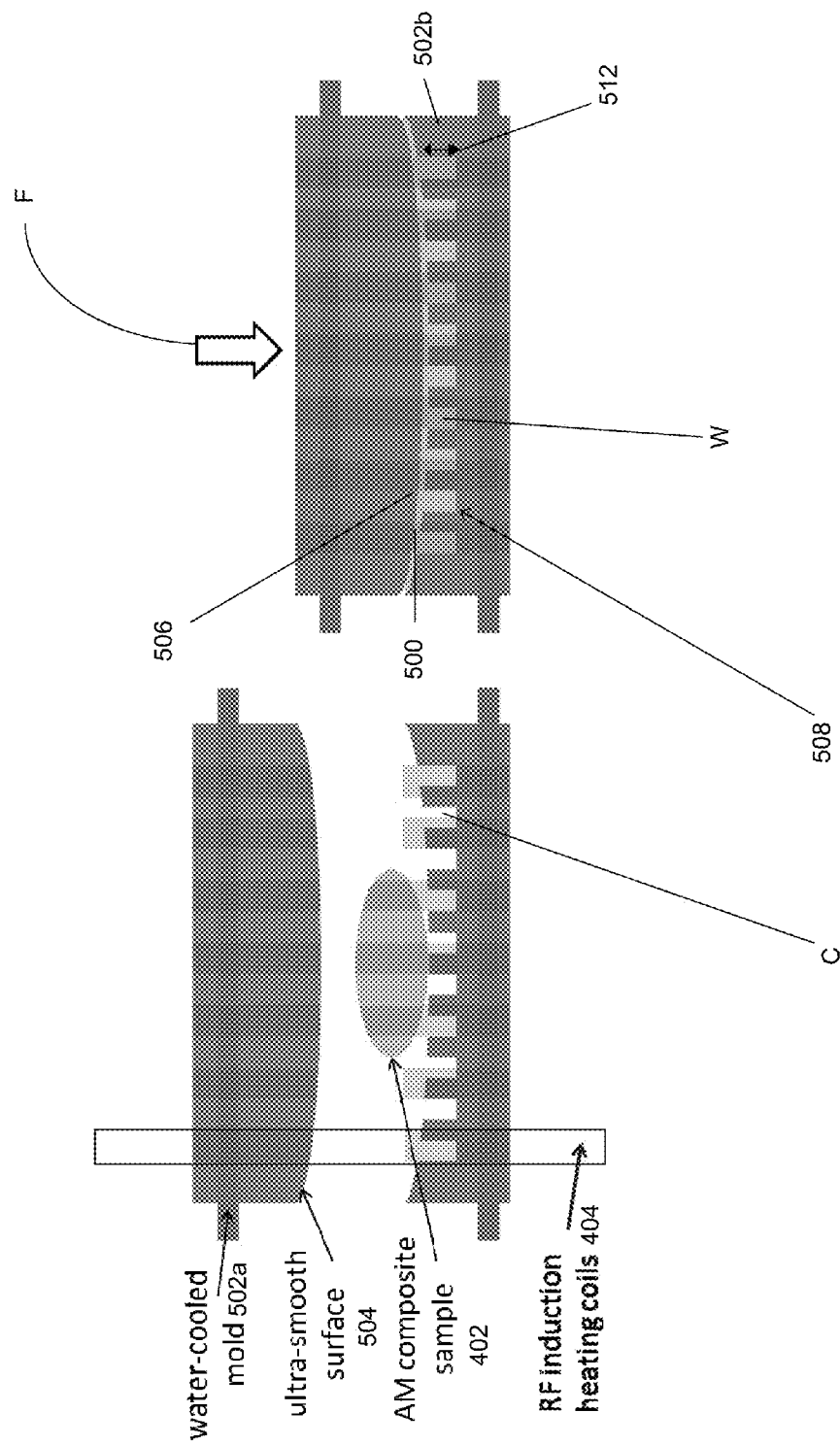
FIG. 5(a) is a cross-sectional view of an apparatus for performing forging of an AM, BMG, or BMG composite mirror, according to one or more embodiments of the invention, wherein an ingot is heated via induction using an RF coil and forged under a load.
Figure 5C:
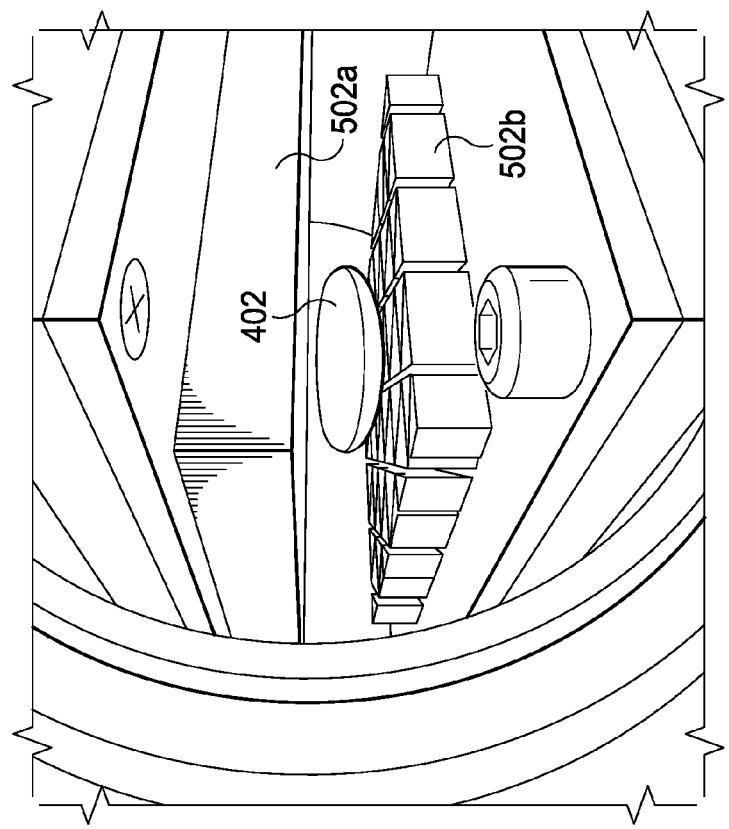
FIG. 5(b)-5(d) illustrate views of the apparatus for performing forging/casting, according to one or more embodiments of the invention.
Figure 5B:
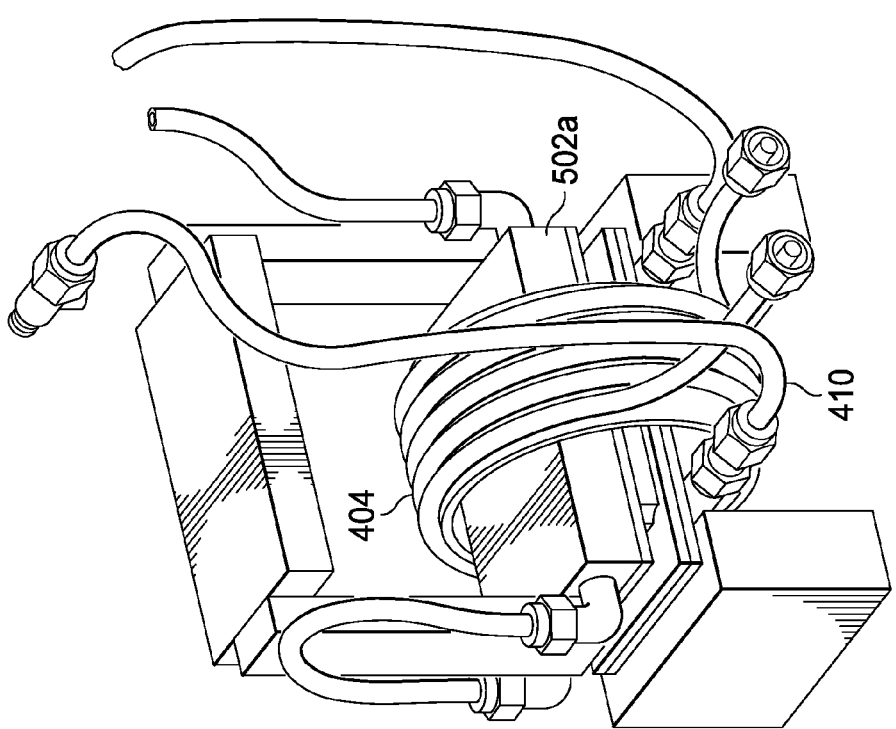
Figure 5D:
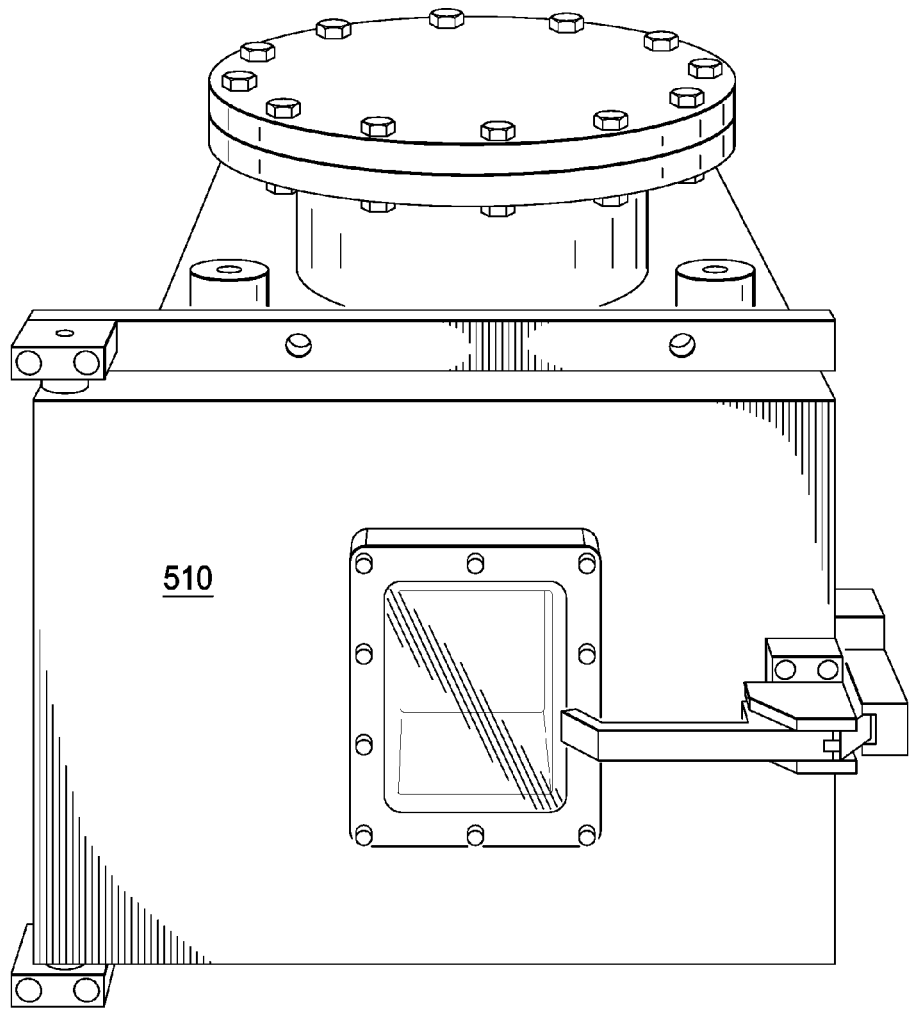
Figure 9:
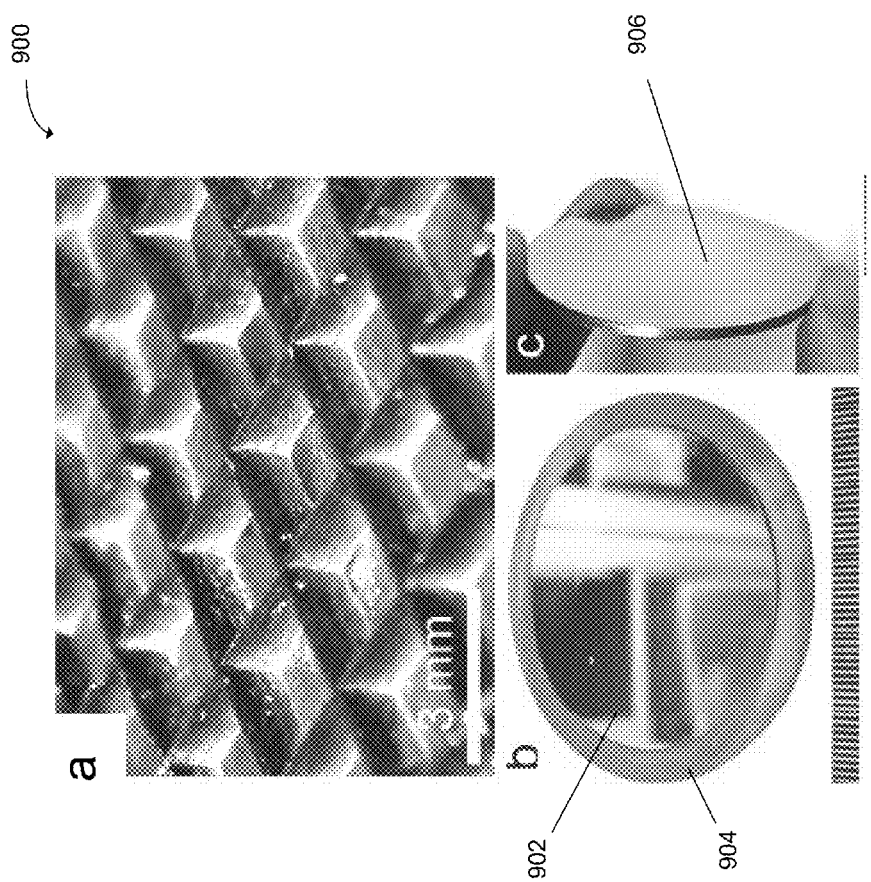
FIG. 9(a) illustrates a "waffle" structure created by forging $Zr_{55.3}Ti_{24.9}Nb_{10.8}Cu_{6.2}Be_{2.8}$ (DH1) into a brass die, taken from [2]).
FIG. 9(b) illustrates a net-shape cast in DH1 achieved by filling a 2 mm thick copper ring, 5 cm in diameter taken from [2]).
FIG. 9(c) illustrates the optical surface of the DH1 part after polishing (taken from [5]).

FIG. 9(a) illustrates a "waffle" structure 900 created by forging $Zr_{55.3}Ti_{24.9}Nb_{10.8}Cu_{6.2}Be_{2.8}$ (DH1) into a brass die using the apparatus of FIG. 4(e). The struts pictured are a wedge shape with thickness at the tip<100 μm thick (taken from [2]).

FIG. 9(b) illustrates a net-shape 902 cast in DH1 achieved by filling a 2 mm thick copper ring 904, 5 cm in diameter, and FIG. 9(c) illustrates the optical surface 906 of the DH1 part after polishing (taken from [2] and fabricated using the apparatus of FIG. 4(e)).

FIGS. 10(a)-(d) and 11(a)-(b) illustrate an AM mirror 1000, according to one or more embodiments of the invention, fabricated using the semi-solid forging technique and apparatus illustrated in FIGS. 5(a)-(e) and FIGS. 6(a)-(c).

FIGS. 10(a)-(b) show the top 1002 of the mirror 1000 has curvature.

FIG. 10(c)-(d) show flow lines 1004 exist on the surface 1002.

FIG. 11(a)-(b) illustrate the bottom of the mirror 1000 has an isogrid 1100, and the part 1000 can be removed/released from the mold 604. The process is simple and repeatable, although mold filling for the isogrid can require careful selection of mold and forging parameters.

The isogrid 1100 of FIG. 11(a)-(b) is made by filling the grooves/channels 608 in isogrid mold 604 that are 3-6 mm deep 610, and releasing the part 1000, so that the isogrid 1100 comprises struts or walls 1102 having the height 512 of 3-6 mm. This is the most complex part ever made out of an AM composite. FIGS. 11(a)-(b) illustrate an example that didn't quite fill the L=7 mm deep 610, d=1 mm wide channels 608 of the mold's 604 isogrid (higher pressure is needed or larger or wider (larger d) channels 608).

FIGS. 12(a)-(d) show a mirror 1200 surface 1202, fabricated according to one or more embodiments of the invention, wherein the flow lines were minimal so that the surface could be polished to a 0.02 micron finish 1202 by hand. Lower velocity casting should obtain this surface without polishing (using hydraulic loading in the method illustrated in FIGS. 5(a)-(e)).

Figure 10:
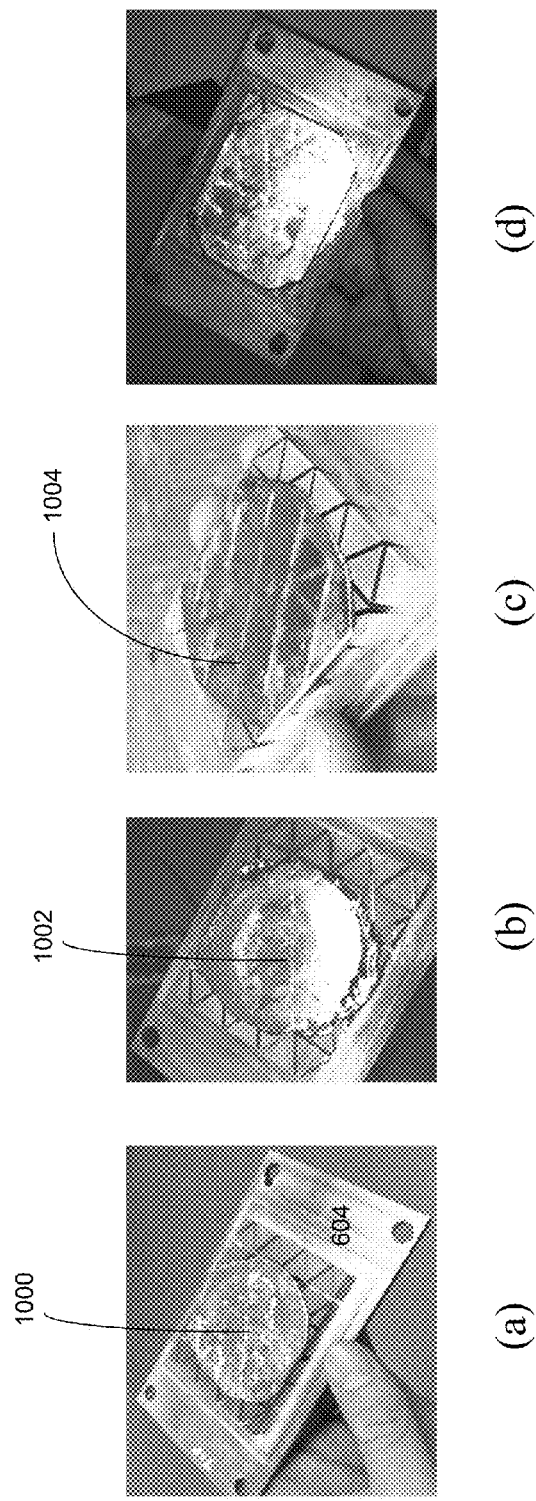
Figure 14:
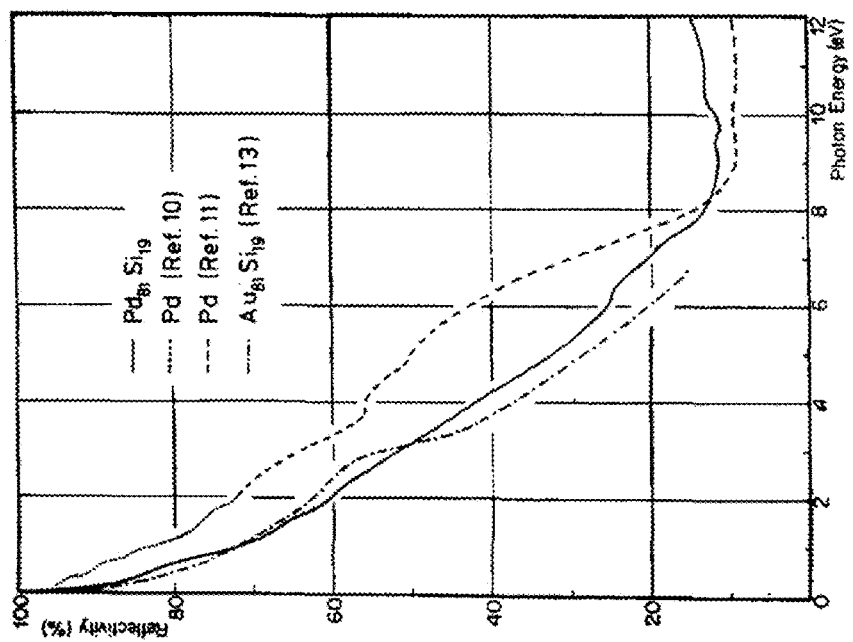
FIG. 14 shows a plot of reflectivity (%) vs. photon energy (eV) of AMs Pd—Si, Au—Si, and Pd (taken from [5]).

FIGS. 10-12 show proof of concept mirrors, wherein a low-density AM part 1000, 1200 has been fabricated, that has very high stiffness and a mirror-polished surface finish 1202. The mirrors 1000, 1200 are all one-piece, required no machining (although polishing was used), and are low cost parts.

Mirror Reflectivity

FIG. 13 (taken from [5]) shows AMs made from Pd—Si and Au—Si AMs are known to have reflectivity between 85-95%. Nickel-plated gold samples used in space applications have 85% or higher reflectivity.

Figure 15:
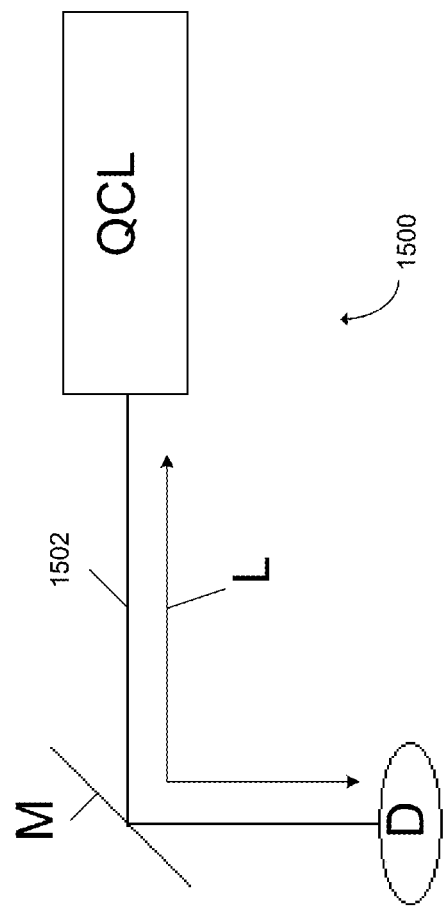
FIG. 15 illustrates an apparatus used to perform the reflectivity test of the AM mirrors fabricated according to one or more embodiments of the invention.

FIG. 15 illustrates an apparatus 1500 used to perform the reflectivity test of the AM mirrors fabricated according to one or more embodiments of the present invention, comprising a Quantum Cascade Laser (QCL) laser emitting light/electromagnetic radiation 1502 at a wavelength of 9.9 μm, and an open air path length L kept constant between the QCL and the detector D for each AM mirror M tested.

Figure 16:
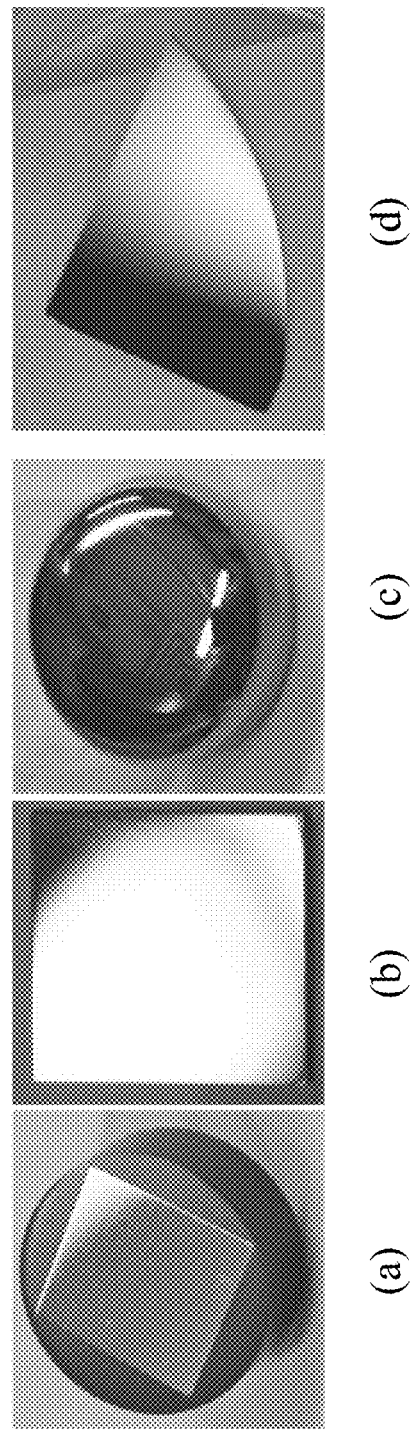
FIG. 16(a)-(d) illustrate the reflectivity of AM mirrors fabricated by (a) polishing a BMG composite, (b) polishing a BMG plate, (c) free-cooling a BMG ingot and (d) sputtering AM onto a Si-substrate, according to one or more embodiments of the invention.

FIG. 16(a)-(d) illustrate the reflectivity of AM mirrors, fabricated according to one or more embodiments of the present invention, measured using the apparatus of FIG. 15. The reflectivity of the mounted and polished BMG composite mirror in FIG. 16(a) is 82.10%. The reflectivity of the polished AM composite mirror in FIG. 16(b) is 80.52%. The reflectivity of the free-cooled AM composite mirror in FIG. 16(c) is 81.04%. The reflectivity of the sputtered AM composite mirror in FIG. 16(d) is 82.47%. One or more embodiments of the present invention can obtain a reflectivity of at least 85% for the AM composite mirror 1000, 1200. These mirrors are all fabricated from Vitreloy 1 BMG alloy (Zr—Ti—Cu—Ni—Be).

Figure 17:
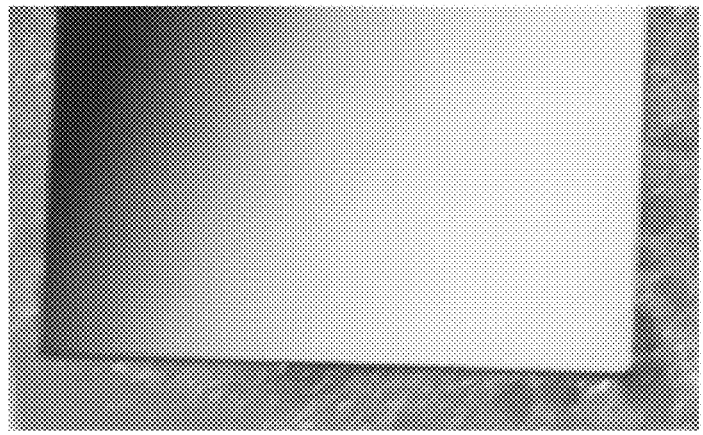
FIG. 17 illustrates Al-plated AM mirrors fabricated by polishing an AM plate and then depositing Al through sputtering, according to one or more embodiments of the invention.

FIG. 17 illustrates an Al-plated BMG mirror fabricated by sputtering onto a polished BMG plate, wherein the AM plate was polished to 0.02 micron and plated with 5 micrometers of Aluminum (Al). The Al-plated AM mirror exhibited dramatically increased optical reflectivity. The plating was simple and effective and motivates plating and sputtering AM coatings for mirror applications.

(b) Thermoplastic Embossing

The thermoplastic embossing technique can be used to impart a mirror finish (and optical curvature) onto a net or near-net shaped AM, BMG or BMG composite mirror by locally heating the surface and then applying a pressure to it with a mirror-polished mold. The objective is to create a mirror finish on a part which has already been cast to a final shape, but where the mirror polish could not already be obtained. By locally heating and embossing the surface, the damage to the mirror-polished molding die can be reduced and a more precise mirror finish can be obtained.

Figure 18A:
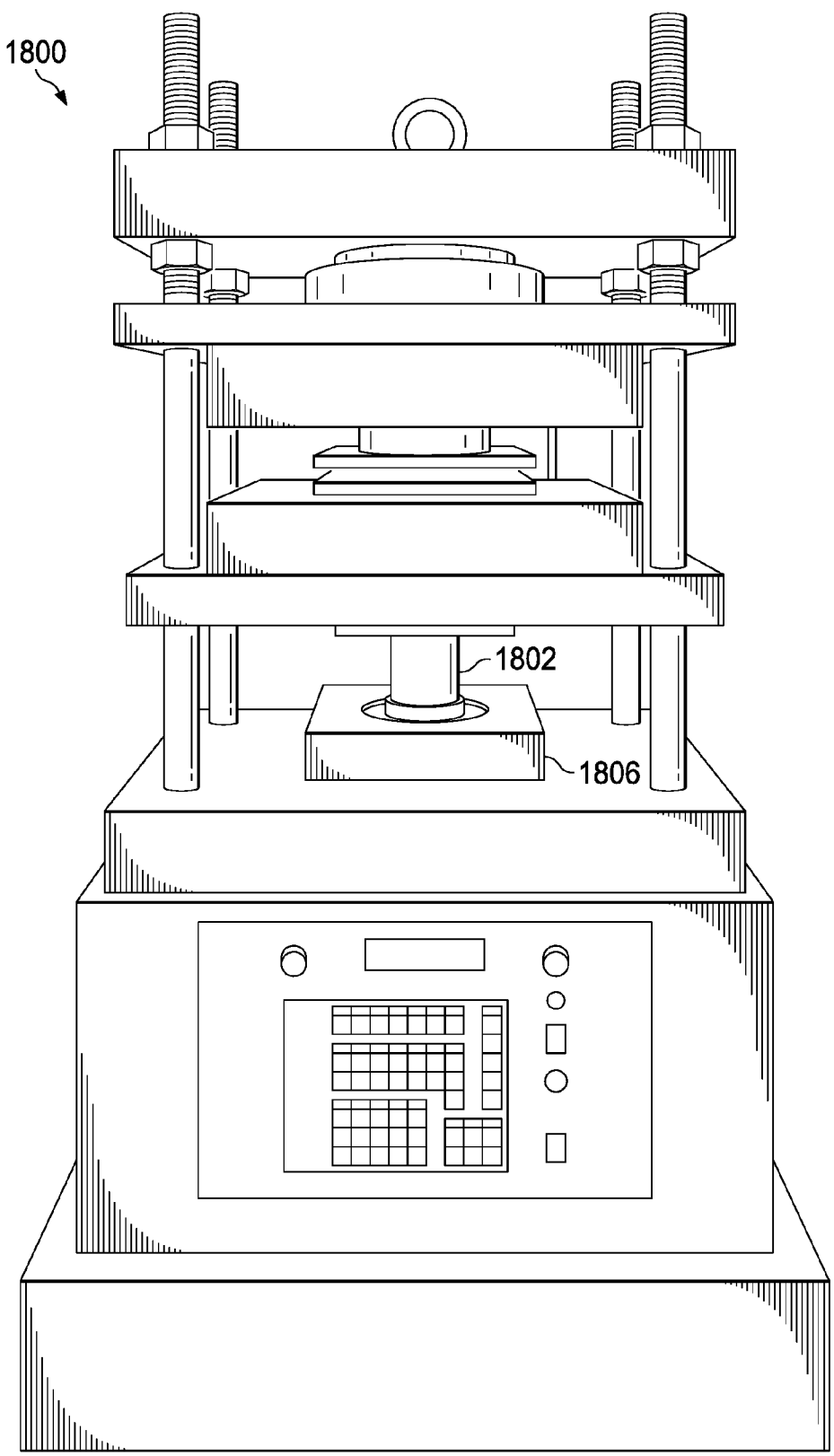
FIGS. 18(a)-(b) show an apparatus for thermoplastic embossing, according to one or more embodiments of the invention, wherein (a) shows a heated hydraulic press used to heat and load a BMG part and (b) shows a BMG plate that was pressed using a mirror-polished steel blank, and the objective was to transfer the mirror finish from the steel plate onto the metallic glass using thermoplastic processing.
Figure 18B:
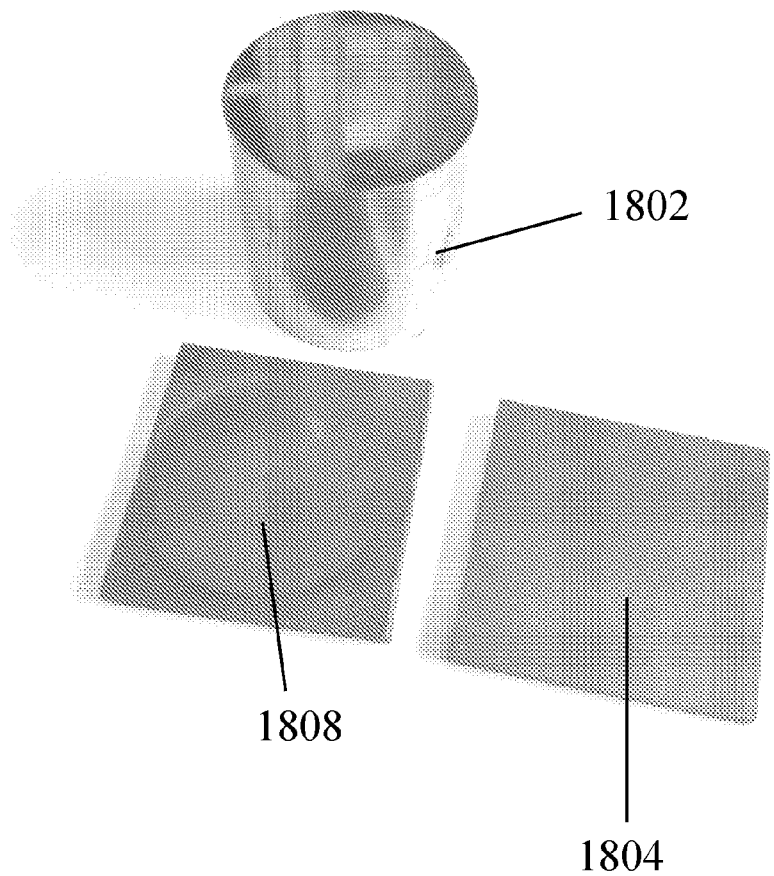

This technique has been proofed in FIGS. 18(a)-(b) with an apparatus 1800 for thermoplastic embossing, according to one or more embodiments of the invention, comprising a steel cylinder 1802 polished to 0.02 micron finish. The apparatus 1800 heats an AM plate 1804 to 450° C. on a heated hydraulic press 1806 to emboss the plate 1804 into an embossed plate 1808. FIG. 18(c) illustrates the plate 1804 that has been pushed with 10 tons of force to emboss a smooth surface 1810 that can be used as a mirror (a curved steel mold 1802 is needed). One or more embodiments have performed this process with BMG composites to replicate a dime 1812 nearly flawlessly, as illustrated in FIG. 18(*d*), illustrating that structures can also be embossed.

(c) Thermoplastic Forming (TPF) of BMGs

TPF processing involves heating a BMG to the Supercooled Liquid Region (SCLR) between the glass transition temperature and the crystallization temperature, where the viscosity is low (but not as low as fully melting the alloy). TPF of BMGs is attractive for many practical reasons including the relatively low temperatures that are needed (~350° C. for a Zr—Be based BMG) and the ease at which those temperatures can be reached using a variety of heating techniques and starting material geometries. The viscosity of the BMG in the SCLR is relatively high so that high loads can be applied to parts without uncontrolled liquid flow. As such, low velocity laminar flows can be achieved using TPF and parts with nanometer surface features can be replicated without damaging a molding tool. Processing in the SCLR by TPF is therefore one way to fabricate an optically smooth mirror in a single processing step.

Figure 19A:
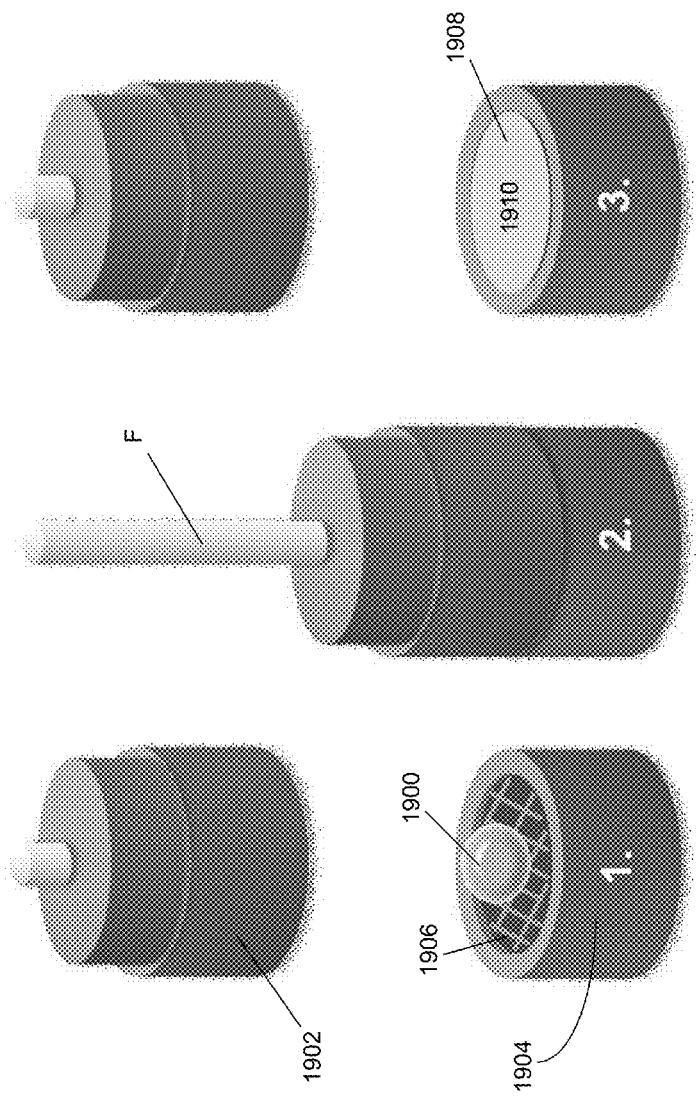
FIG. 19(a) illustrates a technique of thermoplastic forming (TPF) of BMG mirrors into a circular mirror net-shape, according to one or more embodiments of the invention.
Figure 19B:
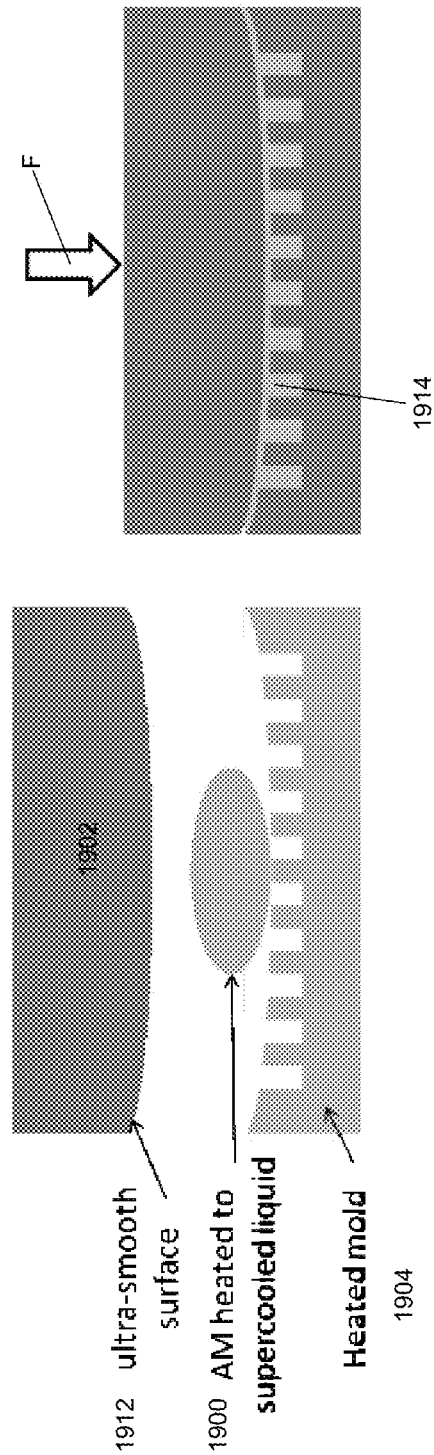
FIG. 19(b) illustrates a technique of thermoplastic forming (TPF) of BMG mirrors by heating a lower mold attached to the sample and then pressing, according to one or more embodiments of the invention.
Figure 19C:
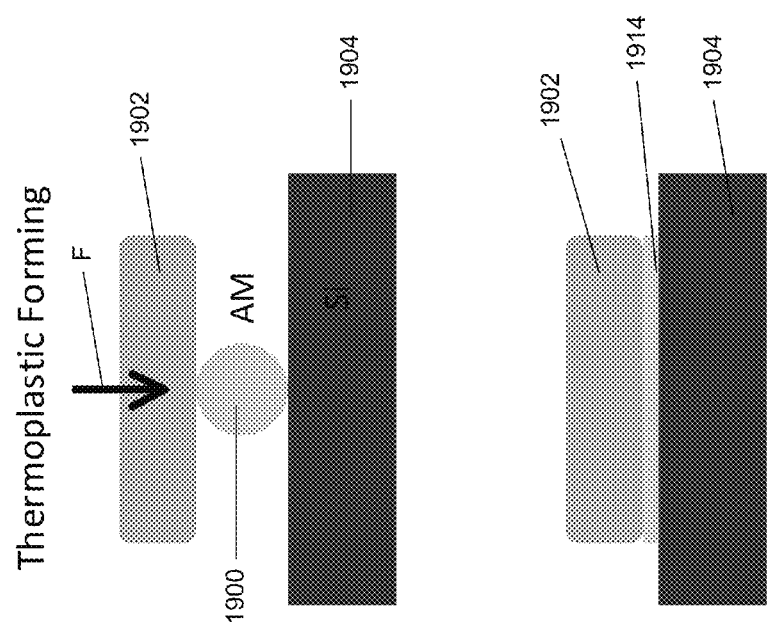
FIG. 19(c) illustrates TPF with Si as the lower mold for surface replication, according to one or more embodiments of the invention.

FIG. 19(*a*) illustrates a TPF technique, according to one or more embodiments of the invention, wherein the BMG ingot 1900 is placed in between two molds 1902, 1904 (step 1). One mold 1902 has the mirror polished surface and one mold 1904 has the isogrid 1906 (or other structural backing), and the lower mold 1904 is heated (via heating elements). The ingot 1900 is designed to have more thermal contact with the lower mold 1904 so that heat is transferred from the heated mold 1904 to the ingot 1900 via thermal conduction. Once the ingot 1900 is at a temperature in the thermoplastic region (where it has ~$10^5$ Pa s of viscosity), the molds 1902, 1904 are closed under force F to create the mirror assembly (step 2). After the forming of the part 1908, the molds 1902, 1904 must be quickly cooled to allow the BMG part to vitrify. The molds are separated in step 3. TPF has already been demonstrated to form separate BMG parts with mirror surfaces and cellular structures in BMGs (Ref [1]). The process according to one or more embodiments of the invention combines the mirror surface with curvature (if necessary for function) 1910 formation and cellular structure formation into one step.

FIG. 19(*b*) illustrates an apparatus 1900 for Thermoplastic Forming (TPF) of AMs, according to one or more embodiments of the invention, comprising a lower heated mold 1904, upper mold 1902, and wherein the upper mold 1902 has an ultra smooth surface 1912. The ingot 1900 and lower mold 1904 are heated to the supercooled liquid region of the ingot 1900, and an applied force F makes the part 1914 using low velocity flow (for good replication of the upper mold 1902 and lower mold 1904 surfaces 1912). The whole mold 1902/1904 is quenched afterwards.

FIG. 19(*c*) illustrates a TPF apparatus with Silicon (Si) as the lower mold.

FIGS. 19(*a*)-(*c*) illustrate that thermoplastic forming can be combined with the casting ability of AMs to make mirror assemblies 1914 with a low-density, high-stiffness isogrid backing in one step.

Figure 20A:
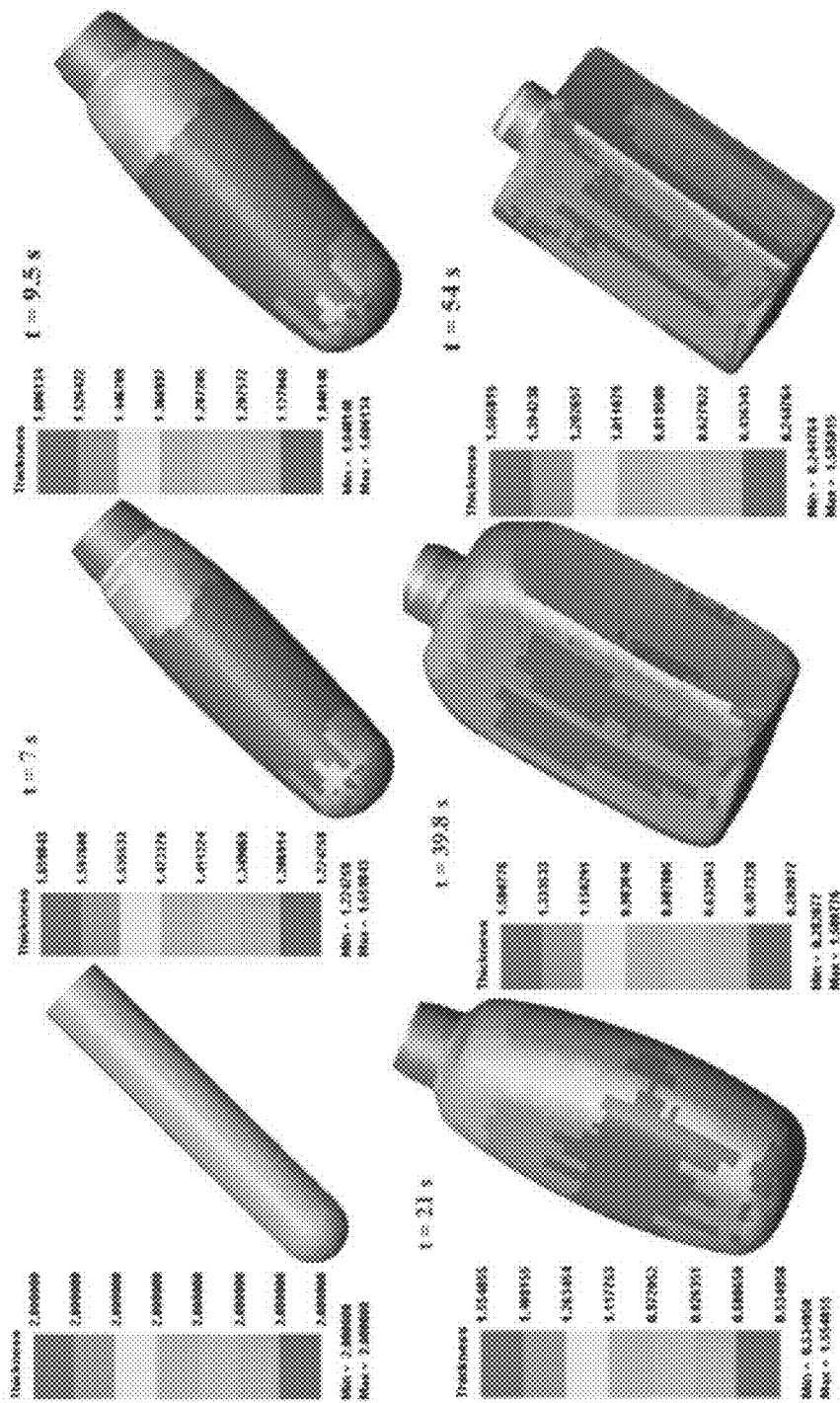
FIG. 20 illustrates (a) finite element modeling to determine the required shape of the parison to blow mold, and (b) expansion of a parison by blow molding into net shapes, taken from [6], wherein this technique can be used for hollow mirror fabrication according to one or more embodiments of the invention.
Figure 20B:
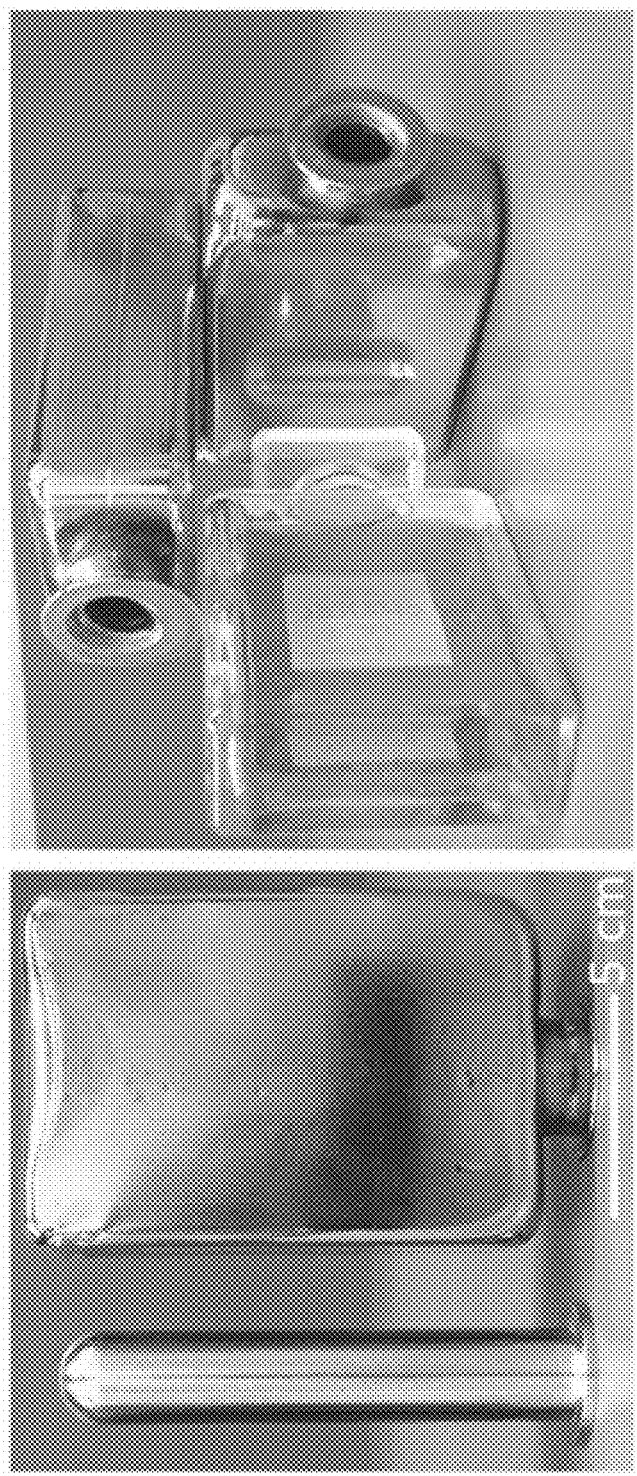
Figure 21:
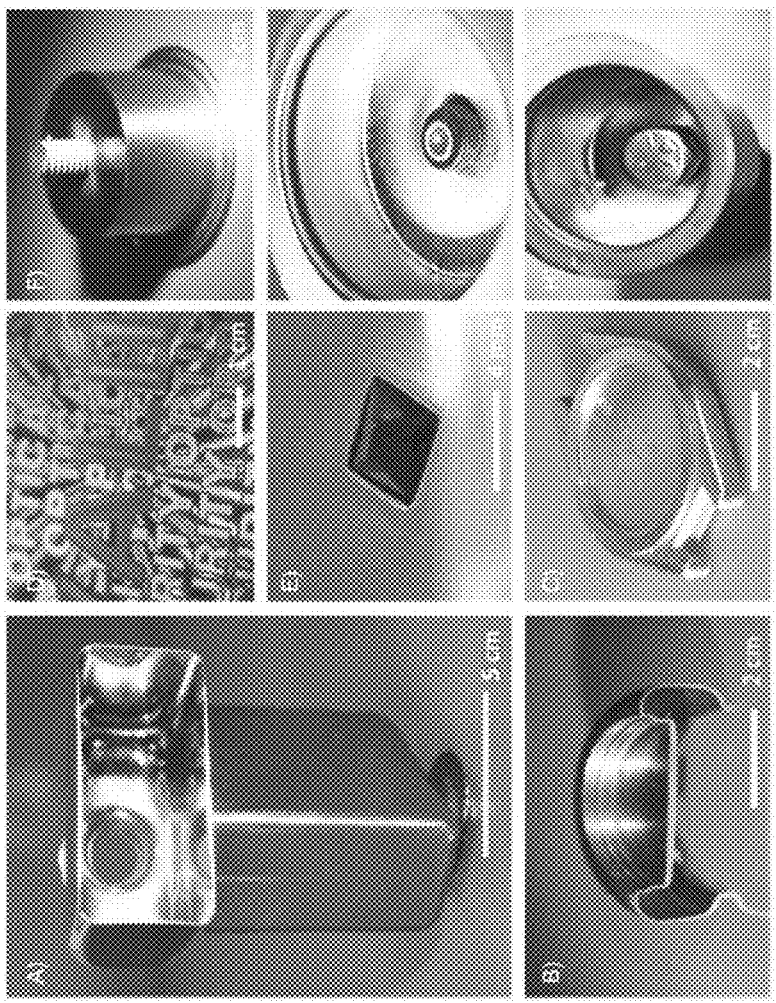
FIG. 21 illustrates blow molding of BMGs to form different hollow, thin seamless shapes and detailed surface features (hologram), as illustrated in A-H from [6], and I-L (also from [6]) illustrate the fabrication of a hologram using an AM and thermoplastic blow molding, which can be used to create "gratings" on mirrors for optical channeling according to one or more embodiments of the invention.
Figure 21:
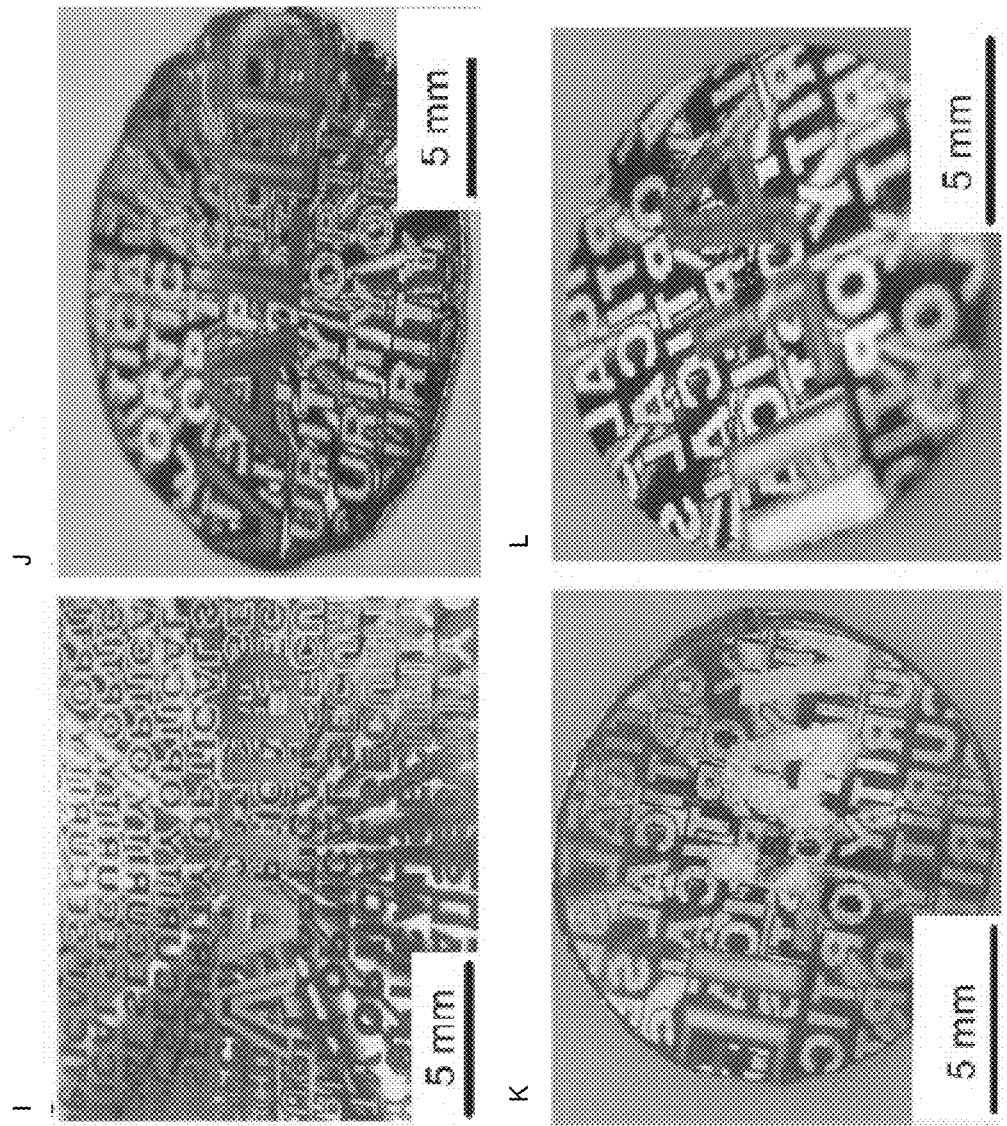
Figure 22:
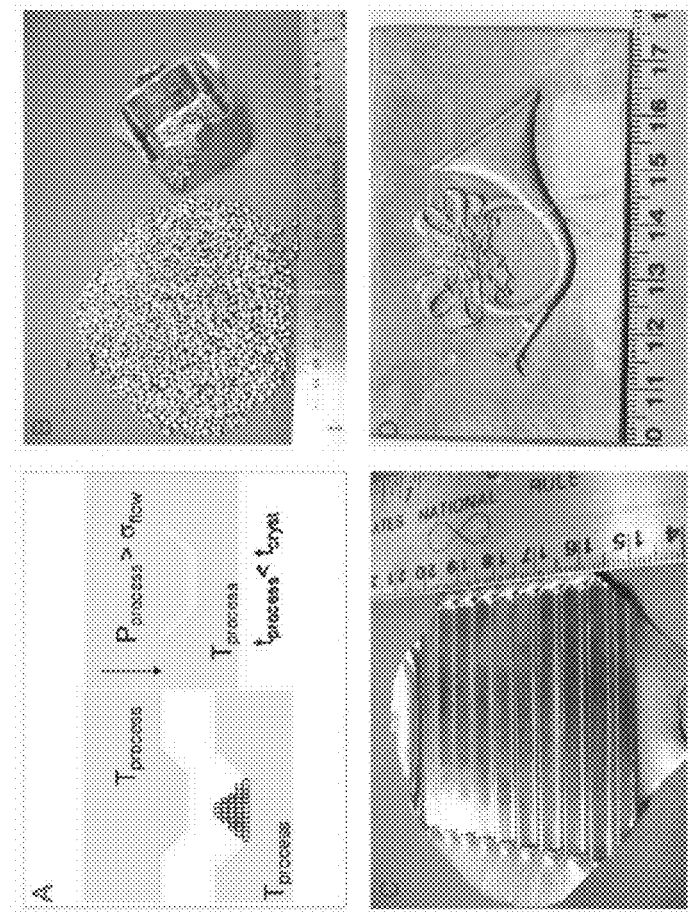
FIG. 22 illustrates TPF based compression molding with BMG powder, taken from [6], wherein powder compaction molding using TPF can be used to create a mirror finish in a single processing step according to one or more embodiments of the invention.

AM composite mirrors with net shapes could also be fabricated using a blow molding technique illustrated in FIGS. 20-22, but modified using molds and processing conditions according to the present disclosure.

FIG. 20 (*a*) illustrates finite element modeling that is used to determine the required shape of the parison, to blow mold $Zr_{44}Ti_{11}Cu_{10}Ni_{10}Be_{25}$ into a rectangular-shaped mold.

FIG. 20(*b*) illustrates expansion of a $Zr_{44}Ti_{11}Cu_{10}Ni_{10}Be_{25}$ parison with 2-mm wall thickness under a pressure difference of $10^5$ Pa for 60 s results in complete filling of the mold.

FIG. 21 illustrates blow molding with BMGs that now permits creation of hollow, thin, seamless shapes, which can include undercuts. These shapes were previously unachievable with any other metal processing method (A-C). The surface can be patterned, for example, to reveal a hologram (D), joints can be created such as threads (F,H), and a second material can be joined to the BMG (E) in the same processing step as the blow molding.

One or more embodiments of the invention use a blow molding technique to make make very thin parts with excellent finishes. Accordingly, an AM or AM composite mirror surface could be blown to a specific tolerance.

FIG. 22 shows TPF-based compression molding with BMG, wherein (A) shows schematic images of compression molding with BMGs, (B) shows pellets used as feedstock material to compression mold $Pt_{57.5}Cu_{14.7}Ni_{5.3}P_{22.5}$, (C) shows $Zr_{44}Ti_{11}Cu_{10}Ni_{10}Be_{25}$ formed from a flat plate into a corrugated structure, and (D) shows $Zr_{44}Ti_{11}Cu_{10}Ni_{10}Be_{25}$ formed from a flat plate to create and embossing mold.

Thermoplastic forming allows excellent mold replication and surface finishes. However, it requires large forces due to the high viscosity, it can be more difficult to make complex geometries, and there is limited processing time due to crystallization. Advantages of die casting (described in the next section) include easy fabrication of complex parts due to low viscosity, ease of a one step process to fabricate parts, and low shrinkage of the final part (tolerances are maintained). However, there can be problems in die casting due the high flow velocities imparting flow-lines onto parts.

(d) Die-Casting of BMGs or BMGMCs

Die-casting BMGs from the liquid is the currently preferred method for fabricating net-shaped parts (cell phones, USB drives, golf clubs, etc.). The technique, which is common to many metals, involves heating the liquid up in a crucible (through RF heating, resistance heating, oven heating, etc.) and then injecting the liquid into a mold using a shot-sleeve and die under typically tens of tons of force. The high processing temperature of the liquid and the extreme forces used in casting allow for extremely complex molds to be filled using the process. By reducing the flow velocity (to limit turbulence), or by using a counter-gravity casting variant, parts with mirror finishes can be replicated using the processes. This can be done by fabricating a mirror-polished piece of steel or carbide and then die-casting BMGs over the mold at high pressure and low flow velocity. With the correct application of temperature and pressure, a one-step process can be used to fabricate an optical finish. This technique was prototyped in the present disclosure.

In one or more embodiments of this technique, the BMG/MC ingot is heated to above the liquidus and then cast into a mold via a plunger or some other external force (like counter-gravity, for example). The mold is split into the mirror polished side and the structural side, so that the part has the desired characteristics. The inlet should be on the back of the sample so as to not interfere with the mirror surface. The molds are massive and act as a thermal heat sink for the alloy, which allows vitrification. After casting, the mold is opened and the mirror assembly is removed.

Figure 23:
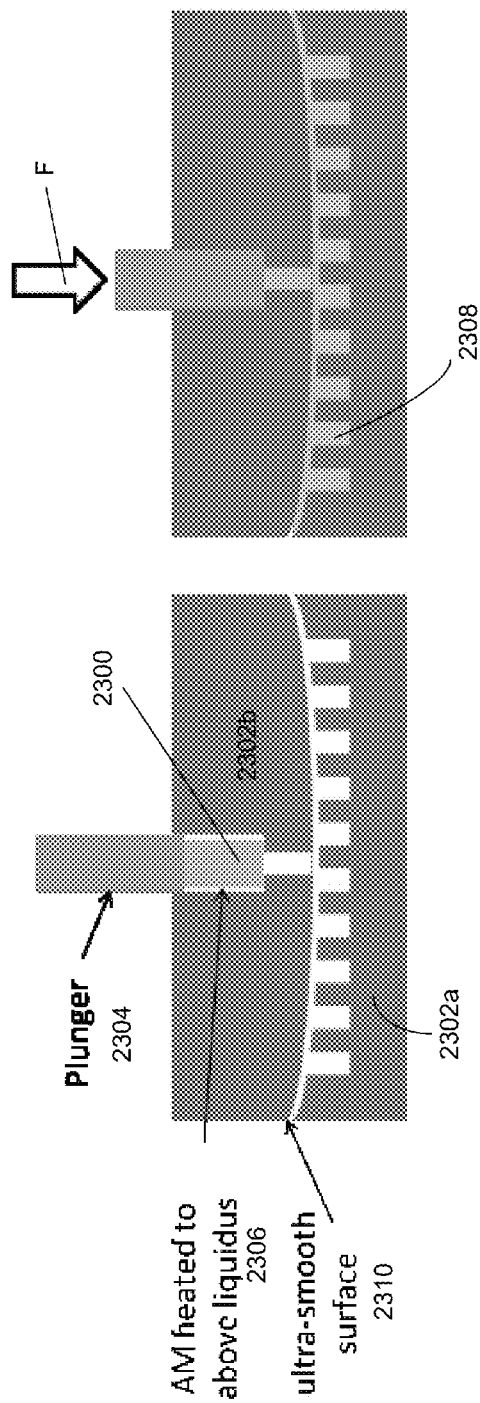
FIG. 23 shows an apparatus for die-casting BMG and composite mirrors by injecting liquid into a two-piece mirror mold using a plunger, according to one or more embodiments of the invention.

FIG. 23 illustrates an apparatus for die-casting AMs and composites, according to one or more embodiments of the invention, comprising a shot sleeve 2300, molds 2302*a*-*b*, and a plunger 2304. An ingot of AM is heated to above liquidus in the shot sleeve 2300, the AM liquid 2306 is pushed into the molds 2302*a*-*b* with plunger 2306, or some other force F (gas or vacuum pressure), and the part 2308 cools in the molds 2302*a*-*b*. The mold 2302*b* has an ultra smooth surface 2310.

Figure 24A:
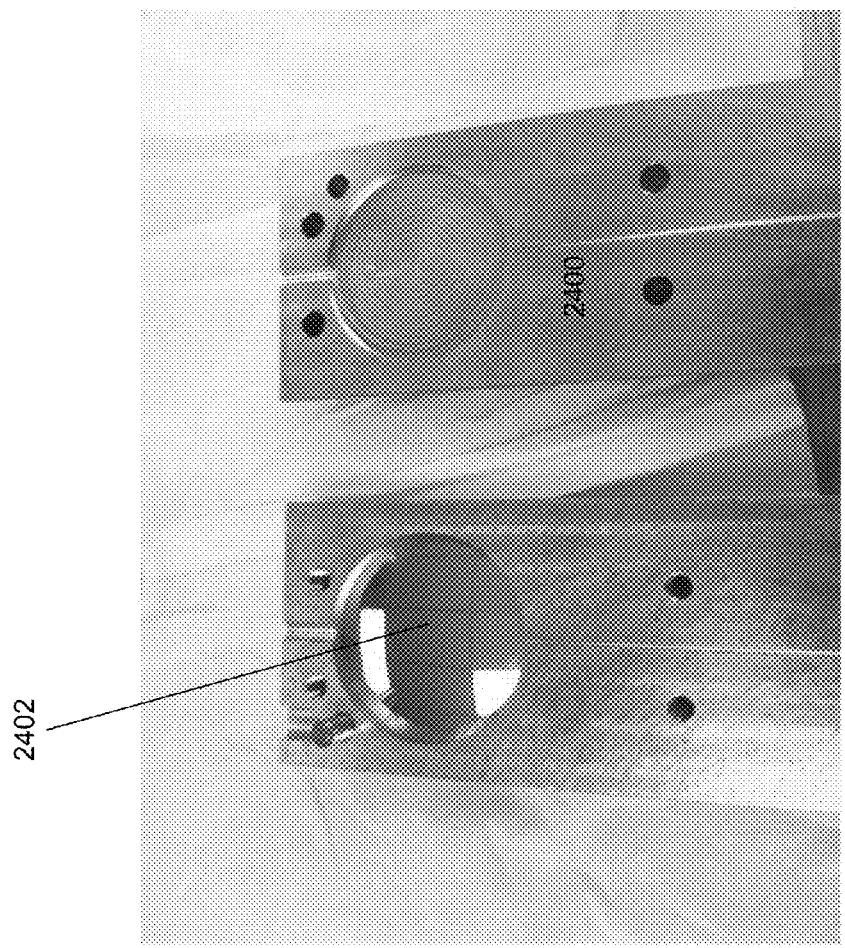
FIG. 24(a) illustrates an example of a mirror polished steel insert with optical curvature inside a two-piece casting mold, according to one or more embodiments of the invention, wherein BMGs are cast over the mold and the curvature and surface roughness are transferred to the liquid before quenching, according to one or more embodiments of the invention.
Figure 24C:
FIG. 24(b) illustrates a cast 1 inch diameter BMG mirror and FIG. 24(c) illustrates the brass mold from which the mirror in FIG. 24(b) was cast into, according to one or more embodiments of the invention.
Figure 24B:
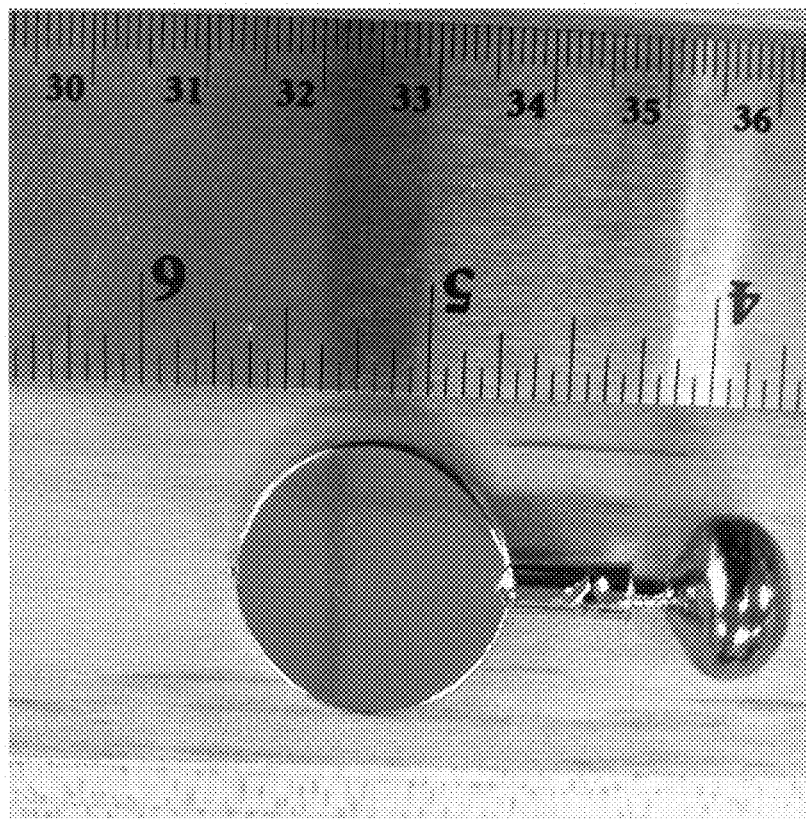
Figure 24D:
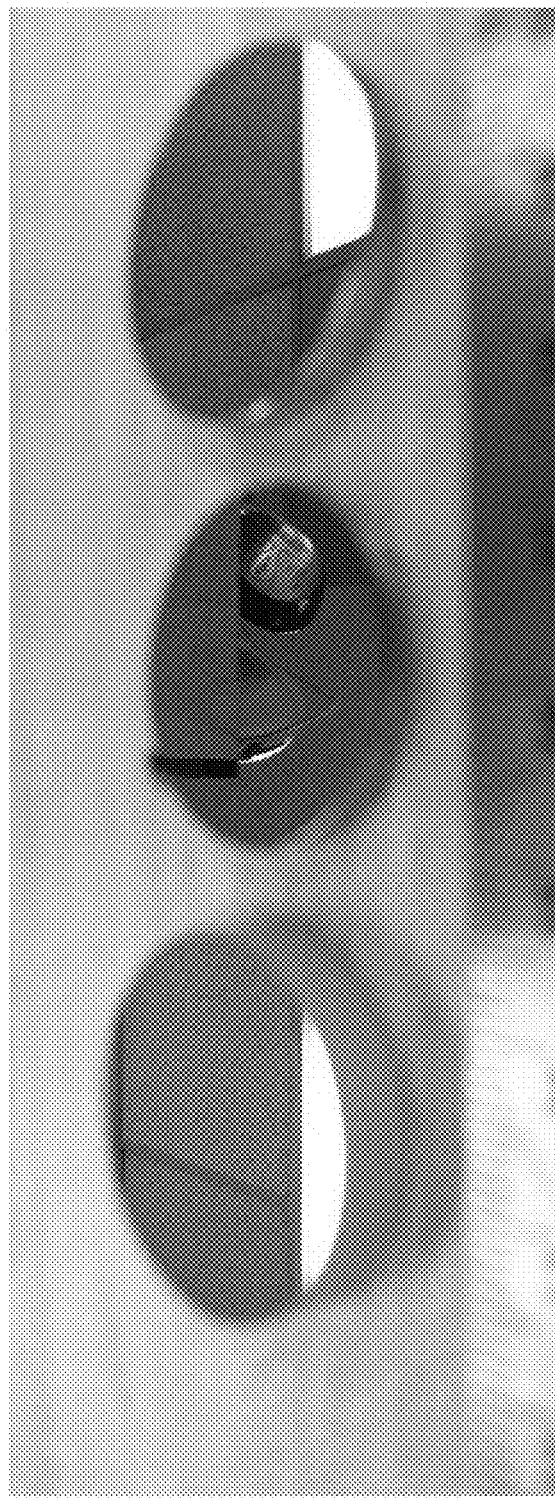
FIG. 24(d) illustrates a metal coated glass mirror (left), a BMG mirror fabricated by suction casting (center), and a Ni coated Be mirror (right), according to one or more embodiments of the invention.
Figure 24E:
FIG. 24(e) illustrates 1 inch diameter mirrors with and without curvature fabricated through suction casting, according to one or more embodiments of the invention, wherein die casting or counter-gravity casting is needed to improve the surface finish by applying a pressure to force the liquid to contact the mold fully.
Figure 26:
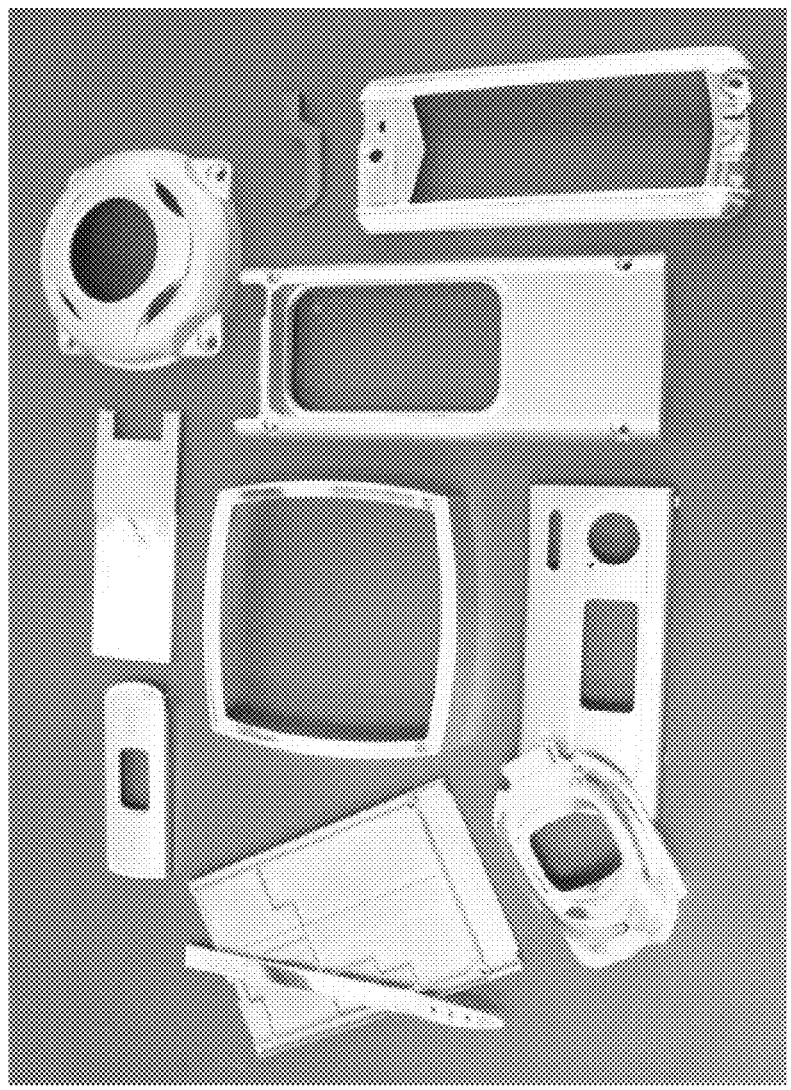
FIG. 26 illustrates various BMG parts fabricated with BMG by TPF, taken from [6].

FIG. 24(a) and FIG. 24(c) show a split mold 2400 with a mirror-polished steel insert 2402 with optical curvature, and FIG. 24(b) shows a metallic glass part that was cast over the mirror to obtain a near optical finish. This process was completed using suction casting, where only vacuum pressure was available for casting. With a die-casting force available, a perfect mirror can be obtained, as illustrated in FIG. 24(e). FIG. 24(d) illustrates a metal coated glass mirror (left), BMG mirror fabricated by suction casting (center) and a Nickel coated Be mirror (right).

FIG. 25 compares die casting and TPF (taken from [6]). Specifically, FIG. 25 shows a schematic TTT diagram illustrating the processing methods of BMG formers.

During direct casting, forming takes place simultaneously with the required fast cooling to avoid crystallization.

During TPF, the required fast cooling and forming are decoupled. The amorphous BMG is reheated into the SCLR, where the available processing window is much shorter than during direct casting, resulting in less controllability of the process.

(e) Capacitive Discharge Forming of BMGs

Capacitive discharge forming or Rapid Discharge Forming (RDF) is a very new technique that has been shown to be extremely applicable to TPF of BMG and AM parts. It has been demonstrated in [9] that an entire volume of BMG can be heated into the thermoplastic region via a capacitor discharge through a uniform cross-section of material. One or more embodiments of the invention modify this technique, using the appropriate molds and processing conditions, to form a mirror assembly, wherein a plate of BMG or AM is suspended between the mirror polished mold and the structural mold, a capacitor discharge rapidly heats the BMG plate or AM sheet into the correct temperature range, and a forging load (or vacuum force, suction pressure, or magnetic force) is applied to form the part into the mirror assembly. This technique is a TPF technique, so parts with high surface finish are expected in a single processing step.

FIG. 27(a) illustrates a Rapid Discharge Forming (RDF) apparatus, according to one or more embodiments of the invention. RDF is the same as thermoplastic forming, but with a different heating source, and results in excellent mold replication. The apparatus comprises Cu electrodes 2700 for heating a BMG plate or AM sheet 2702 via a discharge 2704 from capacitor 2706. Mirror polished steel forge 2708 and mirror polished steel die 2710 apply force F to the heated BMG sheet 2702. One or more embodiments could use plate feedstock to make parts like mirrors. A mirror finish could also be made via suction casting (FIG. 27(c), blow molding, magnetic forming or squeeze casting using the capacitive heating technique.

FIG. 27(h) shows a side view of an apparatus for Capacitive Discharge Forming AMs and BMGs 2702, according to one or more embodiments of the invention. The apparatus comprises a plunger 2712 with an ultra smooth surface 2714 (for making the optical surface of the mirror 2716, and a mold 2718 with the isogrid pattern. An AM plate or sheet 2702 is heated rapidly with capacitive discharge 2704 (from a capacitor 2706) to a supercooled liquid region in, e.g., 10 milliseconds. Force F is applied force through a plunger 2712, and the part 2716 cools in the cold molds 2712, 2718 (the method uses [9] to heat the AM or composite 2702 to the required processing temperature).

FIG. 28 is a photograph of an apparatus for capacitive discharge heating (taken from [7]) that can be modified according to one or more embodiments of the invention (to use appropriate molds and processing/pressing conditions). This is an experimental setup based on the capacitive discharge heating approach used to demonstrate injection molding of a metallic glass component. (A) shows the basic setup comprising an upper/top copper electrode used as a plunger 2800, a lower copper electrode used as a base 2802, a quartz sleeve 2804 used as an insulating barrel to electrically insulate and confine the sample charge, and a metallic glass rod 2806. A groove is introduced in the quartz sleeve 2804 at the point of contact with the mold runner to enable entry of the softened glass into the mold 2808. (B) illustrates a simple "as-molded" $Pd_{43}Cu_{27}Ni_{10}P_{20}$ toroidal metallic glass part 2810 formed at a processing temperature of ~720K using a plunger at a pressure of ~20 MPa. The sample is free of visible flow defects, and no oxidation can be detected being processed in open air. (C) shows lower half of the mold tool 2808 used to mold the metallic glass component 2810. In [7], a toroidal metallic glass part 2810 is molded in the apparatus, however, one or more embodiments of the invention can use the apparatus to fabricate an AM or AM composite mirror.

FIG. 29 illustrates the temperature of a part as a function of time, during rapid discharge forming (taken from [7]?).

(f) Twin Roll Casting

Twin Roll Casting (TRC) is a continuous or semi-continuous process whereby large dimension sheets or a large number of parts can be manufactured from BMGs or BMG composites. The technique involves rolling a liquid or thermoplastic liquid through wheels that are either highly polished or that have some embossing feature on them. The wheels are massive and apply sufficient cooling to the liquid to form a glass structure with a replication of the surface of the wheel. In combination with another process (e.g. capacitive forming or surface embossing), TRC can be used to create large, thin mirrors.

FIG. 30 illustrates twin roll casting of AMs and composites, according to one or more embodiments of the invention, wherein AM or composite liquid, or supercooled liquid 3000 is pushed through one or more rolling R wheels 3002, 3004 and the top wheel 3000 puts on the finish F to the mirror surface, lower wheel 3004 has grooves 3006 which put in the isogrid pattern 3008. Several sets of wheels can be used for finishing or shaping the part 3010. The AM part 3010 cools to a glass on the cold wheels 3002, 3004.

In one or more embodiments of the twin roll casting technique, BMG/MCs can be formed into panels with a mirror polished side F and a structural side (e.g., isogrid 3008) in a single rolling R step. The alloy is heated to the liquidus or to the thermoplastic temperature and then introduced into high thermal conductivity rollers 3002, 3004 with a highly polished wheel 3002 and a wheel 3004 with isogrid cavities C cut into it. After rolling, one side of the sample retains a highly polished surface F while the other has a cellular structure 3008 with high stiffness. Cooling is obtained through surface contact with the rollers 3002, 3004 or through gas blown onto the surface after casting.

II. Multiple Step Mirror Assembly Processes/BMG/BMGC Assembly Technique

In some cases the fabrication of a mirror assembly may require the combination of several processing or joining steps to achieve the final desired part. These could include casting and then surface finishing techniques or the physical welding of multiple parts together. One or more embodiments of the invention form a mirror assembly from a BMG or BMGMC in an assembly technique, which means the final part is built up using pieces and is not formed in a single processing step. There may be several reasons why the mirror assembly would need to be constructed from multiple pieces. This may happen if a specialized way of fabricating the mirror is implemented, if a structure is required with blind features that cannot be molded, or if an additive manufacturing process is used. A recent Caltech patent disclosure, "Thermoplastic Joining and Assembly of Bulk Metallic Glass Composites Through Capacitive Discharge," [10] has demonstrated that BMGMCs can be assembled using capacitive joining such that the entire mirror assembly acts as if it is a single solid piece. The end result is a one-piece mirror assembly but fabricated from parts and joined in such a way that no joint or thermally affected zone remains. Or, the assembly can be a solid piece but fabricated through an additive manufacturing technique (such as laser engineered net shaping), that uses a laser to consolidate powders of BMGs into a net shape. In this case, the structural backing can be fabricated separately from panels and then assembled, flanges, flexures, and the mirror surface can be made separately, and the final part can be assembled through a joining technique such as capacitive welding (or any other technique where the surface of the BMG is heated and then pressed to another BMG surface and rapidly cooled to create a solid interface). One or more embodiments of the invention therefore include any technique used to form a BMG or BMGMC mirror assembly where the final part is built up from individual parts or through a deposition process. Therefore, additive manufacturing or powder consolidation is covered by one or more embodiments of the invention.

FIG. 31 illustrates assembly of AM and composite structures, wherein the mirror assembly is welded into a monolithic structure 3100 from multiple pieces 3102, 3104 using thermoplastic joining (e.g., spot welding 3106). The optical surface 3108 is made separately from the isogrid backing 3104. The method also includes capacitive discharge to process the sheets 3102, 3104 (using [9]) and then pressing the two parts 3102 and 3104 together to form mirror 3100.

III. Localized Surface Treatment Technique

One or more embodiments of the invention use localized surface treatment as a way to take a near-net shape and turn it into a mirror finish. This is a slight modification to the process described in the above section entitled Thermoplastic Embossing, where the curvature is pressed into the part in the SCLR. In this technique, TPF, local melting, plating or etching can be used to create an optically smooth surface from a net-shape BMG part. Unlike the joining embodiments described above, where surface heating is proposed to join parts together, this technique specifically involves forming a mirrored surface finish in a localized treatment. In this technique, the BMG mirror assembly is fabricated through one of the strategies described above but the mirror finish is left in a rough state. The mirror assembly is then subjected to a surface treatment that produces an optical mirror surface without machining, grinding or polishing. This technique can be applied by localized heating and forming of the surface, an etching process, or a plating process.

FIG. 32(a) shows thermoplastic surface treating to create a mirror finish. Most thermoplastic forming techniques require heating the entire AM part before forming it (discharge forging or thermoplastic forging, for example). In thermoplastic surface treating, a heated surfacing mold 3200 is contacted 3202 to a rough BMG surface 3204 to form a mirror finish 3206 of the mirror 3208.

FIG. 32(b) illustrates an example of a BMG finishing technique, wherein a BMG with curvature is cast via suction casting, loaded into a graphite mold, the mold is heated via RF heating until the BMG is in the SCLR, and a die is pressed onto the part to improve the surface finish.

Heating can be applied only to the surface to heat it to the supercooled liquid region (or above the liquidus if desired) to allow deformation to a mirror finish.

The heating can be generated through many ways (capacitive discharge at the surface, using a very hot upper mold heated with induction heaters or an oven, frictional surface heating (using ultra-sonic or mechanical motion), or laser heating of the surface.

A novelty is that the rest of the AM part acts as the heat-sink to vitrify the surface and the AM part is only heated to the supercooled liquid in one part.

This is similar to how thermoplastic joining works, but instead of joining, one or more embodiments of the invention are heating the surface and forming.

Process Steps

One or more embodiments of the invention comprise a single piece mirror assembly with the whole part made of AM, fabricated by the novel steps of assembling AM mirror hardware from AMs. The mirror assembly can be made to net or near-net shape in one step or multiple steps, for example.

FIG. 33 represents fabricating a first mold and/or a second mold (Block 3300), wherein the first mold has a first shape of an optical surface of the mirror structure, and the second mold has a second shape of a structural support or backing for the mirror structure. The molds can be made from copper or brass, for example.

FIG. 34(a) illustrates a method of fabricating a mirror assembly/structure/mirror part, comprising the following steps. Steps may be added or deleted as desired.

Block 3400 represents heating a material comprising amorphous metal (AM), bulk metallic glass (BMG), or bulk metallic glass matrix composite (BMGMC), locally or in total, into a heated material. The step can comprise processing/obtaining/forming/providing/heating an ingot comprising bulk metal glass (BMG), bulk metal glass composite (BMGMC), or amorphous metal (AM) into a processed ingot including a semi-solid, a thermoplastic, a liquid (e.g., supercooled liquid), or material.

One or more embodiments can include impregnating the AM with crystals for toughness or for CTE control.

For example, the processing could include processing the ingot under conditions (e.g., heating the ingot to a temperature) such that the ingot is has properties (e.g., plasticity, ductility, fracture toughness, strength), coarsened microstructure, or comprises dendrites that are homogenously distributed, as described in [2], [8], [9], [11], or [13]. For example, the processing can be such that the processed ingot has a tensile ductility of at least 5% and the molded part has a fracture toughness at least as high as a titanium or a titanium alloy.

The ingot can be heated by an RF induction coil, as described above in FIG. 4 and FIG. 5. The processing can comprise heating the ingot into the semi-solid or slurry, or heating the ingot to a temperature between a solidus and liquidus temperature for the ingot, as described in [2] or [8].

The ingot can be heated by capacitive discharge, as described in [9] or FIG. 27.

The processing can comprise heating the ingot into a thermoplastic region (e.g., as in TPF) wherein the first and second molds can be heated and the molds can heat the ingot, as described above in FIG. 19 or FIG. 20.

Block 3402 represents forming the heated material into a mirror or mirror assembly using one or more molds or a source of the heating.

The forming can comprise pressing the processed ingot between a first mold and a second mold, wherein the processed ingot is molded into a molded part.

A first shape of the first mold molds a first surface of the processed ingot into a net shape or near net shape of a mirror.

A second shape of the second mold molds a second surface of the processed ingot into a structure backing the mirror. The second shape can mold the second surface into the structure comprising a cellular, honeycomb, or isogrid structure (as shown in FIG. 11), for example. The isogrid can comprise an array of (e.g., triangular, or isosceles or equilateral triangle) holes in the BMG, BMGC, or AM separated by walls of the BMG, BMGC, or AM.

The temperature of the ingot can be maintained at the temperature of Block 3400 during the molding/forming. The pressing can occur while the processed ingot is at a temperature above a glass transition temperature.

The pressing can be by semi-solid forging, as described in FIG. 5. If semi-solid forging is used, the molds can be cool as compared to the heated ingot, wherein the molds are typically filled with the BMG, BMGC, or AM before the heated ingot freezes.

The pressing can be by TPF, as described in FIG. 19. If TPF is used, the first and second molds can heat the ingot, however, the pressing/molding is typically performed before the ingot cools and crystallizes to an extent that detrimentally affects the molding process. The applied force in TPF is typically such that the ingot is molded using lower velocity flow, such that the first shape and second shape of the molds are replicated as much as possible.

The pressing can be by twin rolling, or die casting.

The second mold can comprise channels and the BMG, BMGC, or AM can at least partially fill the channels during the pressing. The channels can be more than 1 millimeter deep, at least 7 mm, and have a width less than the depth (e.g., more or less than 1 millimeter wide).

The composition and material properties of the heated ingot and/or the conditions during the pressing can be controlled to increase filling depth of the channels according to the Hagen Poiseuille equation.

For example, the viscosity of the heated ingot, temperature, channel depth, channel width, and/or pressure applied during the pressing can be controlled in order to fill the channels more effectively. The velocity of the casting can be controlled to obtain a smooth mirror finish. Typically, as the velocity is reduced, the smoothness of the mirror surface of the molded piece is increased.

For example, increased filling depth in the channels can be obtained by increasing pressure of the pressing and/or increasing width d of the channels in the mold, and/or by reducing one or more of the velocity and viscosity of the BMG, AM, or BMGC in the mold. For example, one or more of the pressure, channel width, velocity, and viscosity can be such that (i) the mirror has a reflectivity of at least 80% at a wavelength of 9 micrometers, or a surface roughness of at least 0.1 micrometers over a circular aperture with a diameter of at least 4 inches, (ii) the BMG, BMGC, or AM at least fills the channels to a depth of at least 3 millimeters and the cellular structure comprises walls having a thickness of less than the depth, and (iii) the cellular structure reduces the mass of the mirror by at least 50% and increases a stiffness of the mirror by at least a factor of 2, as compared to the mirror with a solid backing, or the area of each hole in the cellular structure is at least 0.1 square inches.

Block 3404 represents quenching or cooling the molded part to below the glass transition of the AM, BMG, or BMGC, such that the desired material properties of the molded part are obtained (e.g., dendrite distribution is still sufficiently homogenously disposed within the glassy matrix or microstructure is sufficiently coarsened, as described in [2], [8], [9], [11], or [13]). The cooling rate during quenching can be in a range of from 1 to 100 K/s.

Block 3406 removing the material from the molds or the source of the heating. The step can comprise releasing the molded piece from the first mold and second mold. The releasing can use injector pins in the second mold The channels 608 in the mold and cavities C in the isogrid can comprise a draft angle of at least 3 degrees to facilitate release. FIG. 34(*b*) illustrates the use of injector pins in a 6 step process for mirror fabrication. The 6-step process, illustrated in FIG. 34(*b*), for fabricating a mirror assembly with structural backing includes (1) placing an ingot between two molds and heating the ingot using RF heating; (2) Once at the processing temperature, closing the molds to form part; (3) opening the molds; (4) inserting the ejection pins; (5) ejecting the part; (6) wherein the final part has mirror finish, optical curvature and backing, all in one step.

Block 3408 represents further polishing, grinding, etching, or treating the optical surface, if necessary, to obtain a smoother optical mirror finish for the mirror. The step can comprise treating the near net shape of the mirror with a localized heating technique, or depositing/sputtering/spray coating with further materials.

Block 3410 represents the end result, a molded part that is a mirror comprising a first surface having a net shape or near net shape of a mirror, and a second surface backing the mirror. The second surface comprises a structure (e.g., isogrid) supporting the mirror and providing the mirror with one or more of the following: increased stiffness, reduced density, and a mechanism for fixing the mirror in a mirror assembly.

The optical surface and structural surface can be monolithic and the mirror structure can be one-piece.

An aperture of the mirror can have a diameter of at least 4 inches. The first shape and the second shape can be such that the mirror is curved and a radius of curvature of the mirror is at least 5 inches.

The bulk metallic glass can be $Zr_{36.6}Ti_{31.4}Nb_7Cu_{5.9}Be_{19.1}$, $Zr_{38.3}Ti_{32.9}Nb_{7.3}Cu_{6.2}Be_{15.3}$ or $Zr_{39.6}Ti_{33.9}Nb_{7.6}Cu_{6.4}Be_{12}$, for example. However, the present invention's mirrors are not limited to these examples.

FIG. 35 illustrates a method comprising depositing, sputtering, spray coating, or plating BMG onto a shaped surface of a mirror (Block 3500).

Block 3600 of FIG. 36 illustrates a method for fabricating a mirror or mirror structure, comprising joining multiple parts to form a mirror, wherein at least one, multiple, or all of the parts comprise BMG, AM, or BMGC and the joining is such that no joint or thermally affected zone remains in the mirror/mirror assembly, and the mirror/mirror assembly has a uniform coefficient of thermal expansion.

The step can comprise joining a first part comprising the optical surface and a second part comprising the structural support. The joining can comprise spot welding, for example.

The parts can be formed from BMG, AM, or BMGC powder that is consolidated into the part by laser heating. The BMG, AM, or BMGC can be deposited as a mirror surface on a non-BMG, AM, or BMGC part.

Process Embodiments

In one or more embodiments, a method of fabricating a mirror or mirror assembly, comprises:

(a) heating (Block 3400) an amorphous metal (AM), bulk metallic glass (BMG) or bulk metallic glass matrix composite (BMGMC) locally or in total;

(b) forming (Block 3402) the heated material into a mirror or mirror assembly;

(c) removing (Block 3406) the material from the mold or heating source; and (d) if necessary, performing a finishing step that could include surface treating, deposition of a layer, joining, welding, embossing or assembly to create the final part.

In one or more embodiments, an optically smooth surface (Block 3410) with roughness less than 0.1 micrometers is formed without grinding or polishing the sample wherein (a) the surface is formed by die-casting (in Block 3402) from a liquid against a mirror polished mold (the liquid BMG or BMGC formed by heating in Block 3400); (b) the surface is formed by thermoplastic forming (in Block 3402) in the supercooled liquid region above the glass transition of the material against a mirror polished mold (where heating in Block 3400 is achieved via oven, RF, cartridge heating, capacitive discharge or any other method to reach the thermoplastic temperature regime), and/or the surface is formed by any casting or treating technique that doesn't require polishing or machining.

In one or more embodiments, optical curvature (a non-flat surface) needed for a mirror is formed during a casting process.

In one or more embodiments, the optical finish is formed by pressing heated material against a mold with an optical finish to transfer the finish from the mold to the BMG part.

In one or more embodiments, the final part functions as a mirror with a reflective surface.

In one or more embodiments, the BMG, AM, or BMGMC is deposited as a mirror surface on a non-BMG, AM, or BMGMC part.

In one or more embodiments, the mirror assembly has multi-functionality, comprising one or more of the following:

(a) an optically smooth surface, (b) an optically smooth surface with curvature, (c) an isogrid or other structural backing to give the assembly increased stiffness, (d) a low coefficient of thermal expansion, (e) flexures or tabs cast into the part or joined to the part, and/or (f) mounting features.

In one or more embodiments, a mirror mount is fabricated that is used to support an oxide glass mirror, wherein:

(a) some or all of the mount is a BMG or BMG composite, (b) the tabs that hold the mirror are BMG or BMG composite, (c) the part is cast in a single processing step, and/or (d) the part is assembled from multiple pieces that are joined or welded.

In one or more embodiments, a mirror surface and the structure backing of the mirror are fabricated in a single processing step.

In one or more embodiments, the part is made by pressing the material between two molds where one side of the mold imparts the optical finish (and curvature, if desired) and the other provides a backing (e.g., an isogrid).

In one or more embodiments, an isogrid backing is formed by casting into a negative isogrid mold.

In one or more embodiments, the AM, BMG or BMGMC mirror or assembly is cooled (Block 3404) into the amorphous (glassy) state by conduction into the mold material.

In one or more embodiments, the processing comprises heating into the thermoplastic region and the forming comprises thermoplastic forming.

In one or more embodiments, the molded parts have structural supports that provide the mirror with one or more of the following: increased stiffness, reduced density, and a mechanism for fixing the mirror in a mirror assembly.

In one or more embodiments, the final mirror is between 100 microns to 1 meter in diameter.

In one or more embodiments, the second shape of the second mold molds the second surface of the heated material into the structure comprising a cellular, honeycomb, or isogrid structure.

In one or more embodiments, the optical surface has a grating on it.

In one or more embodiments, the mirror is obtained by depositing a thin layer of AM onto the surface of a plastic or polymer.

In one or more embodiments, the AM or BMG mirror is fabricated by float casting.

In one or more embodiments, the mirror has a reflectivity of at least 80% at a wavelength of 9 micrometers and/or a surface roughness of at least 0.02 micrometers.

In one or more embodiments, the cellular structure on the back of the mirror reduces the mass of the mirror by at least 50% and increases a stiffness of the mirror by at least a factor of 2, as compared to the mirror without a backing.

In one or more embodiments, the cellular structure on the mirror back comprises holes, surrounded by walls having a depth of at least 3 millimeters and a wall thickness less than the depth.

In one or more embodiments, the backing of the mirror is any cellular structure that reduces the mass of the part while increasing the stiffness of the mirror without the backing.

In one or more embodiments, the mirror has a thickness between 10 micron to 10 mm from front to back.

In one or more embodiments, the parts are formed from BMG, AM, or BMGMC powder that is consolidated into the part by laser heating.

In one or more embodiments, the mirror assembly consists/comprises of an isogrid or square honeycomb cellular structure comprising a BMG or BMGMC.

In one or more embodiments, the mirror surface is on the interior or exterior of a ring or on the outside of a convex surface.

In one or more embodiments, a near-net shape mirror is created that is finished mechanically in Block 3408 by (a) mechanical polishing (b) diamond turning, and/or (c) frictional heating and pressing.

In one or more embodiments, the mirror or mirror assembly is formed by die casting, comprising:

(a) heating (Block 3400) a BMG or BMGMC to above its liquid temperature in a crucible and pressing it (Block 3402) into a mold from a shot-sleeve, (b) a multi-piece mold that includes a mirror-polished part with or without optical curvature, (c) a multi-piece mold that includes structural supports for the mirror such as a backing, an isogrid, flexures tabs or other mounting accessories, (d) a die-casting pressure (Block 3402) between 0.1-200 tons (e) a processing a temperature (Block 3400) between 600-1500° C., (f) a final part thickness between 0.1-50 mm, (g) an optical finish that is obtained by casting over an insert of a mirror-polished part that is made from copper, brass, steel, glass, a refractory metal (W, Ta, Nb), a ceramic, or a carbide (e.g. SiC or TiC), (h) an injection system used to remove the part from the mold without damaging the mold, and/or (i) the flow velocity of the liquid into the mold is laminar (e.g., has Reynold's number <2300).

In one or more embodiments, the mirror or mirror assembly is formed by thermoplastic forming (TFP), comprising:

(a) heating (Block 3400) a plate of BMG or BMGMC to the supercooled liquid region (SCLR) using a heated plate and then embossing (Block 3402) it with a die tool, (b) heating (Block 3400) amorphous powder or particles (e.g., from 1 micron to 5 mm in diameter) into the SCLR and then applying a compacting load (Block 3402) to form a mirror or mirror assembly, (c) heating (Block 3400) a BMG to any desired viscosity between the glass transition temperature and the crystallization temperature and then forming (Block 3402), (d) applying (Block 3402) between 1-200 tons of pressure in the SCLR to form the part, (e) heating (Block 3400) the alloy to between 200-500° C. for processing, and/or (f) heating (Block 3400) a BMG or AM and blow molding (Block 3402) it into the mirror finish.

In one or more embodiments, the mirror or mirror assembly is formed by capacitive discharge forming, comprising:

(a) discharging (Block 3400) between 0.1-25 kJ of energy into a BMG or AM sample using a capacitor bank, (b) heating (Block 3400) the sample to the SCLR and then forming (Block 3402), (c) forming (Block 3402) the mirror using forging or squeezing with a polished die tool, (d) forming (Block 3402) the mirror using suction or vacuum pressure against a polished tool, (e) forming (Block 3402) the mirror using a magnetic force to push the liquid up against a mold tool, (f) forming (Block 3402) the mirror by blow molding, (g) discharging (Block 3400) through a plate of BMG, 1-5 mm in thickness, then forming the part, (h) discharging (Block 3400) through a sheet of AM, 1-1000 micron in thickness, and then forming into a part, (i) heating (Block 3400) a BMG or AM to 200-1000° C. for processing, (j) fully melting (Block 3400) a BMG or AM alloy before processing, (k) forming (Block 3402) the mirror or mirror assembly by discharging and injection casting a rod of BMG material, and/or (l) forming (Block 3402) the mirror surface and the backing structure (e.g. isogrid) in one heating and processing step.

In one or more embodiments, the mirror or mirror assembly is formed by surface treating, comprising:

(a) pressing (Block 3402) a heated die tool into a BMG or BMGMC part to locally melt and form the surface to a particular shape or smoothness, (b) etching (Block 3408) the surface to increase the smoothness, and/or (c) plating (Block 3408, 3500) or sputtering a metal onto the surface of the part to increase reflectivity.

In one or more embodiments, the mirror or mirror assembly is formed by semi-solid processing BMGMCs, comprising:

(a) heating (Block 3400) the alloy to the semisolid temperature region above the solidus but below the liquidus to allow for dendrite coarsening, (b) pressing (Block 3402) the processed ingot between a first mold and a second mold, wherein the processed ingot is molded into a molded part and:
   i. a first shape of the first mold molds a first surface of the processed ingot into a net shape or near net shape of a mirror; and
   ii. a second shape of the second mold molds a second surface of the processed ingot into a structure backing the mirror; and (c) releasing (Block 3406) the molded part from the first mold and second mold, wherein the structure supports and provides the mirror with one or more of the following: increased stiffness, reduced density, and a mechanism for fixing the mirror in a mirror assembly.

In one or more embodiments, the processing is such that the processed BMGMC ingot has at least 5% tensile ductility and the molded part has a fracture toughness greater than 50 MPa*m$^{1/2}$.

In one or more embodiments, the mirror or mirror assembly is fabricated via twin roll casting (TRC) comprising:

(a) feeding sheets of AMs, BMGs or BMGMCs into a TRC process where the wheels emboss or form the surface of the part (Block 3402), (b) feeding thermoplastic or molten liquid (formed in (Block 3400)) into a TRC process to form (Block 3402) a mirror or mirror assembly where the wheels provide conductive cooling (Block 3404) necessary to form a glassy part, (c) embossing (Block 3402) the AM or BMG sheet in TRC and then cooling (Block 3404) the sheet by blowing gas on the sample as it exits the wheels, (d) forming (Block 3402) a multifunctional part with a smooth top surface and a cellular backing by having wheels with different patterns on them (e.g. isogrid on the lower wheel and mirror polish on the upper wheel, (e) using TRC to fabricate a part which is later formed using another technique described in this application for surface finishing, (f) using TRC as a continuous process for fabricating large numbers of mirror segments, and/or (g) using TRC to fabricate large area mirror segments or a mirror or shaped panel with thickness between 100 micron and 5 mm. A curved wheel can be used to impart a curvature to a formed plate during TRC, and/or multiple sets of rolling wheels can be used to gradually form a part in steps.

In one or more embodiments, the mirror and mirror assembly are formed by joining multiple parts (Block 3600), wherein at least one of the parts comprises an AM, BMG or BMGMC, and wherein:

(a) the joining is done by spot welding AM, BMG or BMGMC parts together such that no joint or heat-affected-zone remains in the junction, (b) the joining is done by laser welding, (c) the joining is done by friction welding, (d) the joining is done by epoxy or brazing, (e) the mirror and the structural backing are fabricated separately and joined together, and/or (f) the mirror and the mounting elements are joined together.

In one or more embodiments, the optical surface or curvature of the mirror is obtained through a localized surface treatment (Block 3408), comprising:

(a) pressing a heated die tool onto the surface of a part to locally heat and smooth the surface (Blocks 3400 and 3402), (b) heating the surface using a localized discharge of energy (Block 3400) and then pressing it (Block 3402) with a die tool, (c) locally heating (Block 3400) the surface using RF heating and then pressing it (Block 3400) with a die tool, (d) etching (Block 3408) the surface to improve the optical surface, (e) diamond turning (Block 3408), (f) locally heating (Block 3400) the surface using an ultrasonic pulse and then pressing it (Block 3402) with a die tool, and/or (g) locally heating (Block 3400) the surface using friction and then pressing it (Block 3402) with a die tool.

In one or more embodiments, the AM or BMG mirror is fabricated by a deposition technique (Blocks 3500, 3408), comprising:

(a) sputtering AM onto the surface of a glass, metal or plastic mirror, (b) plating AM onto the surface of a metal or plastic by electroplating or electroless plating, (c) dipping a mirror into a bath of molten AM material to form the mirror, and/or (d) spray coating a mirrored materials with AM in such a way as to maintain the smoothness and optical characteristics.

In one or more embodiments, the mirror is fabricated by spray coating (Block 3408, 3500) and then finishing an AM layer (Blocks 3408, 3402), comprising:

(a) thermal spray coating or HVOF spraying, (b) spraying a layer between 10 micron and 15 mm thick, and/or (c) surface treating the sprayed coating to form an optical finish by any method described herein (e.g., embossing or thermoplastic pressing, Block 3402).

In one or more embodiments, the mirror or mirror assembly has a combination of one or more of the flowing properties; high hardness compared with conventional mirrors, high corrosion resistance, scratch resistance, high strength, low coefficient of thermal expansion, high elasticity, low density, high strength to weight ratio, low cost, low stiffness, high toughness, high reflectivity and high thermal conductivity.

In one or more embodiments, optically smooth mirrors can be fabricated utilizing an automated casting and ejection process that can fabricate multiple parts without interruption or intervention and those parts can be integrated into applications without significant finishing or modification.

In one or more embodiments, the AM. BMG or BMGMC alloys systems are based in Zr, Ti, Cu, Ni, Fe, Pd, Au, Pt, ZrTiBe, ZrBe, TiBe, CuZr, CuZrAl, CuZrAlNi, NiP, FeP, PdCuNiP, PtCuNiP, FeNiB, FeNiPB and where at least 50% of the alloys is comprised of the systems listed.

The mirror or mirror assembly can be used in the following applications (for example): spacecraft mirrors, telescopes, lenses, automobiles, aircraft, mirror coating on plastic, solar collectors, cameras, jewelry, televisions, electronics, electronic cases, toys, military applications, makeup compacts, sensors, detectors, lasers, sporting equipment, medical or dental devices, microelectronic devices (MEMS), watches.

Mirror Structures

Figure 39:
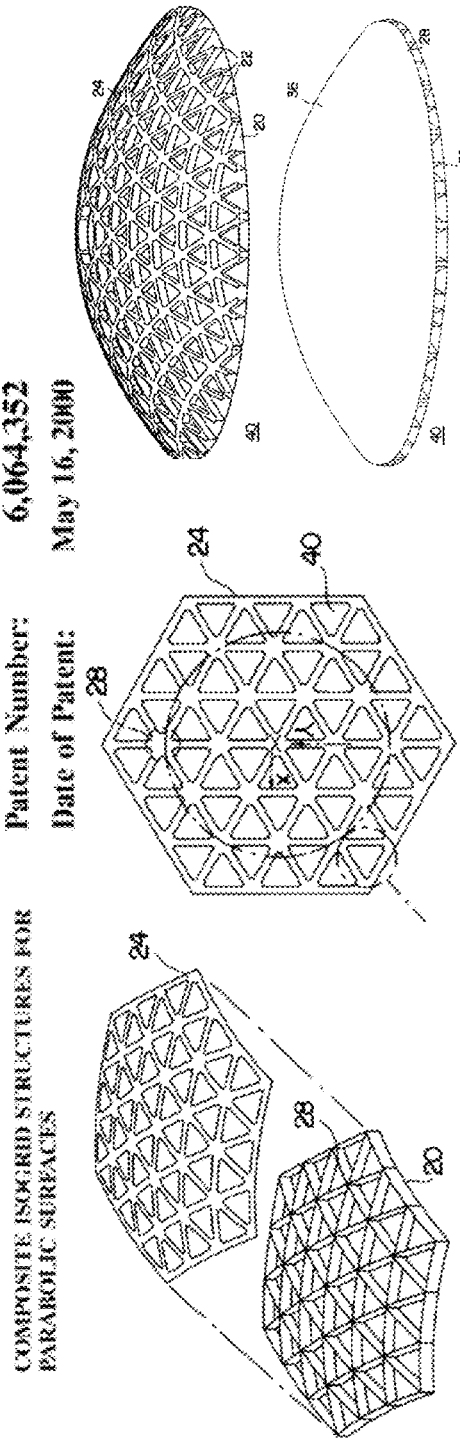
Figure 40:
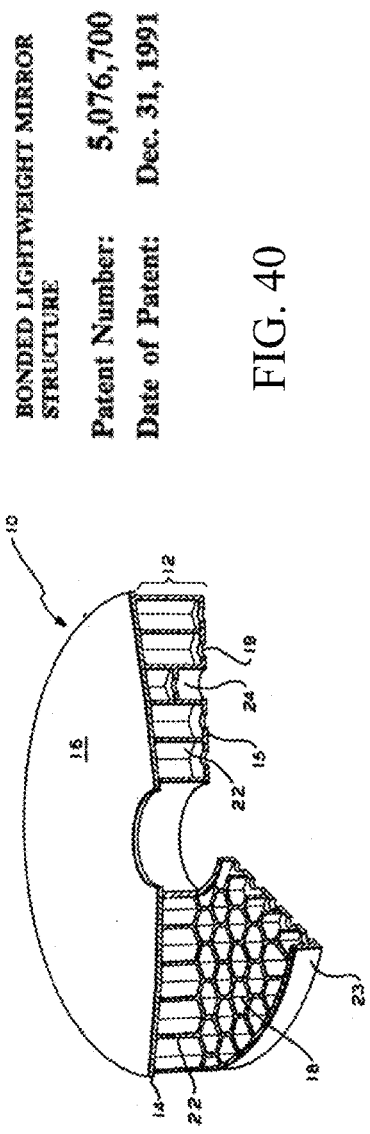
Figure 42:
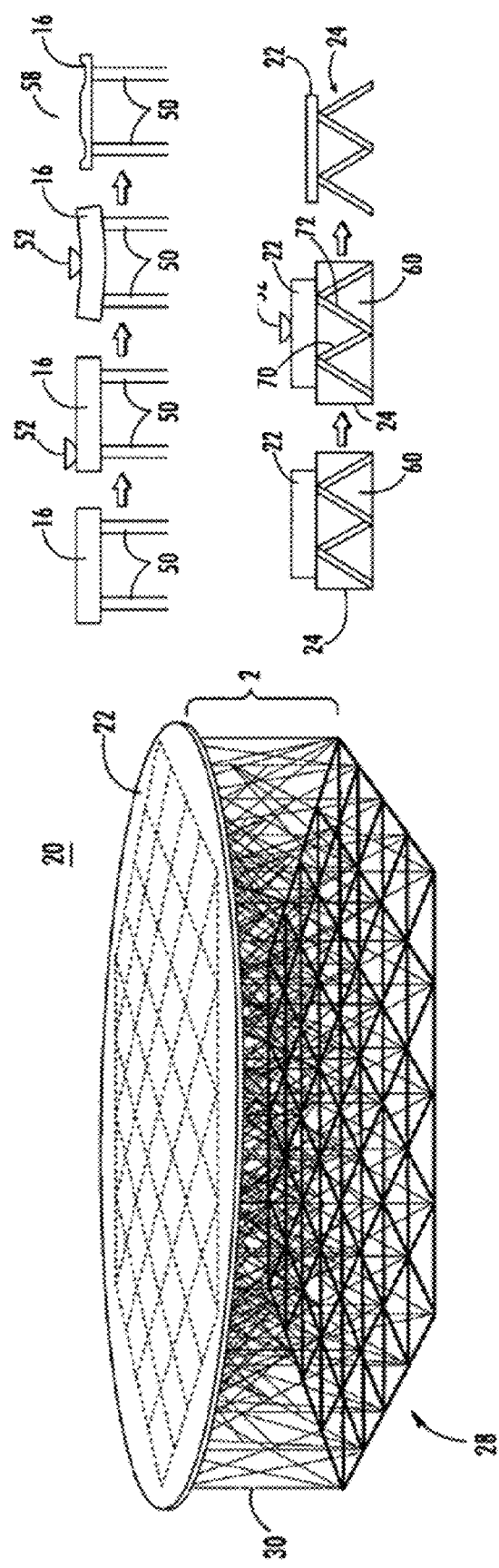

FIGS. 37-42 illustrate mirror structures fabricated by conventional methods, wherein the end product mirror structures can also be fabricated using one or more embodiments of the present invention. FIG. 37 is taken from [14], FIG. 38 is taken from [15], FIG. 39 is taken from [16], FIG. 40 is taken from [17], FIG. 41 is taken from [18], and FIG. 42 is taken from [19], wherein the labelling in FIGS. 37-42 refers to labelling in the references from which the figures are taken. For example, Reference [19] describes a method of making a mirror structure includes assembling a supporting isogrid framework, assembling an isogrid back plane, interconnecting the supporting isogrid framework with the isogrid back plane by a truss core, and disposing an optical surface on the supporting isogrid framework.

One or more embodiments of the present invention utilize a one-step casting approach to make the isogrid, not a machining or assembly approach.

Figure 43:
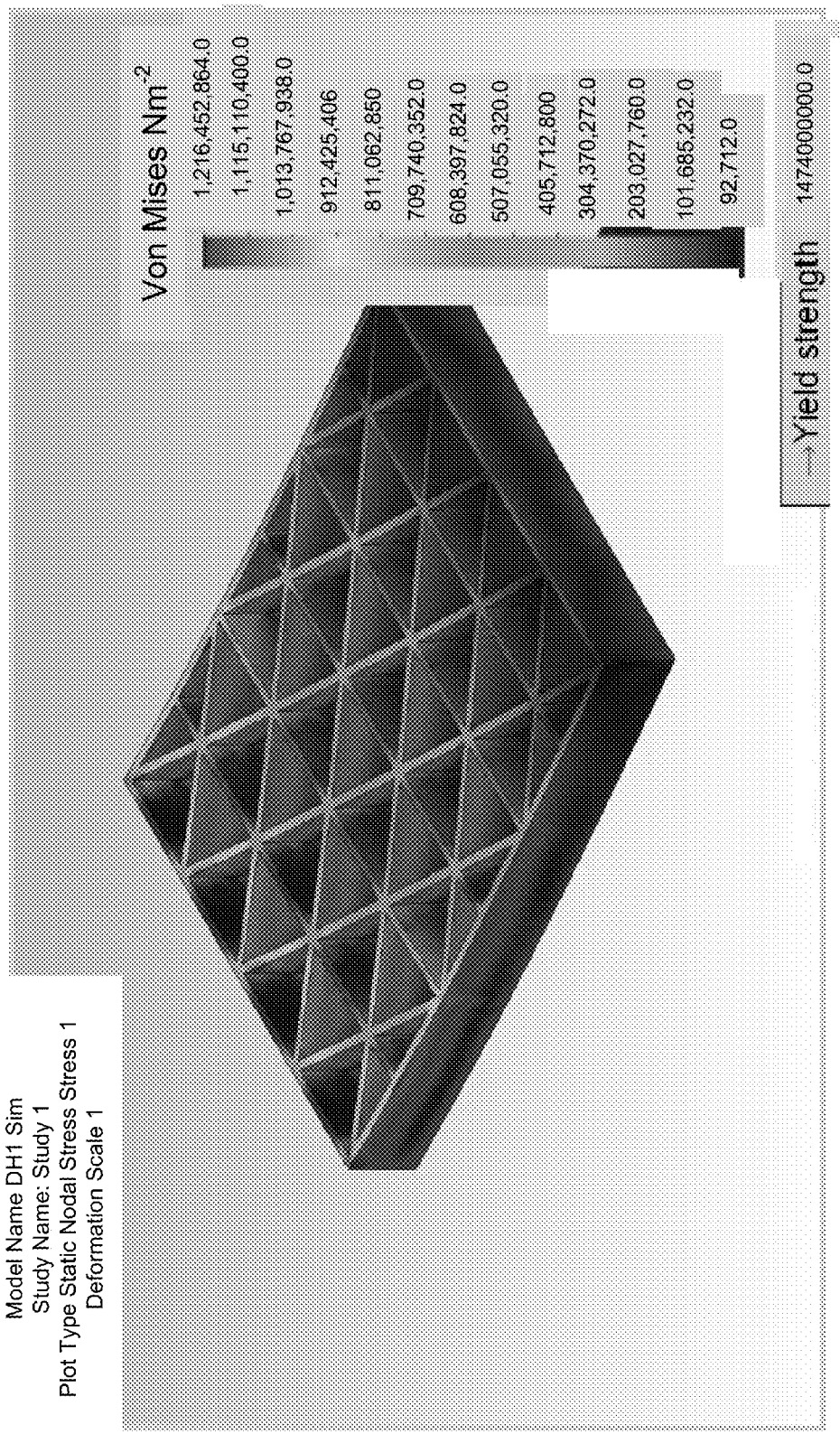

FIG. 43(*a*)-(*b*) illustrates finite element modeling of an isogrid mirror structure to demonstrate the increased stiffness obtained by the structure that can be fabricated according to one or more embodiments of the invention.

FIG. 44 illustrates a free standing BMGMC isogrid structure fabricated in one casting process, according to one or more embodiments of the invention.

Possible Modifications

The present invention is not limited to the method of fabricating the AM or AM composite mirror. Different fabrication techniques for making mirror assemblies have been described, including sputtering or plating (e.g., onto a smooth surface), semi-solid forging, and thermoplastic forming, but the invention is not limited to these techniques. Float casting can also be used to fabricate the mirrors.

Other AM strategies for making the mirrors include grinding and polishing the mirror surface, laser engineered net shaping (LENS), or other additive manufacturing techniques. Power metallurgy and compaction can also be used.

REFERENCES

The following references are incorporated by reference herein.

[1] G. Kumar et. al., Appl. Phys. Lett., 97 101907 (2010)

[2] D. C. Hofmann et. al., JOM (2009).

[3] D. C. Hofmann, J. y Suh, A. Wiest, and W. L. Johnson, Scripta Mater. (2008).

[4] G. Kumar, A. Desai, and J. Schroers, Adv. Mater. 23, 461 (2011).

[5] Schlegel and Wachter, Solid State Commun. 31 (1979)

[6] J. Schroers, Adv. Mater. 22, 1566 (2010).

[7] W. L. Johnson et. al., Science 332, 828 (2011).

[8] U.S. Patent Publication No. 2011/0203704.

[9] U.S. Patent Publication No. 2009/0236017.

[10] Caltech U.S. Provisional Patent Application Ser. No. 61/451,495, "Thermoplastic Joining and Assembly of Bulk Metallic Glass Composites Through Capacitive Discharge," Hofmann, et. al. (2011).

[11] Hofmann et. al., Nature 451 (2008), pp. 1085-1089.

[12] Hofmann, Scripta Mater. 59, (2008), pp. 684-687.

[13] Hofmann, PhD Thesis, "Designing Bulk Metallic Glass Matrix Composites with high Toughness and Tensile Ductility."

[14] Method of manufacturing a blank for a light-weight mirror with a supporting structure, U.S. Pat. No. 4,898,604, issued Feb. 6, 1990.

[15] Open Core Light-Weight Telescope Mirror and Method of Manufacture, U.S. Pat. No. 6,045,231 issued Apr. 4, 2000.

[16] Composite Isogrid Structures for parabolic surfaces, U.S. Pat. No. 6,064,532, issued May 16, 2000.

[17] Bonded Light Weight Mirror Structure, U.S. Pat. No. 5,076,700, issued Dec. 31, 1991.

[18] Multiple face sheet isogrid structures, U.S. Pat. No. 6,286,289, issued Sep. 11, 2001.

[19] Open lattice mirror structure and method of making same, U.S. Pat. No. 7,281,809, issued Oct. 16, 2007.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of fabricating a mirror or mirror assembly part, comprising:
   (a) heating an alloy of a material comprising bulk metallic glass matrix composite (BMGMC), locally or in total, into a heated material;
   (b) pressing the heated material into a mirror or mirror assembly part using a first mold and a second mold, wherein:
   the heating and the pressing are under conditions that reduce flow of the heated material during the pressing and form a mirror surface on the heated material;
   the pressing of the mirror or mirror assembly part comprises semi-solid processing the BMGMC, comprising:
      the heating of the alloy of the material to a semisolid temperature region above a solidus but below a liquidus to allow for dendrite coarsening, to form the heated material comprising a processed material; and
      the pressing including forging the processed material between the first mold and the second mold, wherein the processed material is molded into a molded part under the conditions wherein the flow of the processed material due to gravity is reduced, and;
      (1) a first shape of the first mold molds a first surface of the processed material into a net shape or near net shape of the mirror or the mirror assembly part; and
      (2) a second shape of the second mold molds a second surface of the processed material into a structure backing the mirror or the mirror assembly part; and
   (c) removing the material and releasing the molded part from the first mold and the second mold, wherein:
   the structure supports and provides the mirror with one or more of the following: increased stiffness, reduced density, and a mechanism for fixing the mirror in a mirror assembly;
   the second mold comprises channels each having a channel depth, a channel width, and a draft angle to mold and release the mirror or mirror assembly part comprising the structure comprising a cellular structure having walls, the walls each having depth of at least 3 millimeters and a wall thickness less than the wall depth;
   the mirror or mirror assembly part has a thickness between 10 micrometers and 10 millimeters from front to back; and
   the conditions include a pressure applied by the pressing, a velocity of the heated material, and a viscosity of the heated material, such that the mirror surface can be polished to a 0.02 micron finish by hand.

2. The method of claim 1, wherein the BMGMC is on a non-BMGMC part.

3. The method of claim 1, wherein the mirror assembly part has multi-functionality, comprising two or more of the following:
   (i) the mirror surface comprising a reflective and optically smooth surface,
   (ii) the mirror surface comprising an optically smooth surface with curvature,
   (iii) the cellular structure comprising an isogrid or other structural backing to give the mirror assembly part increased stiffness,
   (iv) a tailored coefficient of thermal expansion,
   (v) flexures or tabs cast into the part or joined to the part,
   (vi) mounting features, and/or
   (vii) a mirror mount part fabricated as a support for an oxide glass mirror, wherein:
      (1) some or all of the mirror mount part comprises the BMGMC,
      (2) one or more tabs of the mirror mount part that hold the mirror comprise the BMGMC, and
      (3) the mirror mount part is cast in a single processing step or the mirror mount part is assembled from multiple pieces that are joined or welded.

4. The method of claim 1,
   wherein:
   the pressing fabricates the mirror surface and the structure backing the mirror assembly part comprising a mirror part, in a single processing step, and
   the mirror part is made by pressing the heated material between the two molds where one side of one of the molds imparts an optical finish, or optical finish and curvature, to the mirror surface.

5. The method of claim 1, wherein the BMGMC mirror or mirror assembly part is cooled into an amorphous or glassy state by conduction into the molds' material.

6. The method of claim 1, wherein the pressing creates an optical surface of the mirror having a grating.

7. The method of claim 1, wherein a layer of the BMGMC is on a surface of a plastic or polymer.

8. The method of claim 1, wherein:
   the pressing forms the cellular structure on a back of the mirror, with one or more of the following:
      (i) the cellular structure reducing a mass of the mirror by at least 50% and increases the stiffness of the mirror by at least a factor of 2, as compared to the mirror without the cellular structure,
      (ii) the cellular structure that is any cellular structure reducing the mass of the part while increasing the stiffness of the mirror as compared to the mirror without the cellular structure, and/or
      (iii) the cellular structure comprising an isogrid or square honeycomb cellular structure comprising the BMGMC.

9. The method of claim 1, further comprising joining multiple parts, wherein at least one of the multiple parts comprises the mirror or mirror assembly part, the method including one or more of the following:
   (i) the joining done by spot welding the BMGMC parts together such that no joint or heat-affected-zone remains in a junction between the parts,
   (ii) the joining done by laser welding,
   (iii) the joining done by friction welding,
   (iv) the joining done by epoxy or brazing,
   (v) the mirror and structural backing for the mirror fabricated separately and then joined together, and/or
   (vi) the joining of the mirror and mounting elements together.

10. The method of claim 1, wherein an optical surface or curvature of the mirror surface is obtained through a localized surface treatment of a surface of the part, comprising one or more of the following:
  (i) the pressing comprising pressing a heated die tool onto the surface of the part to locally heat and smooth the surface,
  (ii) the heating of the surface using a localized discharge of energy and then the pressing of the surface with a die tool,
  (iii) the heating comprising locally heating the surface using Radio Frequency (RF) heating and then the pressing of the surface with the die tool,
  (iv) the heating by locally heating the surface using an ultrasonic pulse and then the forming by the pressing of the surface with a die tool, and/or
  (v) the heating by locally heating the surface using friction and then the pressing the surface with a die tool.

11. The method of claim 1, wherein the material comprises a BMGMC alloy system based in Zr, Ti, Cu, Ni, Fe, Pd, Au, Pt, ZrTiBe, ZrBe, TiBe, CuZr, CuZrAl, CuZrAlNi, NiP, FeP, PdCuNiP, PtCuNiP, FeNiB, or FeNiPB, and wherein at least 50% of the material is comprised of the system.

12. The method of claim 1, further comprising (d) performing a finishing step that includes surface treating, deposition of a layer, joining, welding, embossing or assembly to create the final part.

* * * * *